United States Patent
Kemeny

(10) Patent No.: US 12,117,037 B1
(45) Date of Patent: Oct. 15, 2024

(54) FASTENER ASSEMBLIES, CAM LOCKING FASTENER COMPONENTS, AND CAM INTERFACES

(71) Applicant: Zoltan A. Kemeny, Chandler, AZ (US)

(72) Inventor: Zoltan A. Kemeny, Chandler, AZ (US)

(*) Notice: Subject to any disclaimer, the term of this patent is extended or adjusted under 35 U.S.C. 154(b) by 0 days.

(21) Appl. No.: 18/666,094

(22) Filed: May 16, 2024

Related U.S. Application Data

(60) Provisional application No. 63/580,367, filed on Sep. 2, 2023.

(51) Int. Cl.
*F16B 39/24* (2006.01)

(52) U.S. Cl.
CPC .................................. *F16B 39/24* (2013.01)

(58) Field of Classification Search
CPC .......... F16B 33/00; F16B 39/24; F16B 39/32; Y10S 411/924; Y10S 411/935
USPC ........... 411/190–191, 272, 366.1, 432, 935.1
See application file for complete search history.

(56) References Cited

U.S. PATENT DOCUMENTS

| | | | | |
|---|---|---|---|---|
| 1,776,473 A | * | 9/1930 | Lillig | F16B 39/24 411/126 |
| 1,868,861 A | * | 7/1932 | Vossloh | F16B 39/24 411/153 |
| 1,886,791 A | * | 11/1932 | Cowlin | F16B 39/24 411/153 |
| 2,006,359 A | * | 7/1935 | Lackner | F16B 39/24 411/157 |
| 3,263,727 A | | 8/1966 | Herpolsheimer | |
| 3,417,802 A | * | 12/1968 | Oldenkott | F16B 43/009 411/959 |
| 5,080,545 A | | 1/1992 | McKinlay | |
| 5,190,423 A | * | 3/1993 | Ewing | F16B 39/282 411/533 |
| 5,626,449 A | | 5/1997 | McKinlay | |
| 6,554,552 B2 | | 4/2003 | McKinlay | |
| 6,776,565 B2 | * | 8/2004 | Chang | F16B 39/282 411/149 |
| 8,807,896 B2 | | 8/2014 | McKinlay | |
| 2007/0196195 A1 | * | 8/2007 | Lin | F16B 39/24 411/161 |
| 2007/0243040 A1 | * | 10/2007 | Chen | F16B 39/282 411/161 |
| 2011/0274514 A1 | * | 11/2011 | Lee | F16B 43/00 411/368 |
| 2019/0234446 A1 | * | 8/2019 | Chang | F16B 41/002 |

* cited by examiner

*Primary Examiner* — Roberta S Delisle
(74) *Attorney, Agent, or Firm* — Parsons & Goltry, PLLC; Michael W. Goltry; Robert A. Parsons

(57) ABSTRACT

A fastener includes a shank and an annular body. The shank is arranged about an axis of rotation and includes an external thread having a thread pitch and a thread lead angle to a plane normal to the axis of rotation. The annular body includes an annular face and a cam annular face. The annular body is received about the shank and arranged about the axis of rotation. The cam annular face includes a ramp and a shoulder. The shoulder includes a base, a crest, and an axial thickness extending from the base to the crest. The axial thickness is greater than the thread pitch. The ramp inclines between the base and the crest at a slope angle to the plane. The slope angle is equal to or greater than the thread lead angle.

3 Claims, 48 Drawing Sheets

FASTENER ASSEMBLIES, CAM LOCKING FASTENER COMPONENTS, AND CAM INTERFACES

FIELD OF THE INVENTION

The present invention relates to threaded fasteners, cam locking components for threaded fasteners, and cam interfaces.

DESCRIPTION OF RELATED ART

Joining two or more elements or surfaces together is essential in many manufactured products. Bolted joints are useful for this when the elements require periodic disassembly and assembly without destroying the joint.

Bolted joints, fasteners secured by matching screw threads, capture and join other parts. A bolted joint, whether a tension joint or a shear joint, is either a soft joint or a hard joint. A soft-bolted joint is when the hardness of at least one of the elements is below 30 RC. A hard-bolted joint is when the hardness of all the elements is greater than 30 RC. A bolted joint may use a through-hole or a tapped hole. A through-hole or stud joint relies on parts joined together using a stud. A tapped hole or screw joint joins parts using a threaded hole and a threaded fastener.

The competent joint should maintain joint cohesiveness. Axial forces exerted by the parts of a tension joint can separate the joint. The shear forces exerted by the elements of a shear joint can separate the joint. Accordingly, the bolt of a tension joint must serve as a clamp to hold the parts together and the bolt of a shear joint must serve as a pin to keep the parts stationary.

A standard bolt consists of a longitudinally straight shank including a first end, a second end, a head proximate to the first end, and an external thread. The external thread between the first and second ends threads on an internal thread of a tapped nut, through-hole, or blind hole. A standard bolted joint includes the internal thread exerting an axial clamping force and the bolt's shank acting as a dowel, pinning the joint against lateral shear forces. The locking method of the bolted joint includes the internal thread of the nut, opening, or blind bore on the external thread of the bolt. Rotational engagement of the internal thread over and on the external thread creates axial clamping.

Vibration and prevailing torque capable of inducing relative movement between the components of a bolted joint can loosen the bolted joint by unwinding the bolt's external thread from the applied internal thread. Within the prior art are various cam locking fasteners designed to resist bolt loosening. These fasteners incorporate lock washer arrangements, including two thin washers with inter-engageable inclined cam surfaces designed to counteract loosening forces. The cam surfaces of these lock washer arrangements lock together in the tightening direction of rotation of a threaded fastener and override in the loosening direction to facilitate the release of the washer arrangement by loosening the fastener. The cam surfaces each have a continuous, uninterrupted undulating contour defined by a succession of numerous shallow saw tooth serrations consisting of gradually inclined cam surfaces or ramps terminating in inclined stop shoulders. The ramps and the shoulders connect at acute angles, angles less than ninety degrees. The configuration and number of the cam surfaces inherently limits the load capacity of the two components and still allows the two components to displace rotationally relative to each other in the tightening and loosening directions.

SUMMARY OF THE INVENTION

According to the invention, a fastener includes a shank and an annular body. The shank is arranged about an axis of rotation and includes an external thread having a thread pitch and a thread lead angle to a plane normal to the axis of rotation. The annular body includes an annular face and a cam annular face. The annular body is received about the shank and arranged about the axis of rotation. The cam annular face includes a ramp and a shoulder. The shoulder includes a base, a crest, and an axial thickness extending from the base to the crest. The axial thickness is greater than the thread pitch. The ramp inclines between the base and the crest at a slope angle to the plane. The slope angle is equal to or greater than the thread lead angle. The shoulder is rounded inwardly proximate to the base and is rounded outwardly proximate to the crest. The annular face includes projections configured to mechanically bite an adjacent surface when compressed thereagainst. In another embodiment, the annular face includes an annular socket configured to fit over and hold a head of a bolt. The annular body threaded on the external thread.

According to the invention, a fastener includes a shank and an annular body. The shank is arranged about an axis of rotation and includes an external thread having a thread pitch and a thread lead angle to a plane normal to the axis of rotation. The annular body includes an annular face and a cam annular face. The annular body is received about the shank and arranged about the axis of rotation. The cam annular face includes ramps and shoulders. The shoulders each include a base, a crest, and an axial thickness extending from the base to the crest. The axial thickness is greater than the thread pitch. Each of the ramps inclines between the base of one of the shoulders and the crest of another one of the shoulders at a slope angle to the plane. The slope angle is equal to or greater than the thread lead angle. Each of the shoulders is rounded inwardly proximate to the base and is rounded outwardly proximate to the crest. The annular face includes projections configured to mechanically bite an adjacent surface when compressed thereagainst. The annular face includes an annular socket configured to fit over and hold a head of a bolt The annular body is threaded on the external thread. The ramps include two ramps and the shoulders include two shoulders. Each of the two ramps inclines between the base of one of the two shoulders and the crest of another one of the two shoulders.

According to the invention, a fastener includes a bolt arranged about an axis of rotation. The bolt includes a shank having a proximal end, configured with a head including a cam annular face extending outward radially from the proximal end, a distal end, and an external thread having a thread pitch and a thread lead angle to a plane normal to the axis of rotation. The cam annular face includes a ramp and a shoulder. The shoulder includes a base, a crest, and an axial thickness extending from the base to the crest. The axial thickness is greater than the thread pitch. The ramp inclines between the base and the crest at a slope angle to the plane. The slope angle is equal to or greater than the thread lead angle. The shoulder is rounded inwardly proximate to the base and is rounded outwardly proximate to the crest.

According to the invention, a fastener includes a bolt arranged about an axis of rotation. The bolt includes a shank having a proximal end, configured with a head including a cam annular face extending outward radially from the proximal end, a distal end, and an external thread having a thread pitch and a thread lead angle to a plane normal to the axis of rotation. The cam annular face includes ramps and shoulders. The shoulders each include a base, a crest, and an axial thickness extending from the base to the crest. The axial thickness is greater than the thread pitch. Each of the ramps inclines between the base of one of the shoulders and the crest of another one of the shoulders at a slope angle to the plane. The slope angle is equal to or greater than the thread lead angle. Each of the shoulders is rounded inwardly proximate to the base and is rounded outwardly proximate to the crest. The ramps include two ramps and the shoulders include two shoulders. Each of the two ramps inclines between the base of one of the two shoulders and the crest of another one of the two shoulders.

According to the of the invention, a washer includes a split ring arranged about an axis. The split ring includes a head, a tail, an end gap separating the head from the tail, a cam radial surface, and a base radial surface. The split ring tapers and extends helically outward from the head to the tail. The cam radial surface spirals helically outward along a first helical slope to a plane normal to the axis from the head to the tail. The base radial surface spirals helically outward along a second helical slope to the plane from the head to the tail. The first helical slope is greater than the second helical slope.

According to the invention, a washer assembly includes a first washer and a second washer arranged about an axis. The first washer and the second washer each include a split ring including a head, a tail, an end gap separating the head from the tail, a cam radial surface, and a base radial surface, the split ring tapering and extending helically outward from the head to the tail, the cam radial surface spiraling helically outward along a first helical slope to a plane normal to the axis from the head to the tail, the base radial surface spiraling helically outward along a second helical slope to the plane from the head to the tail, and first helical slope greater than the second helical slope. The first end of the first washer is aligned with the first end of the second washer, and the cam radial surface between the head and the tail of the first washer is facially engaged to the cam radial surface between the head and the tail of the second washer.

According to the invention, a fastener includes a shank, a first washer, and a second washer. The shank is arranged about an axis of rotation and includes an external thread having thread lead angle to a plane normal to the axis of rotation. The first washer and the second washer are received about the shank and arranged about the axis of rotation. The first washer and the second washer each include a split ring including a head, a tail, an end gap separating the head from the tail, a cam radial surface, and a base radial surface, the split ring tapering and extending helically outward from the head to the tail, the cam radial surface spiraling helically outward along a first helical slope to the plane from the head to the tail, the base radial surface spiraling helically outward along a second helical slope to the plane from the head to the tail, and the first helical slope greater than the second helical slope and equal to or greater than the thread lead angle. The first end of the first washer is aligned with the first end of the second washer, and the cam radial surface between the head and the tail of the first washer is facially engaged to the cam radial surface between the head and the tail of the second washer.

BRIEF DESCRIPTION OF THE DRAWINGS

Specific objects and advantages of the invention will become apparent to those skilled in the art from the following detailed description of illustrative embodiments thereof, taken in conjunction with the drawings in which.

DETAILED DESCRIPTION

Disclosed are cam locking components, configured to resist rotary loosening of a threaded fastener element caused by application of a loosening force component on the threaded fastener element resulting from by cyclic loading, vibration, etc. The cam locking components have matching cam interfaces. The cam interfaces are inter-engageable surface configuration or profiles. Each cam interface is a contour defined by a circumferential succession of wedges, including ramps connected by shoulders, each of the shoulders with a base, a crest, and an axial rise from the base to the crest. Each ramp extends between the base of one shoulder and the crest of an adjacent shoulder. Each ramp has a rise from the base of one shoulder to the crest of an adjacent shoulder. The axial rise of each shoulder determines the rise of the ramp rising to it. Rotary loosening of the threaded fastener element in a loosening direction causes the ramps to slide against each other toward mutually wedged positions, countering the rotary loosening of the threaded fastener element. The preload increases when the cam locking components displace rotationally relative to each other to a mutually wedged position. A loosening force component on the threaded fastener element occurs in response to a vector component of the preload on the fastener directed along the lead angle or helix of the threaded fastener element's external thread in a loosening direction. A vector component of compressive force between the cam locking components developed by the inter-engaged wedges functions as a holding force component counteracting the rotary loosening force component. The holding force counteracts the rotary loosening force by the wedge's inter-engaged ramps, by the slope angle of each ramp being equal to or greater than the thread lead angle of the external thread of the threaded fastener element, and the rise of each ramp being greater than the thread pitch of the external thread of the threaded fastener element. Accordingly, the cam interfaces of the cam locking components are uniquely configured to counteract rotary loosening of a threaded fastener element.

I.

Figure 1:
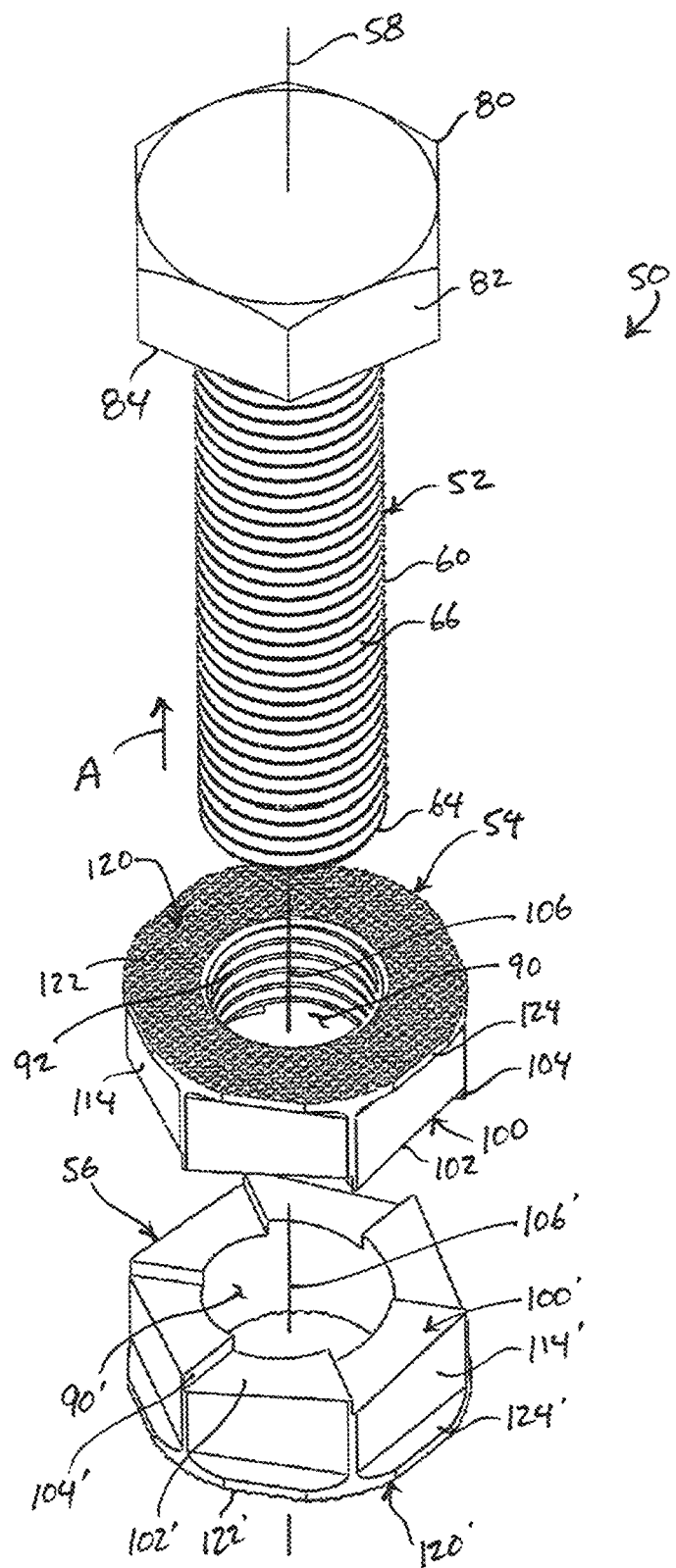
FIG. 1 is a top perspective view of a fastener constructed and arranged according to the invention, the fastener shown disassembled and including a bolt and two cam locking nuts, including an upper cam locking nut and a lower cam locking nut.
Figure 2:
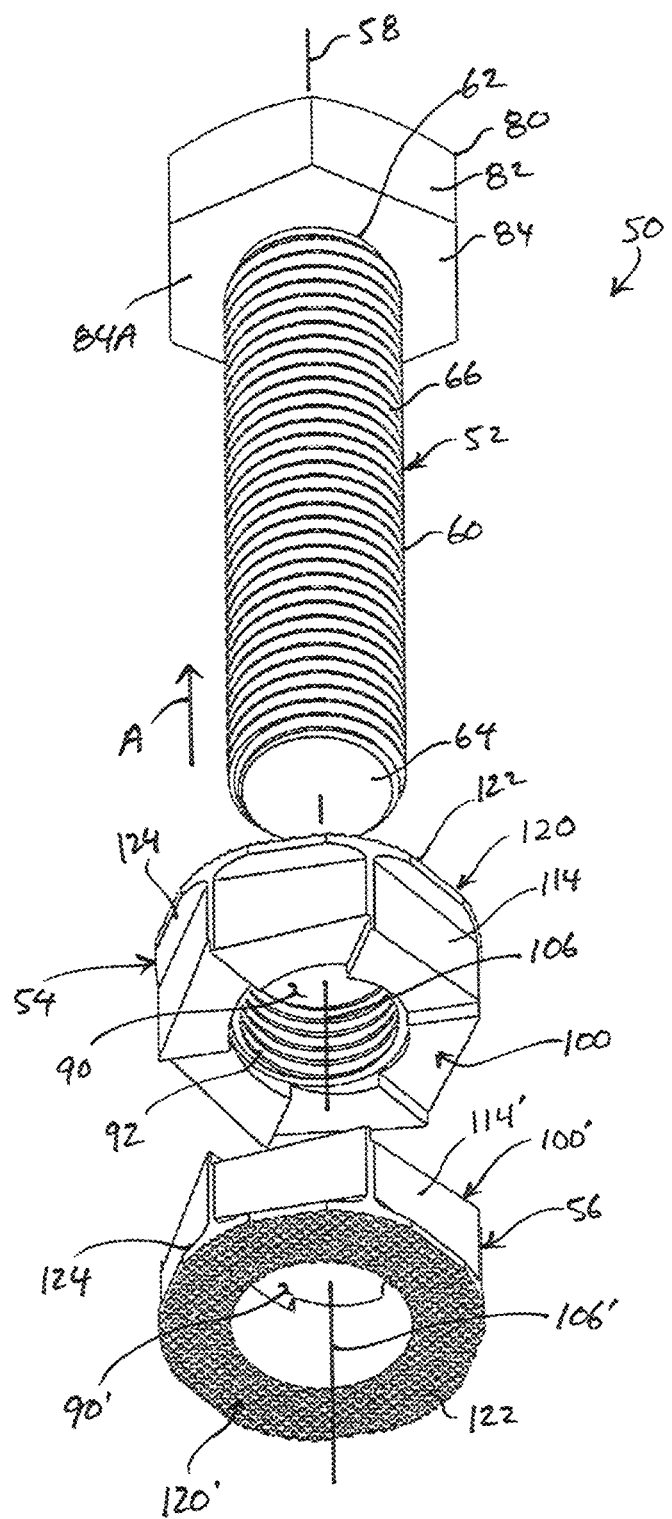
FIG. 2 is a bottom perspective view of the embodiment of FIG. 1.

FIGS. 1 and 2 illustrate a fastener 50. The fastener 50 includes a bolt 52 and two cam locking components, namely, nuts 54 and 56. The nuts 54 and 56 are cam locking nuts configured to be assembled with the bolt 52 to form the assembled fastener 50 in FIGS. 9-11.

Figure 11:
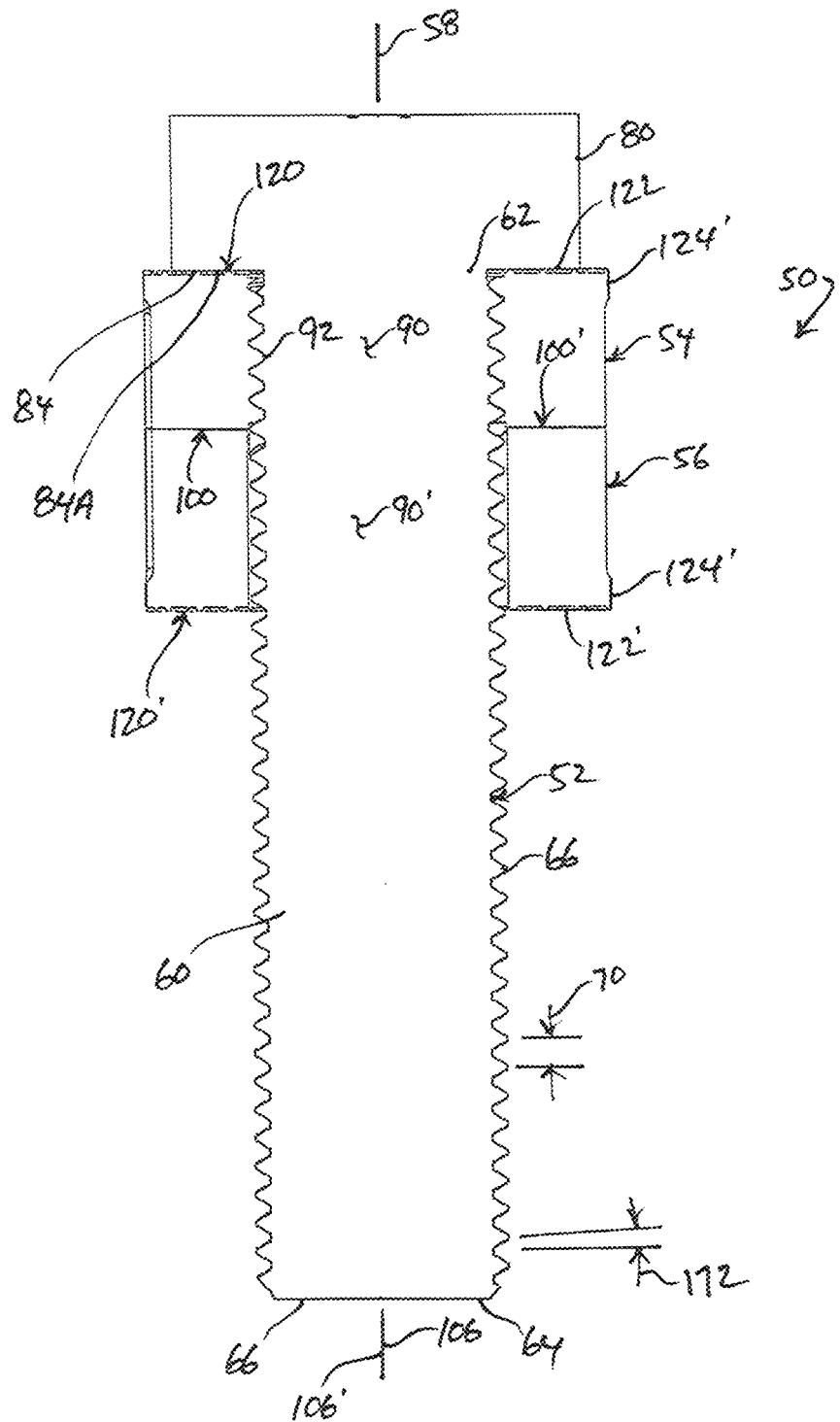
FIG. 11 is a vertical section view of the embodiment of FIGS. 9 and 10.
Figure 12:
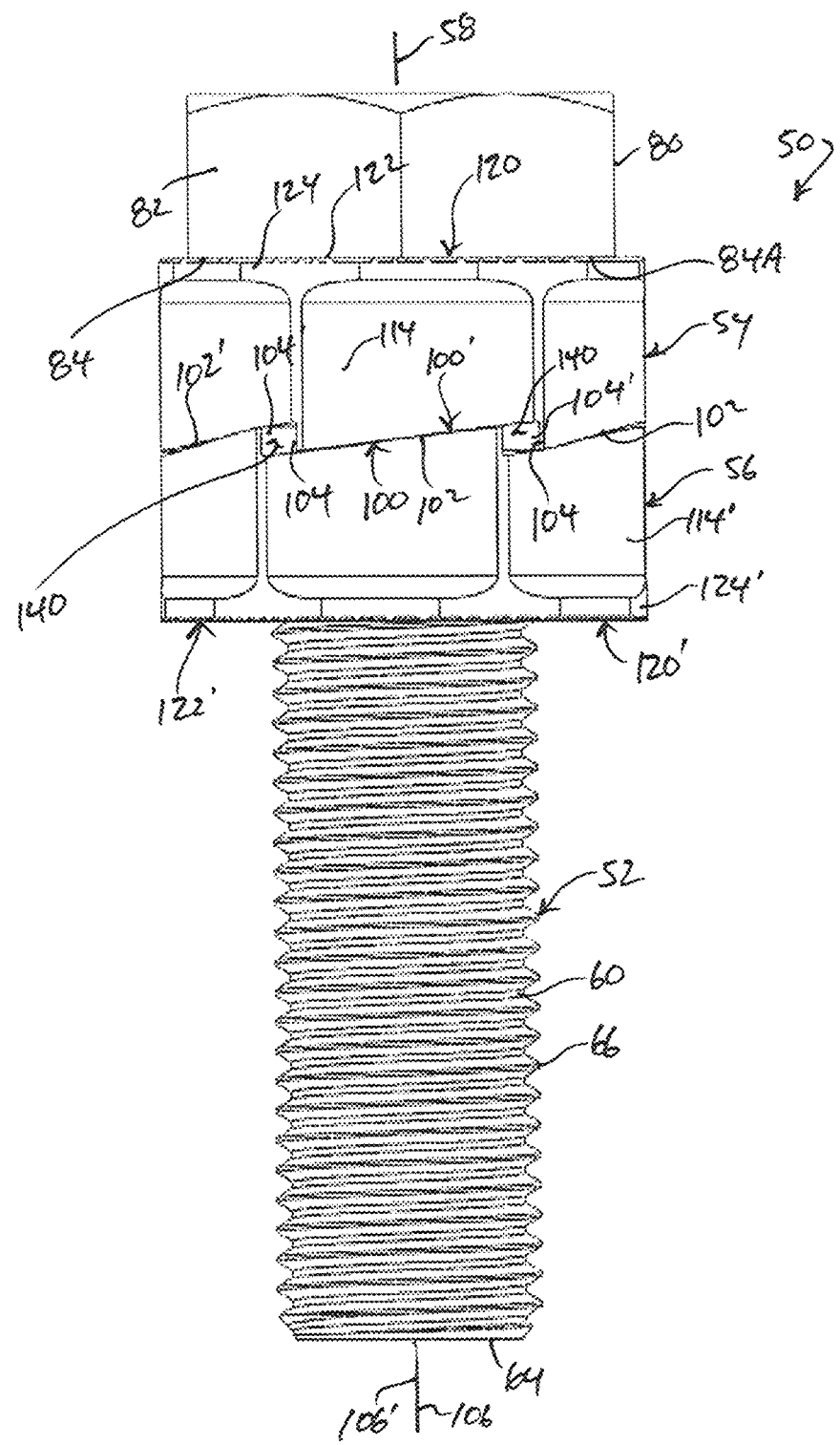
FIG. 12 is a side elevation view of the embodiment of FIGS. 9 and 10, showing the upper and lower cam locking nuts displaced rotationally relative to each other.

The bolt 52 is a threaded fastener element. It has a longitudinally straight cylindrical shank 60 extending from a first or proximal end 62, configured with a head 80, to a second or distal end 64. The shank 60 has an external thread 66 between the proximal end 62 and the distal end 64. The head 80 is configured to be driven by a hand or power tool. The head 80 has standard wrench flats 82, six in this example, for bolt-turn purposes, and an underside 84. The shank 60 extends outward to its distal end 64 from its proximal end 62 affixed centrally to the head's 80 underside 84, forming an annular bearing face 84A of the head's 80 underside 84 that extends outward radially from the shank 60 to the wrench flats 82. The bolt 52 is arranged about an axis 58, which extends centrally through the shank 60 from the distal end 64 to the proximal end 62 and centrally through the head 80. The axis 58 is the bolt's 52 rotational axis. The external thread 66 is a single start threadform form, with a thread pitch and a thread lead angle. In FIG. 11, numeral 70 represents the external thread's 66 thread pitch, and numeral 72 represents the external thread's 66 thread lead angle 72. The thread pitch 70 is the distance between the adjacent peaks or crests of the external thread 66. The thread lead angle 72 is the angle or thread slope between the external thread's 60 helix and the bolt's 52 central axis 58 in FIGS. 1 and 2. The external thread 66 between the proximal end 62 and the distal end 64 threads conventionally on a matching internal thread of a tapped nut, through-hole, or blind hole.

The nuts 54 and 56 are configured to be received about the shank 60. When the nuts 54 and 56 are received about the shank 60, they are arranged about the axis 58 of rotation. The nut 54 is internally threaded and the nut 56 is not. Other than this difference, the nuts 54 and 56 are identical, the ensuing discussion of nut 54 otherwise applies in every respect to nut 56, and the nuts 54 and 56 share the same reference characters, those of the nut 56 including a prime ("'") symbol for clarity.

Figure 3:
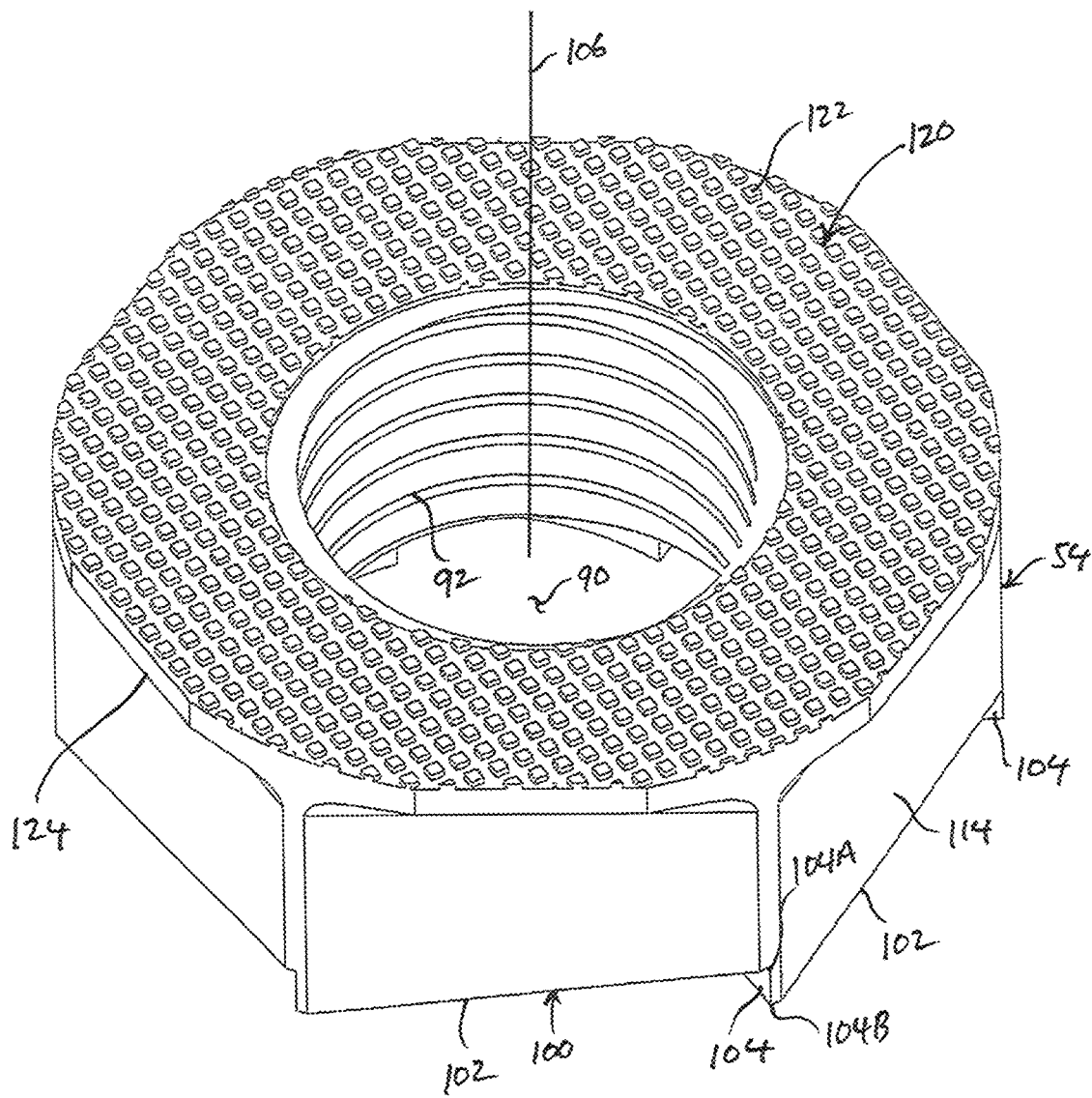
FIG. 3 is a top perspective view of the upper cam locking nut first shown in FIG. 1.
Figure 4:
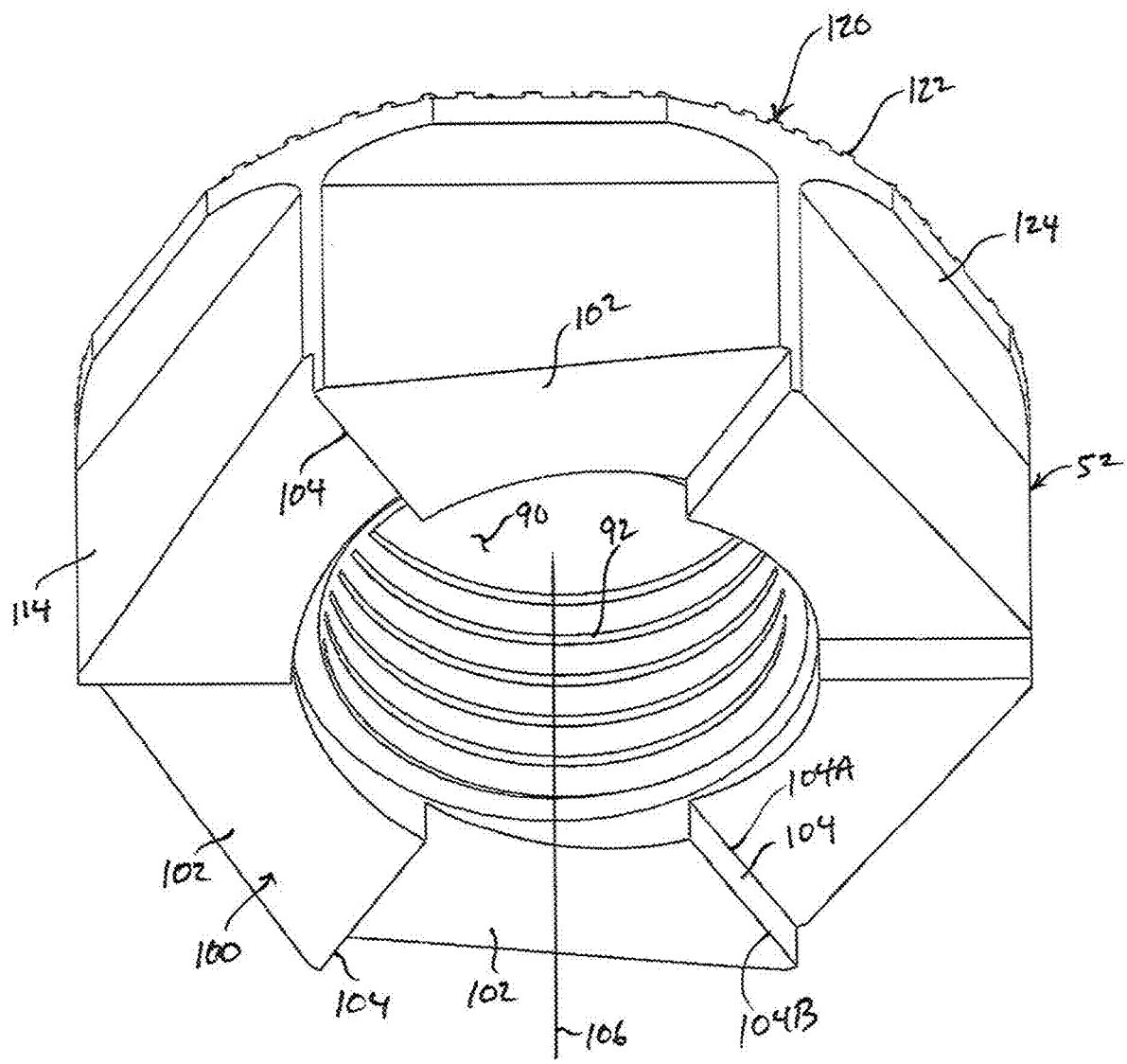
FIG. 4 is a bottom perspective view of the embodiment of FIG. 3.
Figure 5:
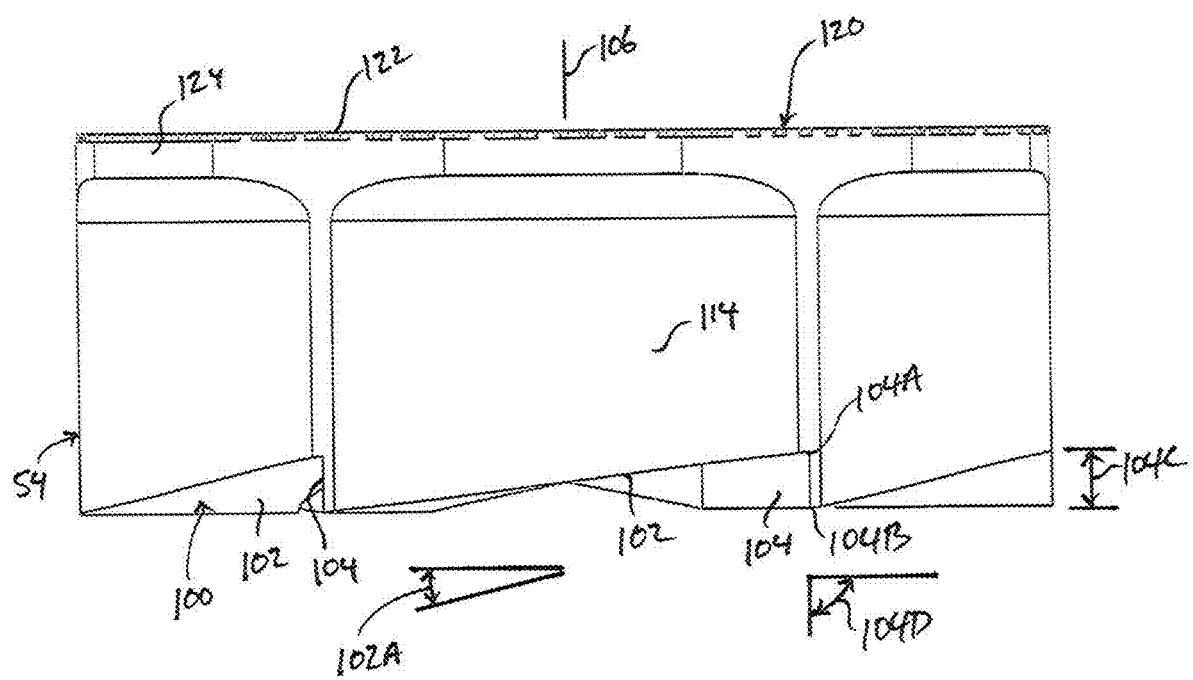
FIG. 5 is a side elevation view of the embodiment of FIG. 3.
Figure 6:
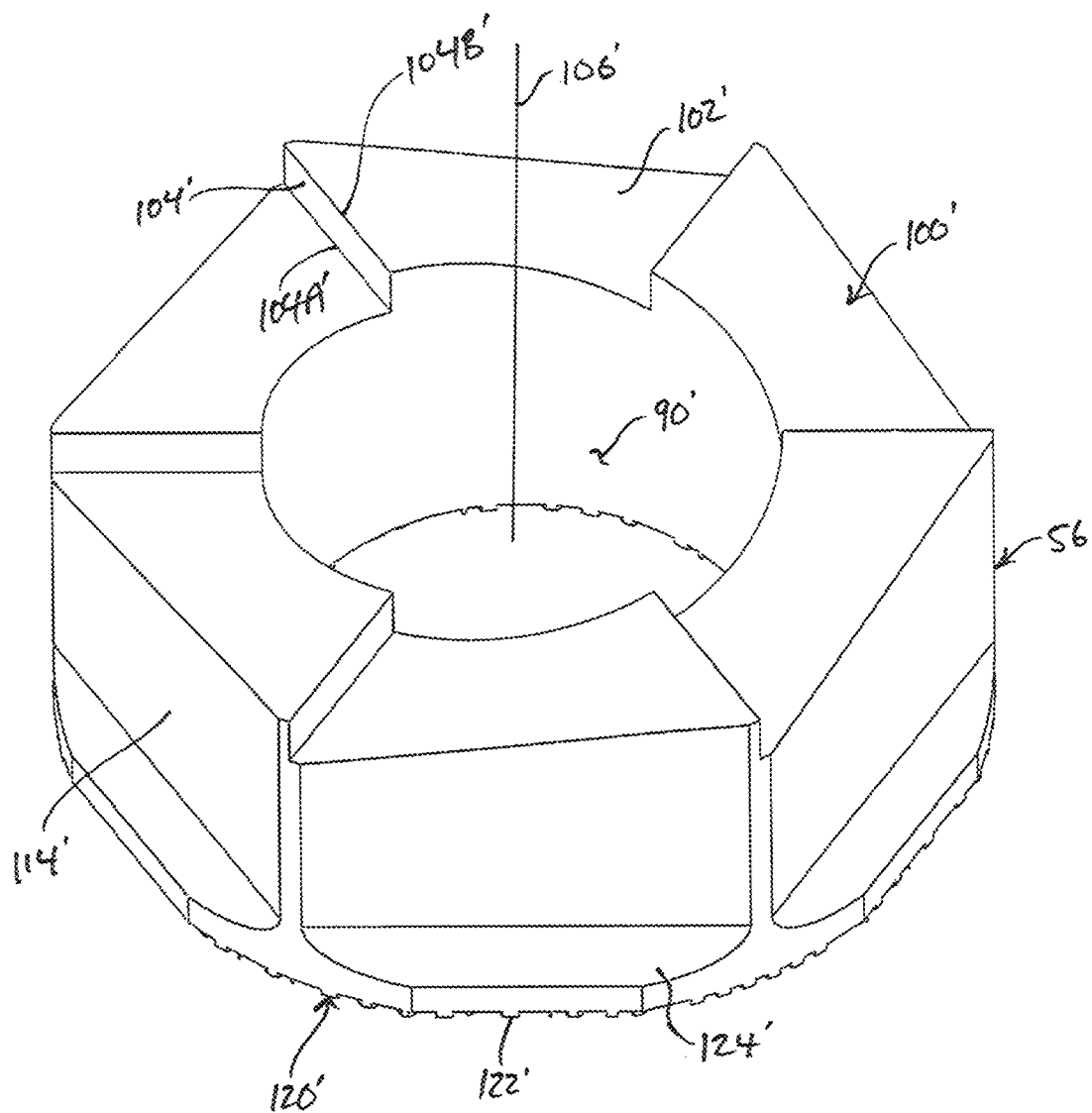
FIG. 6 is a top perspective view of the lower cam locking nut first shown in FIG. 1.
Figure 7:
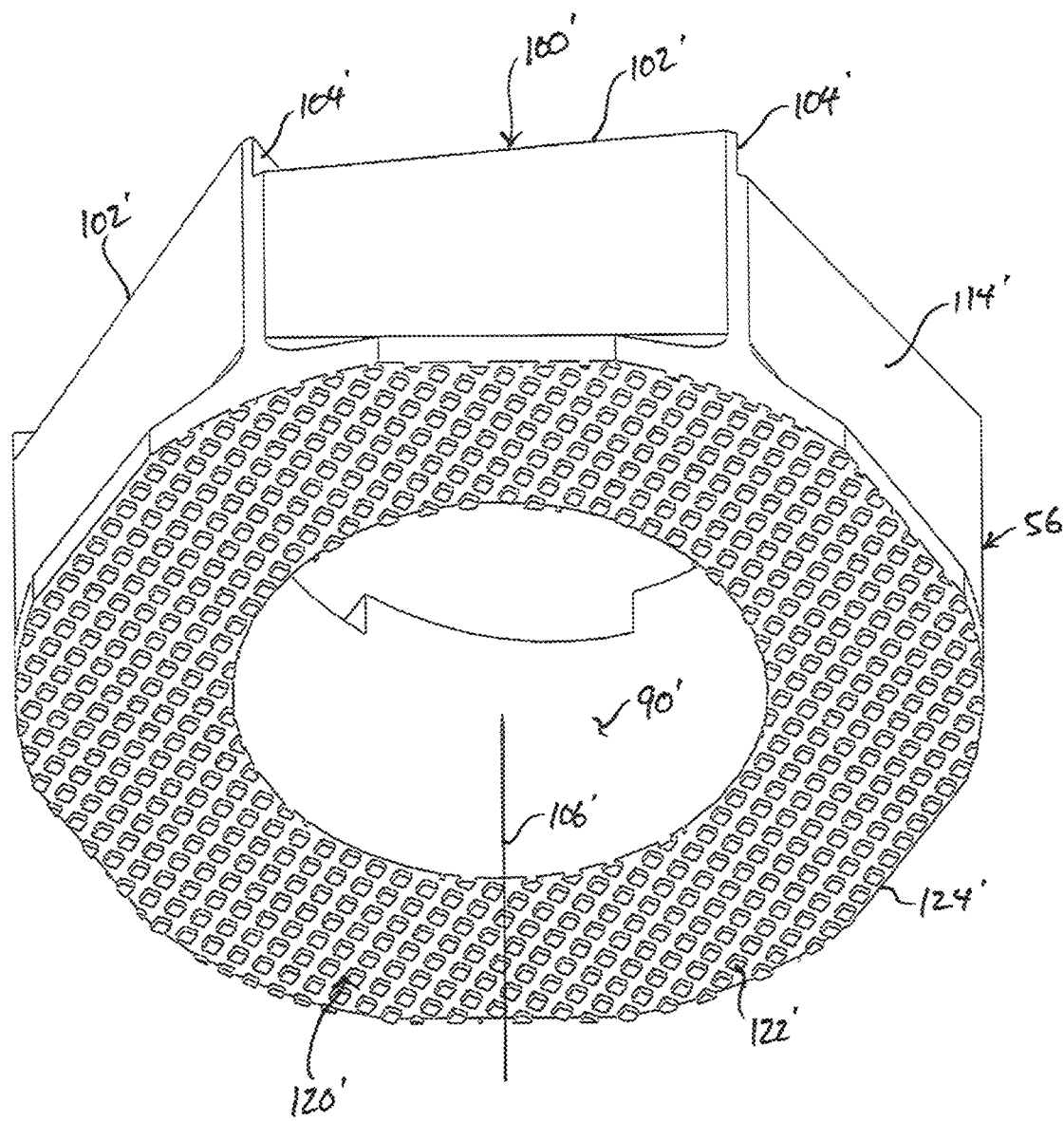
FIG. 7 is a bottom perspective view of the embodiment of FIG. 6.
Figure 8:
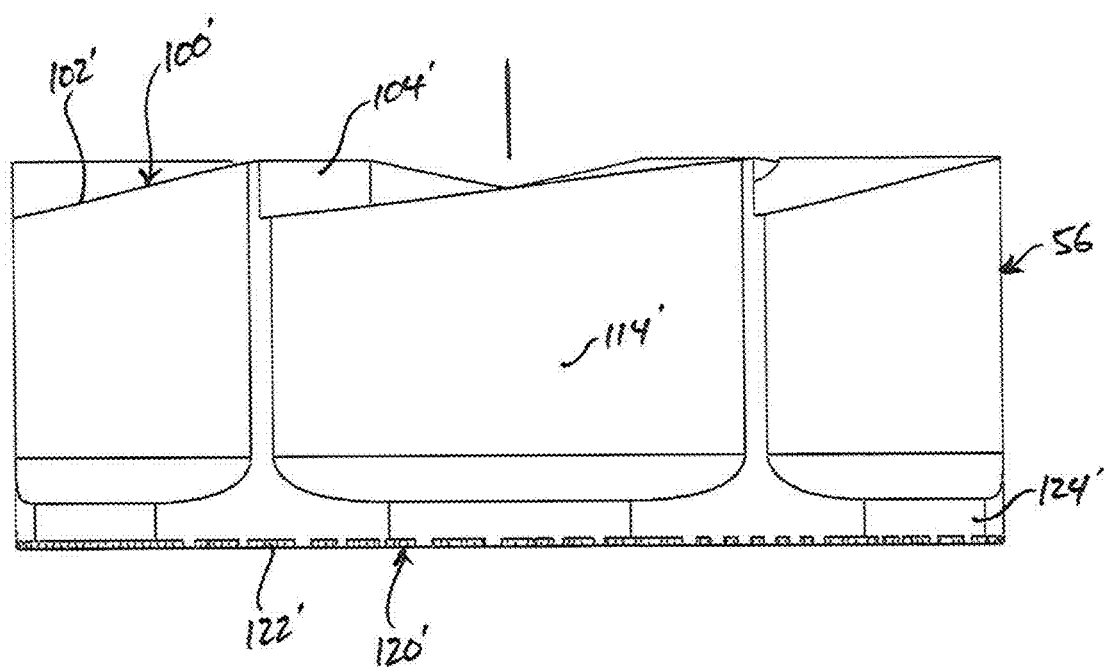
FIG. 8 is a side elevation view of the embodiment of FIG. 6.

Referring to FIG. 3, FIG. 4, and FIG. 5, relevantly, the nut 54 is an annular body or block. It has a hole 90, opposed annular faces 100 and 120, and an axial thickness between its faces 100 and 120. The hole 90 extends through the nut 54 from the face 100 at one end of the nut 54 to the face 120 at the other end of the nut 54. The hole 90 is internally threaded by an internal thread 92 adapted to thread on the bolt's 52 matching external thread 66. The nut 54 is arranged about axis 106, extending centrally through the threaded hole 90 from face 100 to face 120. The axis 106 is the nut's 54 rotational axis.

Face 100 is a cam face. It is the nut's 54 cam interface. It is a surface configuration or profile consisting of a contour defined by an uninterrupted circumferential succession of wedges configured to counteract rotary loosening of the bolt 52. The wedges include interconnected ramps 102 and shoulders 104. The number of ramps 102 equals the number of shoulders 104. The circumferential succession of shoulders 104 connect the circumferential succession of ramps 102. Each ramp 102 inclines between adjacent shoulders 104. The shoulders 104 are right angle axial shoulders in this embodiment. Accordingly, the shoulders 104 connect the ramps 102 at right angles. The wedges are identical in every respect, in which the ramps 102 are identical in every respect, and the shoulders 104 are identical in every respect.

Each shoulder 104 has a root or base 104A, a crest 104B, and a rise or axial thickness extending along a slope angle from the base 104A to the crest 104B. In FIG. 5, numeral 104C represents the rise of each shoulder 104. The rise 104C of each shoulder 104 is greater than the thread pitch 70, preferably at least double the thread pitch 70. Numeral 104C also represents to the rise or axial thickness of each of the nut's 56 shoulders 104'. The slope angle of each shoulder 104 is the angle it makes along its rise from its base 104A to its crest 104B with respect to an imaginary radial plane extending normal to the nut's 54 axis 106 and the axis 58 of the bolt 52 when the nut 54 is received about the bolt's 52 shank 60. In FIG. 5. numeral 104D represents to the slope angle of each shoulder 104. The slope angle 104D of each shoulder 104 is, in this embodiment, ninety-degrees, perpendicular to the imaginary radial plane extending normal to the nut's 54 central axis 106 and the axis 58 of the bolt 52 when the nut 54 is received about the bolt's 52 shank 60. Numeral 104D also represents to slope angle of each of the nut's 56 shoulders 104'. The crest 104B of each shoulder 104 is sharp and can be rounded or blunted in alternate embodiments.

Each ramp 102 is flat and extends between the base 104A of one shoulder 104 and the crest 104B of an adjacent shoulder 104. Each ramp 102 inclines at a slope angle from the base 104A of one shoulder 104 to the crest 104B of an adjacent shoulder 104. The length of each ramp 102 from the base 104A of one shoulder 104 to the crest 104B of an adjacent shoulder is an unwind stroke. The slope angle of each ramp 102 is the angle it makes along its length or unwind stroke with respect to the imaginary radial plane extending normal to the nut's 54 axis 106 and the axis 58 of the bolt 52 when the nut 54 is received about the bolt's 52 shank 60. In FIG. 5. numeral 102A represents to the slope angle of each ramp 102. The slope angle 102A of each ramp 102 is an acute angle that is equal to or greater than the external thread's 66 thread lead angle 72. When greater than the external thread's 66 thread lead angle 72, each slope angle 102A is preferably 1.5-3.5 times greater than the external thread's 66 thread lead angle 72. Each slope angle 102A is 8-10 degrees in this example. Numeral 102A also represents to the slope angle of each of the nut's 56 ramps 102'.

The nut 54 has six wedges, namely, six ramps 102 and the same number of shoulders 104. Accordingly, the unwind stroke of each ramp 102 extending from the root or base 104A of one shoulder 104 to the crest 104B of the adjacent shoulder 104 is sixty degrees. The nut 54 can have fewer or more wedges than shown.

In FIG. 3, the face 120 of the nut's 54 annular flange 122 is a gripping face. It consists of projections 124. The projections 124, teeth or serrations, mechanically bite an adjacent surface when compressed thereagainst for locking the nut 54 to the head's 80 annular bearing face 84A to resist slippage therebetween.

In FIGS. 3 and 4, the nut 54 has wrench flats 114, six in this example, for bolt-turn purposes. Faces 100 and 120 extend radially between the threaded hole 90 and the wrench flats 114. Accordingly, the nut's 54 wedges, the circumferential succession of the ramps 102 and the shoulders 104, extend radially between the threaded hole 90 and the wrench flats 114. Each of the nut's 54 wedge relates to one wrench flat 114 as matter of design choice. The nut 43 can have fewer or more wrench flats 114 than shown.

Unlike the nut 54, the nut's 56 hole 90' is without threads and, therefore, not threaded, unthreaded, or otherwise threadless. Accordingly, nut 56 is an unthreaded nut configured to be received about the bolt's 52 shank 60 without threading on the external thread 66.

A user assembles the bolt 52 and the nuts 54 and 56 to form the fastener 50 by inserting the bolt's 52 distal end 64 into the nut's 54 threaded hole 90 from the face 120 in FIGS. 1 and 2 until the external thread 66 proximate to the distal end 64 encounters the nut's 54 internal thread 92. He threads the internal thread 92 on the external thread 66 and advances the nut 54 over the shank 60 in the direction of arrow A in FIGS. 1 and 2 toward the head's 80 underside 84 by rotating the bolt 52 in the direction of arrow B, the tightening direction, and or rotating the nut 54 in the opposite direction, tightening the nut's 54 face 120 directly against the head's 80 annular bearing face 84A in FIGS. 9-12. So installed, the nut 54 is received about the bolt's 52 shank 60. Referring back to FIGS. 1 and 2, he inserts the bolt's 52 distal end 64 into and through the nut's 56 hole 90' from the face 100' and advances the nut 56 over the shank 60 in the direction of arrow A in FIGS. 1 and 2 toward the nut's 54 face 100, inter-engaging the faces 100 and 100' in FIGS. 9-12. The ramps 102 and 102' inter-engage and the shoulders 104 and 104' inter-engage, inter-engaging the nuts 54 and 56, when the faces 100 and 100' inter-engage. So installed, the nut 56 is received about the bolt's 52 shank 60 and inter-engaged with the nut 54. The nuts 54 and 56 so received about the shank 60 are arranged about the axis 58 of rotation, in which the axes 58, 106 and 106' are coincident or otherwise coaxial in the assembled fastener 50. Since the nut 56 is not internally threaded, it is decoupled threadably from the bolt 52.

He threads the bolt's 52 external thread 66 on an internal thread of a tapped nut, through-hole, or blind hole. Rotation of bolt 52 in the direction of arrow B in FIGS. 9 and 10 tightens the nut's 54 face 120 against the head's 80 annular bearing face 84A and pushes the nut's 54 shoulders 104 against the nut's 56 shoulders 104', tightening the nut's 56 face 120' against a surface of a joint member applied over the bolt's 52 shank 60, tightly clamping the nut 54 between the head 80 and the nut 56, and tightly clamping the inter-engaged nuts 54 and 56 between the head's 80 annular bearing face 84A against the nut's 54 face 120 and the nut's 56 face 120' against the surface of joint member applied over the bolt's 52 shank 60. The inter-engaged shoulders 104 and 104' are obstructions that cannot be overridden by rotating bolt 52 in the tightening direction of arrow B because the shoulders 104 and 104' inter-engage at right angles. Accordingly, the rise 104C of each of the shoulders 104 and 104' is greater than the thread pitch 70 of the bolt's 52 external thread 66. The slope angle 102A of each of the ramps 102 and 102' is equal to or greater than the external thread's 66 thread lead angle 72. These conditions aggressively counteract rotary loosening of the bolt 52.

The faces 120 and 120' resist slippage between them and the respective surfaces they engage in the locked fastener 50. The inter-engaged shoulders 104 and 104' cannot be overridden by rotating the bolt 52 in the tightening direction B because they are parallel to the bolt's 52 axis 58 and do not allow it. This allows for aggressive bolt 52 tightening and clamping of the nuts 54 and 56 between the head 80 and the surface of the joint member applied over the bolt's 52 shank 60. Since the components 54 and 56 are nuts, the axial thicknesses of the nuts 54 and 56 allows them to withstand greater loads compared to comparatively thinner washers in a fastener assembly, allowing formation of a tight, aggressive joint using a fastener assembly configured with the nuts 54 and 56. The wrench flats of the respective nuts 54 and 56 allows their gripping or turning to produce the required tightening.

As noted above, the rise 104C of each of the shoulder 104 and 104' is greater than the external thread's 66 thread pitch 70, and the slope angle 102A of each of the ramps 102 and 102' is equal to or greater than the external thread's 66 thread lead angle 72. These conditions aggressively counteract rotary loosening of the bolt 52. Specifically, the inter-engaged ramps 102 and 102' form a holding force. This holding force counteracts rotary loosening of the bolt 52, inasmuch as the nuts 54 and 56 are locked to adjacent surfaces, the face 120 of the nut 54 against the head's 80 annular bearing face 84A and the nut's 56 face 120' against its corresponding surface. The holding force counteracts rotary loosening of the bolt 52 by the inter-engaged ramps 102 and 102', specifically by the slope angle 102A of each of the ramps 102 and 102' exceeding the thread lead angle 72 (FIG. 11) of the bolt's 52 thread 66 and the rise of the ramps 102 and 102', determined by the axial thickness or rise 104C of each of the respective shoulders 104 and 104' the respective ramps 102 and 102' incline to, exceeding the pitch 70 of the bolt's 52 external thread 66. Should the fastener 50 experience a loosening force component, the inter-engaged ramps 102 and 102' resist rotational loosening of the bolt 52 and the nut 54 in the direction of arrow C and counteract or otherwise redirect it in the tightening direction of arrow B inasmuch as the nuts 54 and 56 are locked to adjacent surfaces. Any rotary motion of bolt 52 in the loosening direction of arrow C rotates the nut 54 in the same direction relative to the nut 56, rotationally displacing the nut 54 relative to the nut 56. This rotational displacement of the nut 54 relative to the nut 56 causes the ramps 102 and 102' to slide against each other toward mutually wedged positions in FIG. 12, countering the rotary loosening of the bolt 52, and the shoulder's 104 and 104' to separate, forming gaps 140 therebetween in FIG. 12. Since the nut 56 is not threaded onto the shank 60, the nut 56 and the shank 60 can rotate independently from one another. In response to the inter-engaged ramps 102 and 102' sliding across each other, the distance between the faces 120 and 120' increases, increasing the preload along the bolt's 52 axis 58 resulting from rise and the slope angle of each of the ramps 102 and 102' being greater than the thread pitch 70 and the thread lead angle 72, respectively, of the bolt's 52 external thread 66. The increased distance between the faces 120 and 120' accommodates bolt 52 elongation along the bolt's 52 axis 58. The incline or unwind slope angle 102A of each of the ramps 102 and 102' equal to or greater than the external thread 66 thread lead angle 72, the long unwind stroke of each of the ramps 102 and 102', sixty degrees in this example, and the rise or axial thickness 104C of the shoulders 104 and 104' each of the ramps 102 and 102' incline to greater than the pitch 70 of the bolt's 52 external thread 66 provide suitable unwind resistance along the stroke paths of the inter-engaged ramps 102 and 102', load capacity, and accommodate bolt 52 elongation along the bolt's 52 axis 58, maintaining the locked fastener 50. The gaps 140 that form between the adjacent shoulders 104 and 104' resulting from bolt 52 loosening provide visual confirmation of loosening, allowing a skilled workman to see the loosening and take any needed corrective action. The skilled workman may also measure the gaps 140, such as with a caliper or other measuring device.

Figure 9:
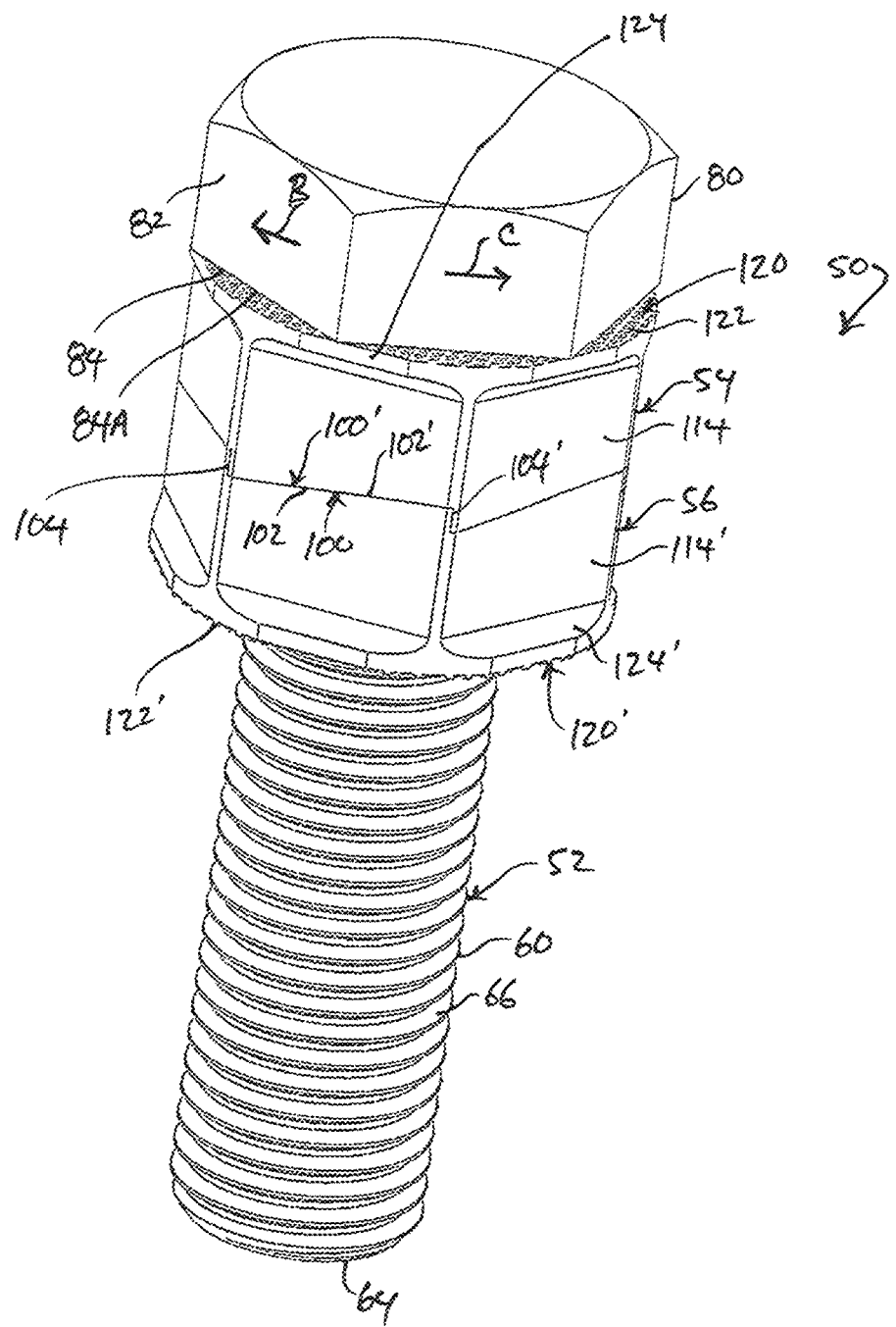
FIG. 9 is a top perspective view showing the embodiment of FIGS. 1 and 2 assembled.
Figure 10:
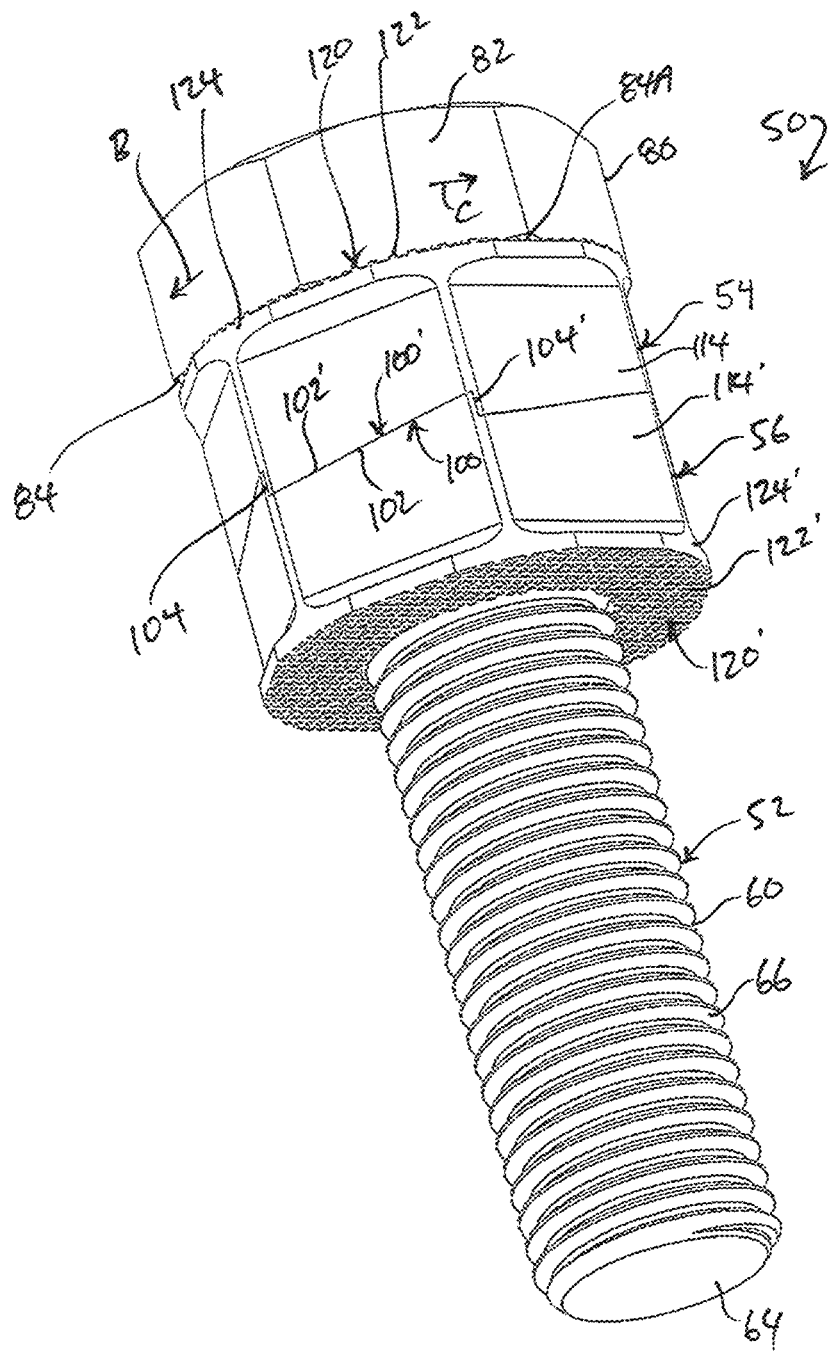
FIG. 10 is a bottom perspective view of the embodiment of FIG. 9.

A user loosens the fastener 50 by forcibly rotating the bolt 52 in the direction of arrow C in FIGS. 9 and 10, the loosening direction. In place of the head 80 there can be a nut threaded over the shank's 60 external thread 66 or another external thread having the same or lesser thread pitch and the same or lesser thread lead angle as the shank's 60 external thread 66.

II.

Figure 13:
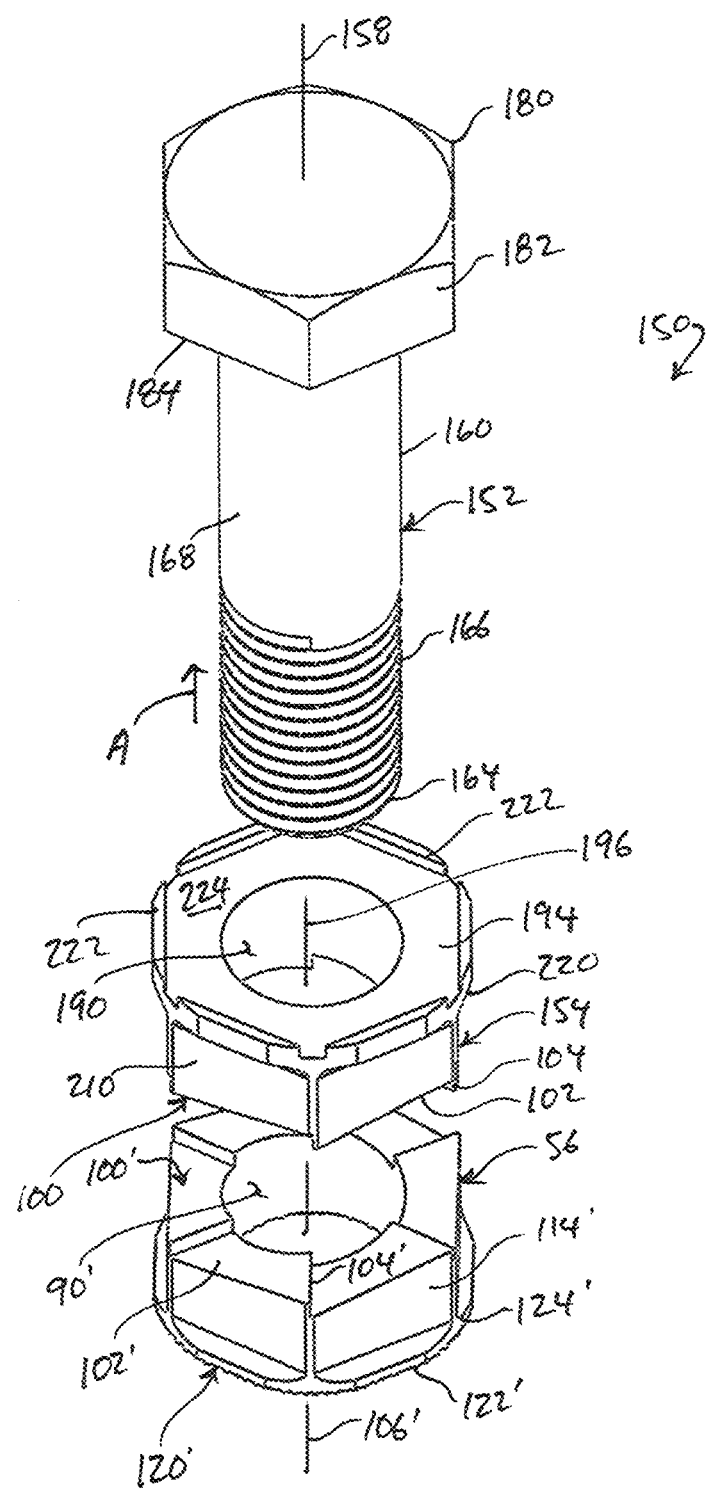
FIG. 13 is a top perspective view of a fastener constructed and arranged according to the invention, the fastener shown disassembled and including a bolt and cam locking nuts, including an upper cam locking nut and a lower cam locking nut.
Figure 14:
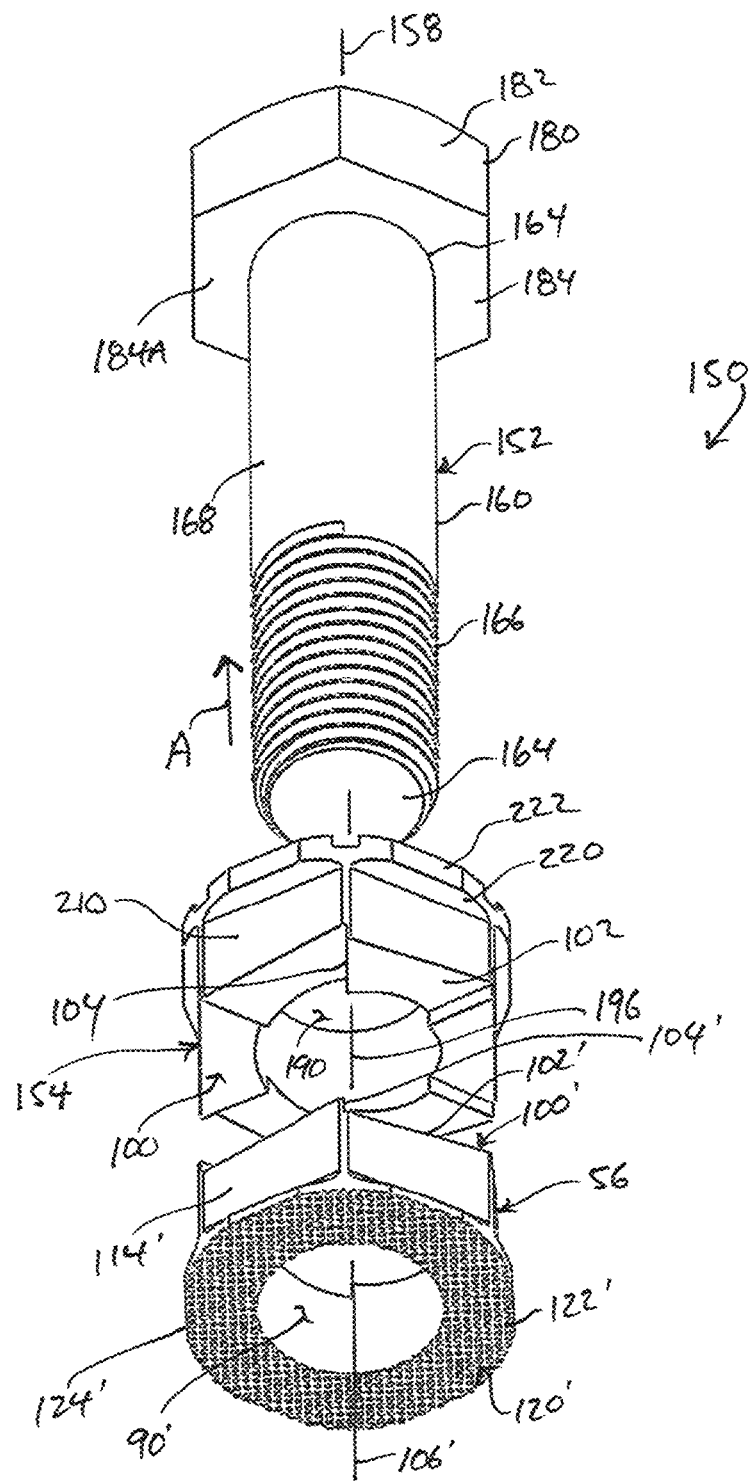
FIG. 14 is a bottom perspective view of the embodiment of FIG. 13.
Figure 15:
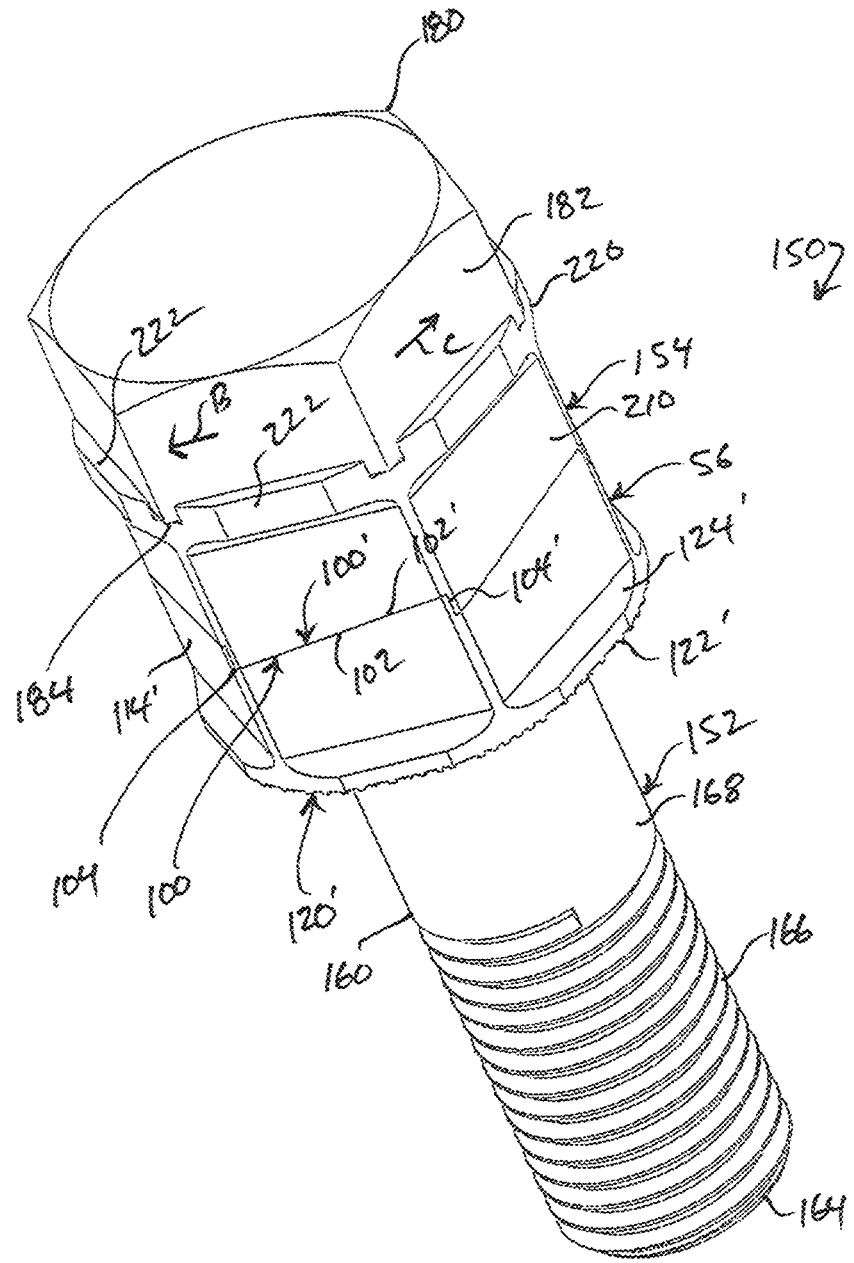
FIGS. 15 and 16 are perspective views showing the embodiment of FIGS. 13 and 14 assembled.
Figure 16:
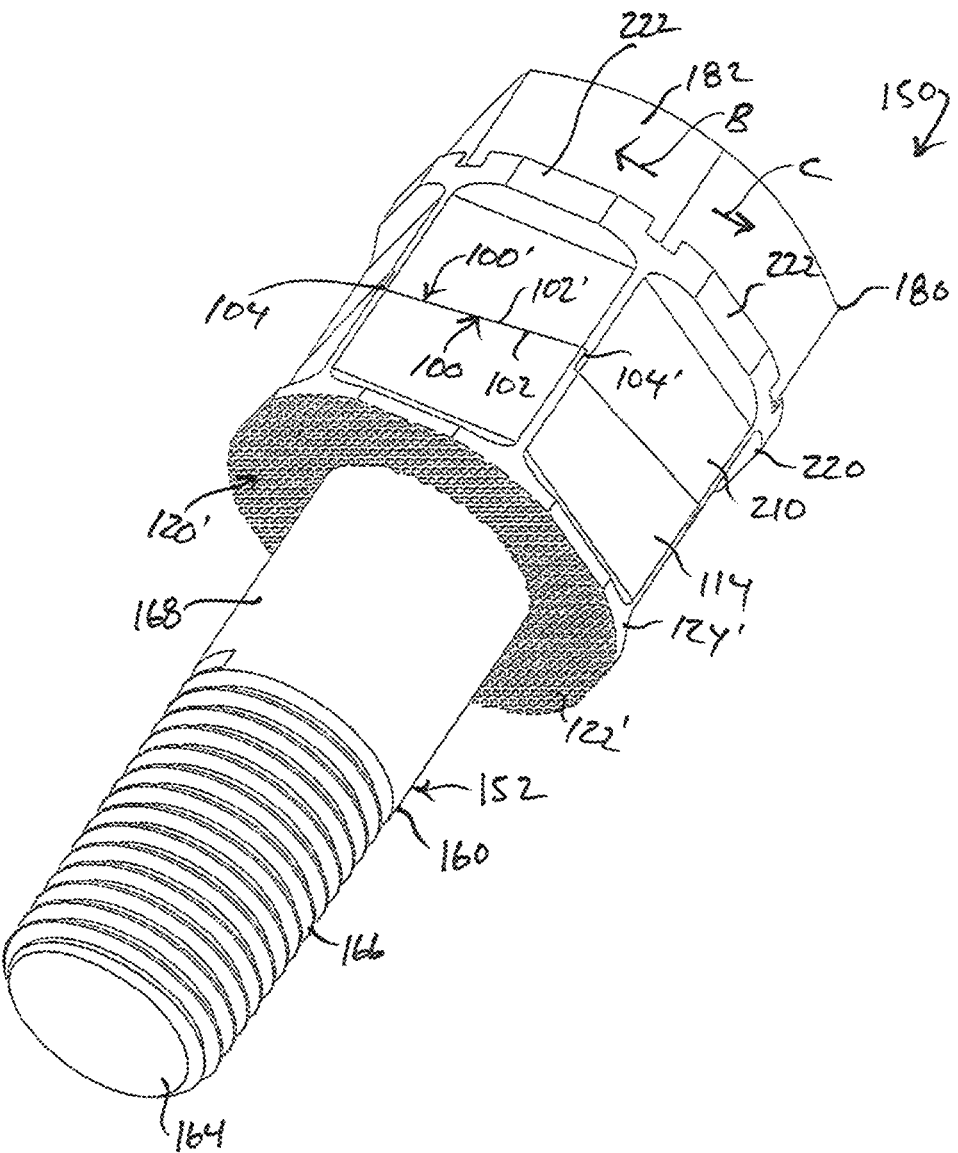

FIGS. 13 and 14 illustrate an alternate embodiment of a fastener 150. The fastener 150 includes a bolt 152 and two cam locking components, namely, a nut 154 and the nut 56 described previously. The nuts 154 and 56, cam locking nuts, are configured to be assembled with the bolt 152 to form the fastener 150.

Figure 17:
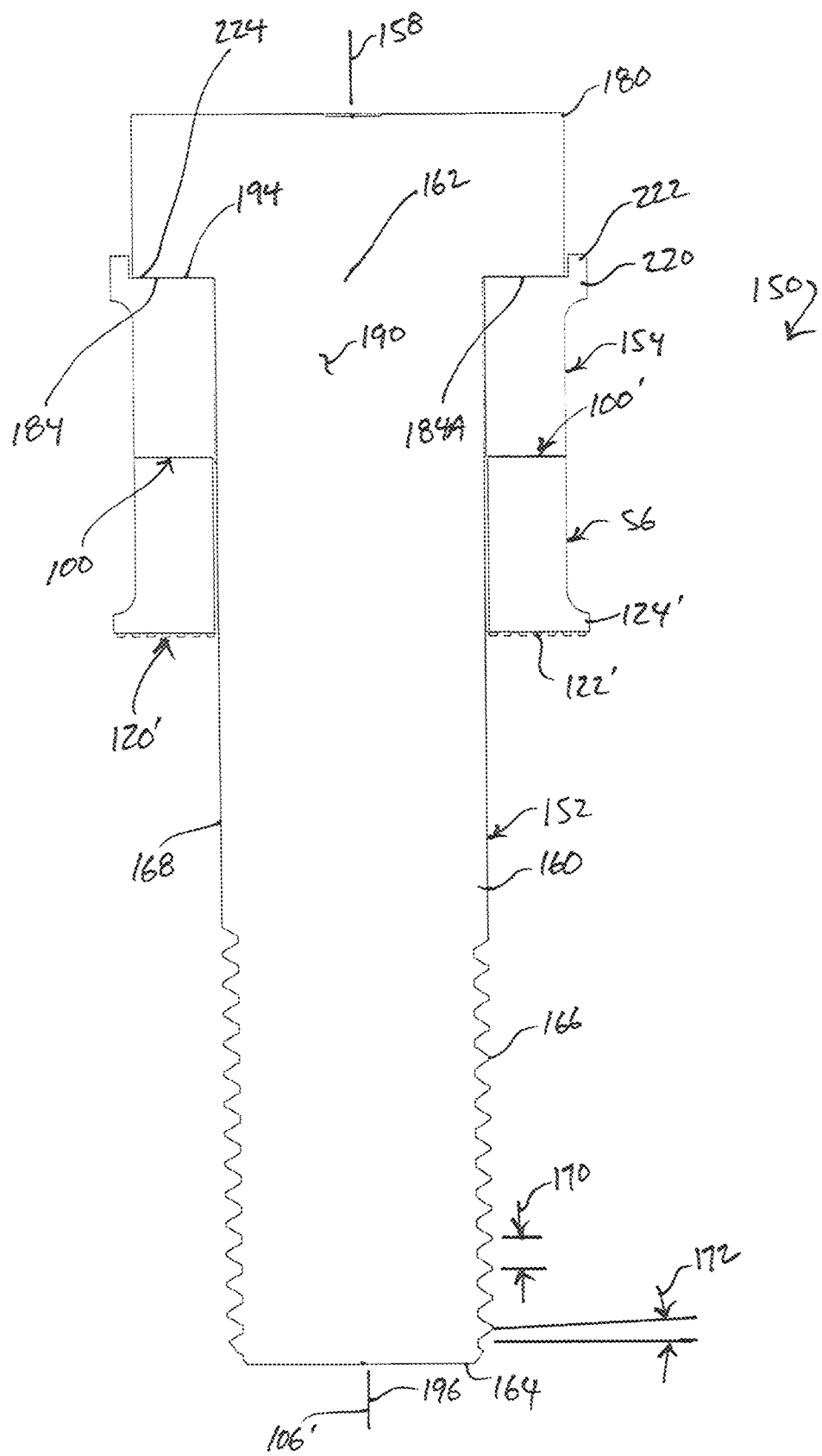
FIG. 17 is a vertical section view of the embodiment of FIGS. 15 and 16.

The bolt 152 is a threaded fastener element. It has a longitudinally straight cylindrical shank 160 extending from a first or proximal end 162, configured with a head 180, to a second or distal end 164. The shank 160 has an external thread 166 and an unthreaded body 168. The external thread 166 extends between the distal end 164 and the unthreaded body 168. The unthreaded body 168 extends between the external thread 166 and the proximal end 162. The head 180 is configured to be driven by a hand or power tool. The head 180 has wrench flats 182, six in this example, for bolt-turn purposes, and an underside 184. The shank 160 extends outward to its distal end 164 from its proximal end 162 affixed centrally to the head's 180 underside 184, forming an annular bearing face 184A of the head's 180 underside 184 extending outward radially from the shank 160 to the wrench flats 182. The bolt 152 is arranged about an axis 158, which extends centrally through the shank 160 from the distal end 164 to the proximal end 162 and centrally through the head 180. The axis 158 is the bolt's 152 rotational axis. In FIG. 17, the external thread 166, a single start threadform, has a thread pitch 170, the distance between the adjacent peaks or crests of the thread 166, and a thread lead angle 172, the angle between the thread's 160 helix and the shank's 160 central axis 158. The bolt's 152 thread pitch 170 and thread lead angle 172 are identical to the bolt's 52 thread pitch 70 and thread lead angle 72, respectively. The external thread 166 between the proximal end 162 and the distal end 164 threads on a matching internal thread of a tapped nut, through-hole, or blind hole. The nuts 154 and 56 are configured to be received about the shank 160 and arranged about the axis 158 of rotation.

Referring to FIG. 13 and FIG. 14, relevantly, the nut 154 is an annular block configured with a hole 190 and opposed annular faces 100 and 194. The hole 190 extends through nut 154 from face 100 at one end of the nut 54 to face 194 at the other end of the nut 154. The nut 154 is arranged about axis 196, extending centrally through the threaded hole 190 from face 100 to face 194. The axis 196 is the nut's 154 rotational axis. The nut 154 has an axial thickness between its faces 100 and 194, which is the same as the nut's 56 axial thickness between its faces 100' and 120'. The face 100 is the cam face described above with nut 54, including the interconnected ramps 102 and shoulders 104. The hole 190 is without threads and, therefore, not threaded, unthreaded, or otherwise threadless. Accordingly, the nut 154, like the nut 56, is an unthreaded nut configured to be received about the shank 160 and arranged about the axis 158 of rotation. While the hole 190 is configured to be received over the bolt's 152 shank 160, its lack of threads means it cannot thread on the external thread 166. The nut 154 has wrench flats 210, six in this example, for bolt-turn purposes. The face 194 of the nut's 154 annular flange 220 extends radially outward from the hole 190 to a circumferential succession of profiles 222. The profiles 222 relate to the wrench flats 210, and project upright or otherwise outward from the face 194. The profiles 222 are identical in every respect, being the same size and the same shape, and correspond in position and number to the wrench flats 210. The face 194 and the profiles 222 form a socket 224 in FIG. 13. The socket 224 profile and the head 180 profile are shaped correspondingly, allowing the socket 224 to accept and hold the head 180.

A user assembles the bolt 152 and the nuts 154 and 56 to form the fastener 150 by inserting the bolt's 152 distal end 164 into and through the nut's 154 hole 190 from the face 194. He advances the nut 154 over the shank 160 in the direction of arrow A in FIGS. 13 and 14 toward the head's 180 underside 184. He aligns the socket 224 with the head 180 and bringing the nut's 154 face 194 into direct contact against the head's 180 annular bearing face 184A so the profiles 222 extend upright in juxtaposition along the respective wrench flats 182 in FIGS. 15-18, situating the head 180 in the socket 224. Reception of the head 180 in the socket 224 inherently disable relative rotation between the head 180 and the nut 154 due to the shape of the socket 224 corresponding to the shape of the head 180. So installed, the nut 154 is received about the bolt's 152 shank 160. He installs the nut 56 by inserting the bolt's 152 distal end 164 into and through nut's 56 hole 90' from face 100' and advances the nut 56 over the shank 160 in the direction of arrow A in FIGS. 13 and 14 toward the nut's 154 cam face 100, inter-engaging the faces 100' and 100 so the ramps 102 and 102' inter-engage and the shoulders 104 and 104' inter-engage, inter-engaging the nuts 154 and 56 in FIGS. 15-18. So installed, the nut 56 is received about the bolt's 152 shank 160 and inter-engaged with the nut 154. The nuts 154 and 56 so received about the shank 160 are arranged about the axis 158 of rotation, in which the axes 158, 106', and 196 are coincident or otherwise coaxial in the assembled fastener 150.

He threads the bolt's 152 external thread 166 on an internal thread of a tapped nut, through-hole, or blind hole. Further rotation of bolt 152 in the tightening direction of arrow B in FIGS. 13-16 tightens the nut's 154 face 194 against the head's 180 annular bearing face 184A, pushes the nut's 154 shoulders 104 against the nut's 56 shoulders 104', and tightens the nut's 56 face 120' against a surface of joint member applied over the bolt's 152 shank 160 until the nut 154 is tightly clamped between the head 180 and the nut 56 and the inter-engaged nuts 154 and 56 are tightly clamped between the head's 180 annular bearing face 184A against the nut's 154 face 194 and the nut's 56 face 120' against the surface of joint member applied over the bolt's 152 shank 160. The socket 224 resists slippage between the head 180 and nut 154, disabling the head 180, and thus the bolt 152, from rotating relative to the nut 154 in the locked fastener 150. The face 120' resists slippage between it and the surface it engages and is tightened against in the locked fastener 150. The wrench flats of the respective nuts 154 and 56 allows their gripping or turning to produce the required tightening in the same way as the nuts 54 and 56 in fastener 50.

Figure 18:
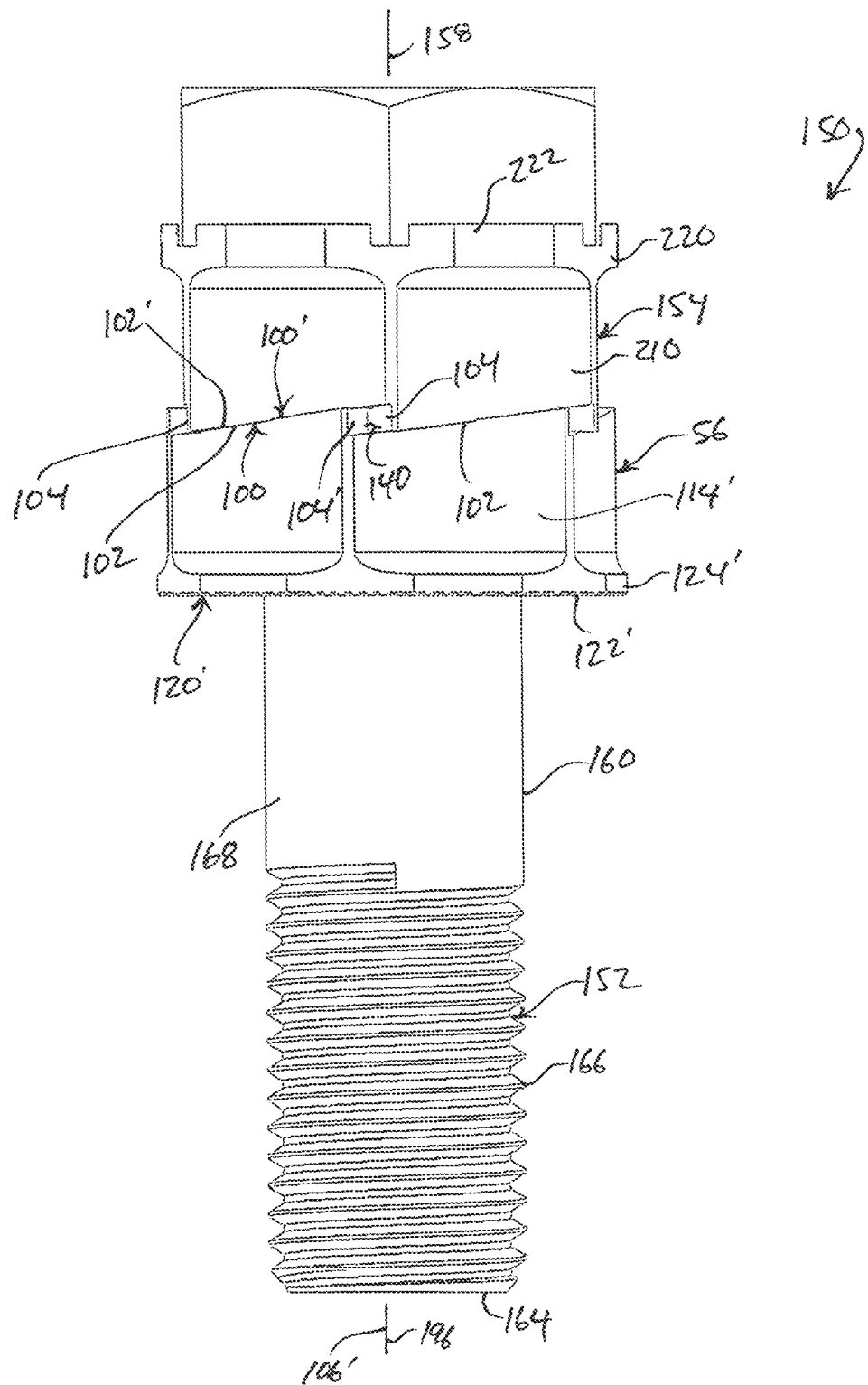
FIG. 18 is a side elevation view of the embodiment of FIGS. 15 and 16, showing the upper and lower cam locking nuts displaced rotationally relative to each other.
Figure 19:
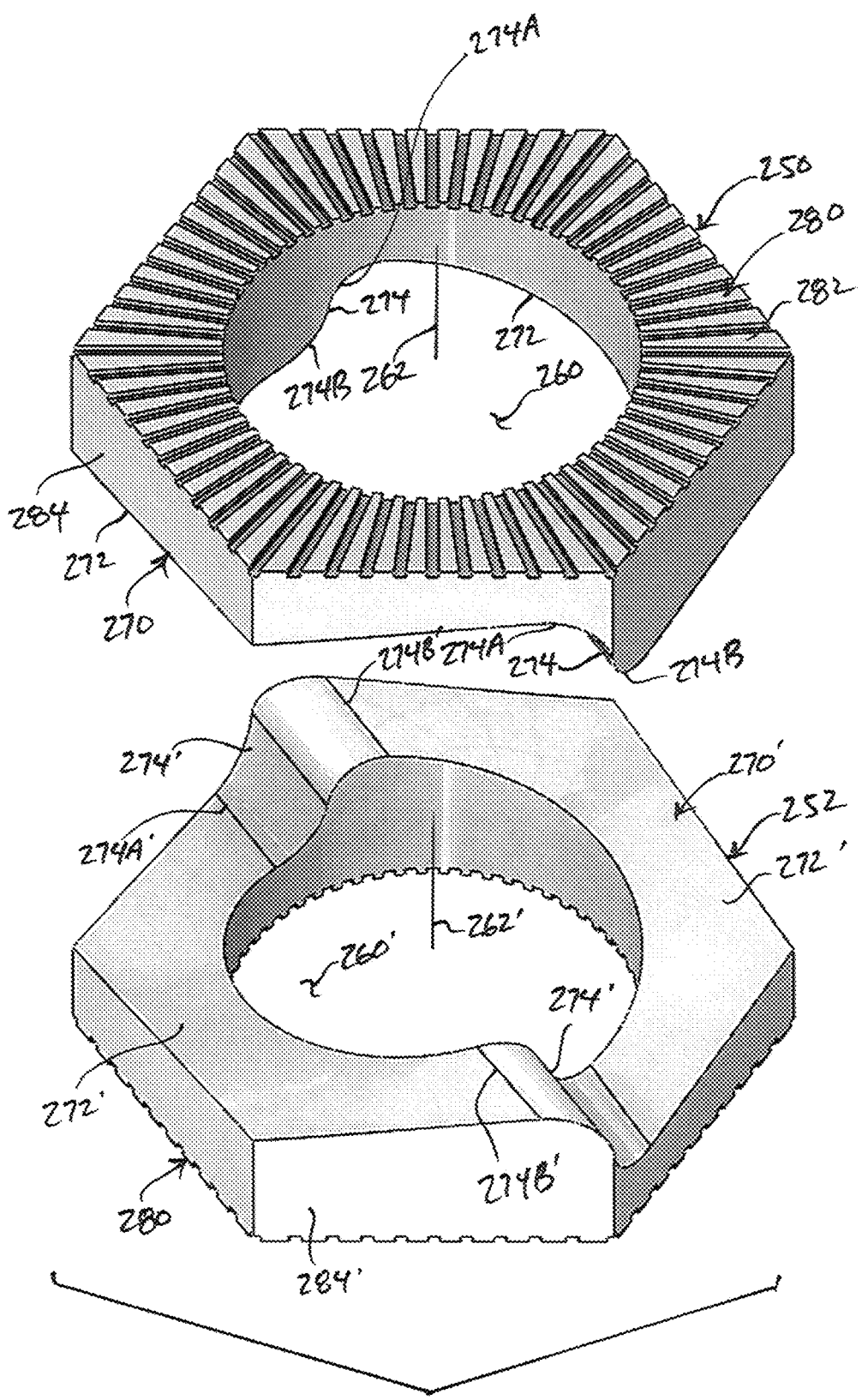
FIGS. 19 and 20 are perspectives view of cam locking washers constructed and arranged according to the invention, the cam locking washers shown separated from one another.
Figure 20:
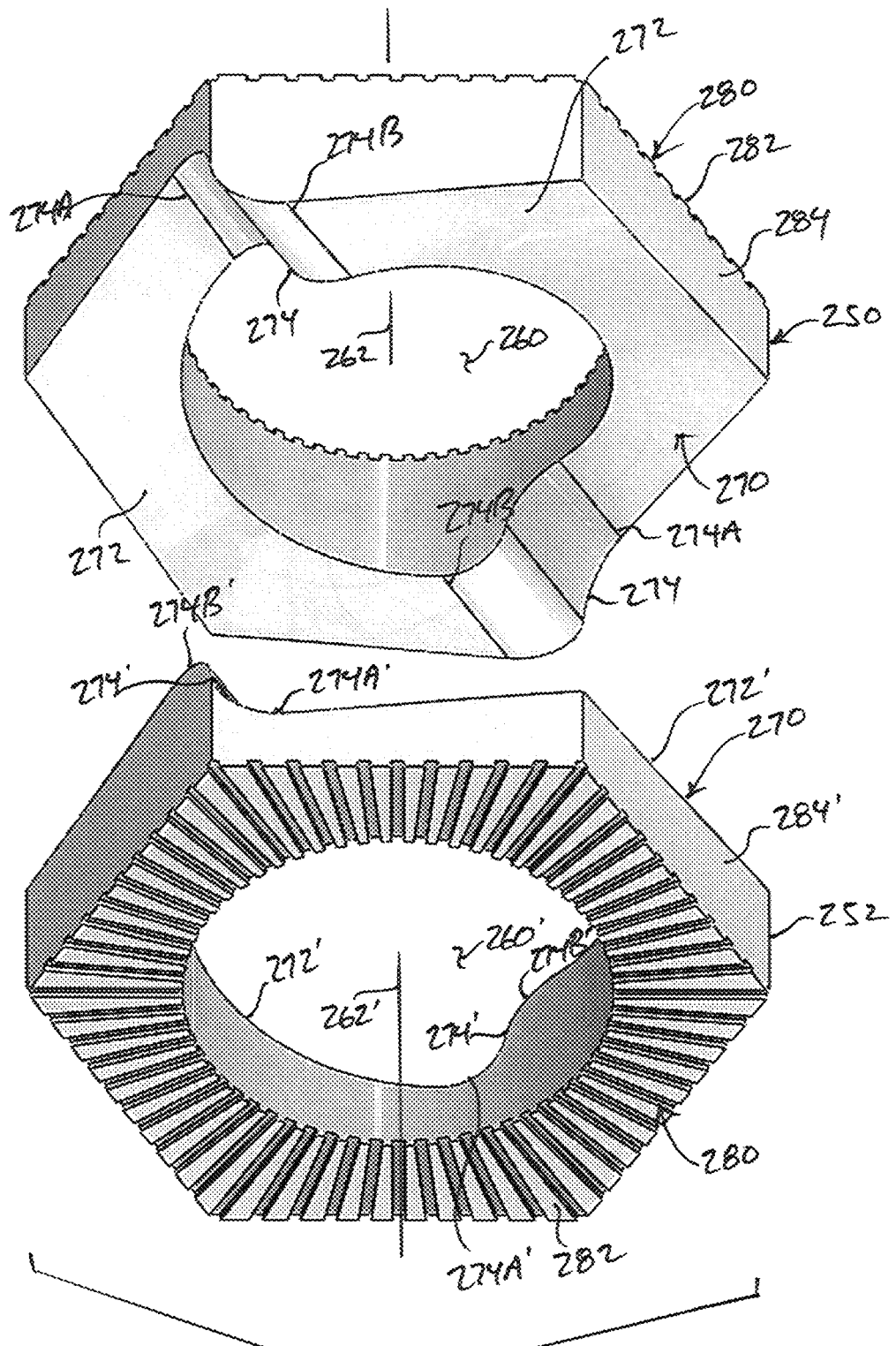

The inter-engaged cam interfaces of the nuts 154 and 56, the inter-engaged ramps 102 and 102' and the inter-engaged shoulders 104 and 104', work identically to the inter-engaged cam interfaces of the nuts 54 and 56 in fastener 50. As a matter of illustration and reference, FIG. 18 shows the gaps 140 that form between the adjacent shoulders 104 and 104' resulting from bolt 152 loosening. A user loosens the fastener 150 simply by forcibly rotating the bolt 152 in the direction of arrow C in FIGS. 15 and 16, the loosening direction. Since neither the nut 154 nor the nut 56 are internally threaded, they are decoupled threadably from the bolt 162.

The bolt's 152 head 180 can have fewer or more wrench flats 182 than shown. The nut 154, in turn, can have a corresponding lesser or greater number of wrench flats 210. The nut 154 can also have a corresponding lesser or greater number of profiles 222 than shown depending on the number of the head's 180 wrench flats 182, so as to match the socket 224 to the head 180. The socket 224 profile can be appropriately chosen to correspond to the profile of the head of the threaded fastener element to prevent relative rotation between head and the socket when the head is received by the socket. In place of the head 180 there can be a nut threaded over an external thread of the shank 60 having the same or lesser thread pitch and the same or lesser thread lead angle as the shank's 160 external thread 166.

III.

Figure 27:
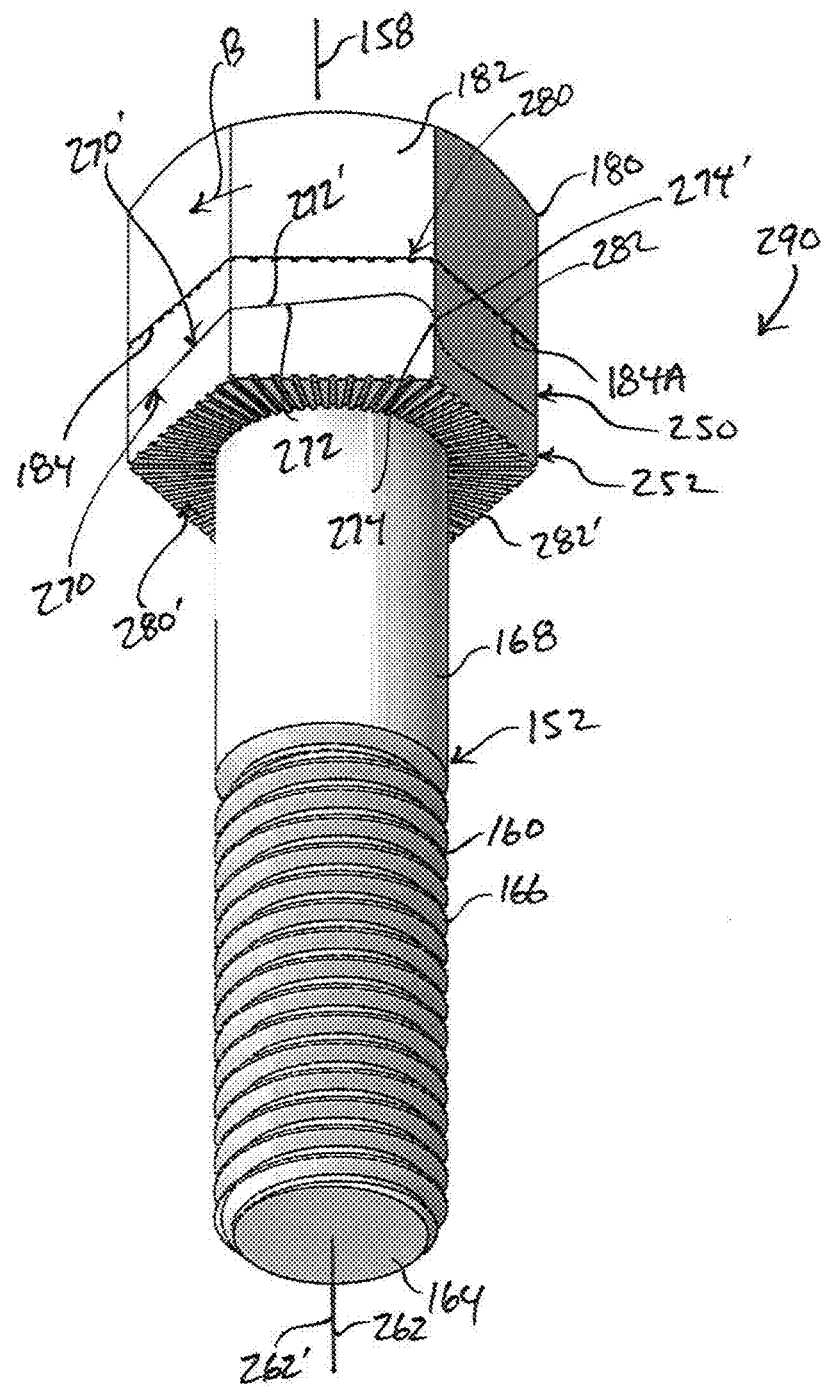
FIG. 27 is a perspective view showing the embodiment of FIG. 26 assembled.

FIGS. 19-22 illustrate cam locking components configured to be assembled with a threaded fastener element to form a fastener, such as with bolt 152 to form a fastener 29 in FIG. 27. The locking components are identical and are cam locking washers 250 and 252, each configured to be received about the shank of the threaded fastener element, in this example the shank 160 of the bolt 152 in FIG. 27. Accordingly, the ensuing discussion of washer 250 applies in every respect to washer 252 and they share the same reference characters, those of the washer 252 including a prime ("'") symbol for clarity.

Referring to FIGS. 19-22, relevantly, the washer 250 has a hole 260, opposed annular faces 270 and 280, and an axial thickness between its faces 270 and 280. The hole 260 extends through the washer 250 from the face 270 at one end of the washer 250 to the face 280 at the other end of the washer 250. The hole 260 is without threads and, therefore, not threaded, unthreaded, or otherwise threadless. Accordingly, the washer 250 is an unthreaded washer. While the hole 260 is configured to be received over the bolt's 152 shank 160, its lack of threads means it cannot and does not thread on the bolt's 152 external thread 166. The washer 250 is arranged about axis 262 extending centrally through the hole 260 from face 270 to face 280.

Face 270 is a cam face. It is the nut's 250 cam interface. It is a surface configuration or profile consisting of an uninterrupted contour defined by circumferential succession of wedges configured to counteract rotary loosening of a threaded fastener element. The wedges include interconnected ramps 272 and shoulders 274. There are two ramps 272 and the same number of shoulders 274. The shoulders 274 connect the ramps 272 at acute angles. The acute angles are steep. The wedges are identical in every respect, in which the ramps 272 are identical in every respect, and the shoulders 274 are identical in every respect.

Figure 21:
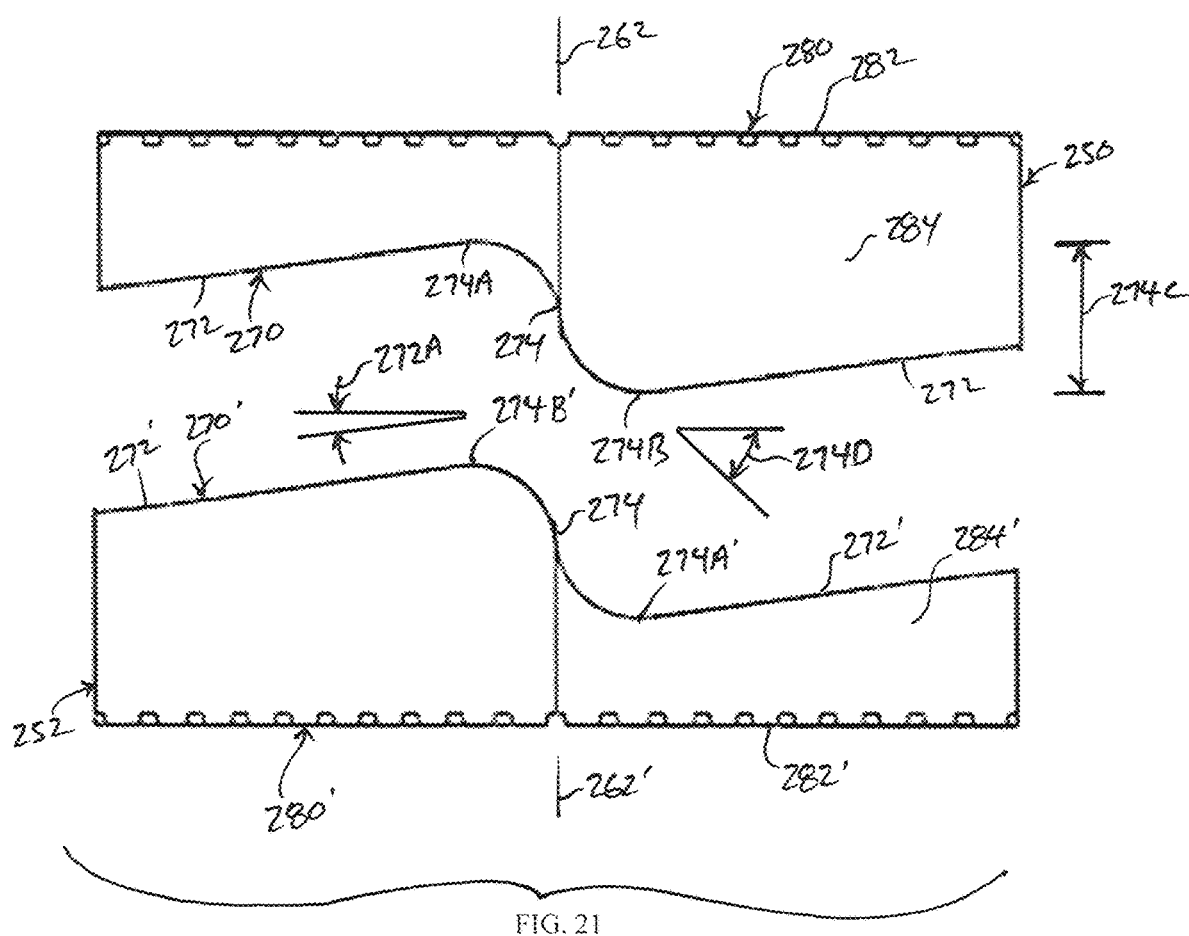
FIGS. 21 and 22 are opposite side elevation views of the embodiment of FIGS. 19 and 20, showing how the opposite side elevation views are the same.
Figure 22:
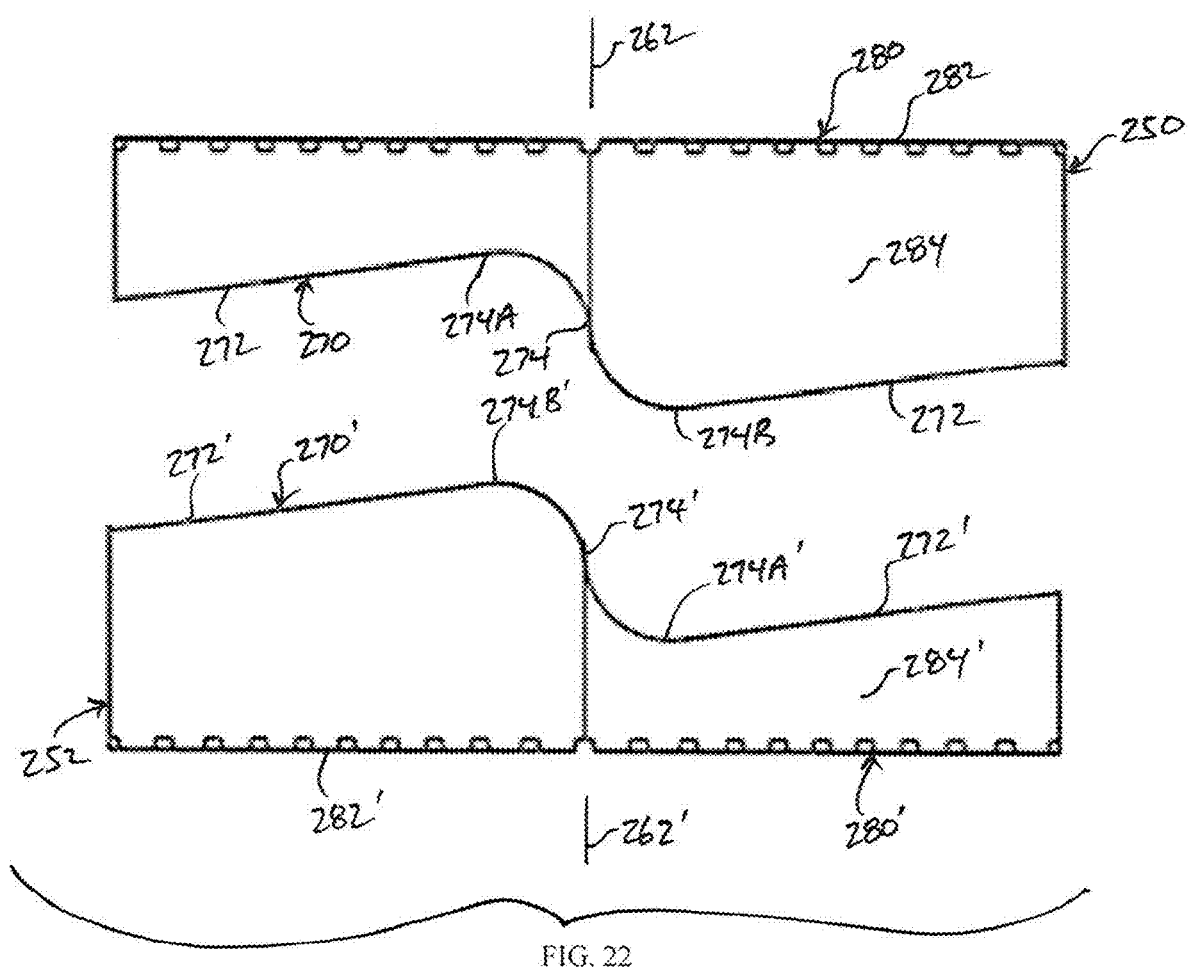

Each shoulder 274 has a base 274A, a crest 274B, and a rise or axial thickness extending along a slope angle from the base 274A to the crest 274B. Each shoulder 274 is rounded inwardly proximate to the base 274A, forming a fillet radius proximate to the base 274A. Each shoulder 274 is rounded outwardly proximate to the crest 274B. The inwardly rounded profile of each shoulder 274 proximate to the base 274A and the outwardly rounded profile of each shoulder 274 proximate to the crests 274B improves the ease of manufacture. In FIG. 21, numeral 274C represents the rise of each shoulder 274. Numeral 274C also represents to the rise of each of the nut's 252 shoulders 274. The rise 274C of each shoulder 274 is greater than the bolt's 152 thread pitch 170 (FIG. 17), preferably at least double the thread pitch 170. The slope angle of each shoulder 274 is the angle it makes along its rise from its base 274A to its crest 274B with respect to an imaginary radial plane extending normal to the nut's 250 axis 262 and the axis 158 of the bolt 152 when the nut 250 is received about the bolt's 152 shank 160. In FIG. 21, numeral 274D represents to the slope angle of each shoulder 274. The slope angle 274D of each shoulder 274 is, in this embodiment, an acute angle of 40-45 degrees. Numeral 274D also represents to slope angle of each of the nut's 252 shoulders 274'.

Each ramp 272 is flat and extends between the base 274A of one shoulder 274 and the crest 274B of the other shoulder 274. Each ramp 272 inclines at a slope angle from the base 274A of one shoulder 274 to the crest 274B of the other shoulder 274. The length of each ramp 272 from the base 274A of one shoulder 274 to the crest 274B of the other shoulder is an unwind stroke. The slope angle of each ramp 272, i.e. the unwind stroke of each ramp 272, is the angle it makes along its length with respect to the imaginary radial plane extending normal to the nut's 250 axis 262 and the axis 158 of the bolt 152 when the nut 250 is received about the bolt's 152 shank 160. In FIG. 21, numeral 272A represents to the slope angle of each ramp 272. The slope angle 272A of each ramp 272 is an acute angle equal to or greater than the external thread's 166 thread lead angle 172 (FIG. 17). When greater than the external thread's 166 thread lead angle 172, each slope angle 272A is preferably 1.5-3.5 times greater than the external thread's 166 thread lead angle 172 (FIG. 17. Each slope angle 272A is 8-10 degrees in this example. Numeral 272A also represents to the slope angle of each of nut's 252 ramps 272'.

The washer 250 has just two opposed ramps 272 and the same number of opposed shoulders 274. The shoulders 274 are offset 180 degrees from each other. The unwind stroke of each ramp 272 from the base 274A of one shoulder 274 to the crest 274B of the other shoulder 274 is, in this example, 160-170 degrees.

The washer's 250 face 280 is a gripping face, consisting of projections 282. The projections 282, teeth or serrations, mechanically bite an adjacent surface when compressed thereagainst for locking the washer 250 to an annular bearing face, such as the bearing surface 184A of the bolt's 152 head 180 in FIG. 17 to resist slippage therebetween.

The washer 250 has wrench flats 284, six in this example, for bolt-turn purposes. Faces 270 and 280 extend radially between the hole 260 and the wrench flats 284. Accordingly, the washer's 250 wedges, the circumferential succession of ramps two identical ramps 272 and two identical shoulders 274, extend radially between the hole 260 and the wrench flats 284. The nut 250 can have fewer or more wrench flats 284 than shown.

Figure 23:
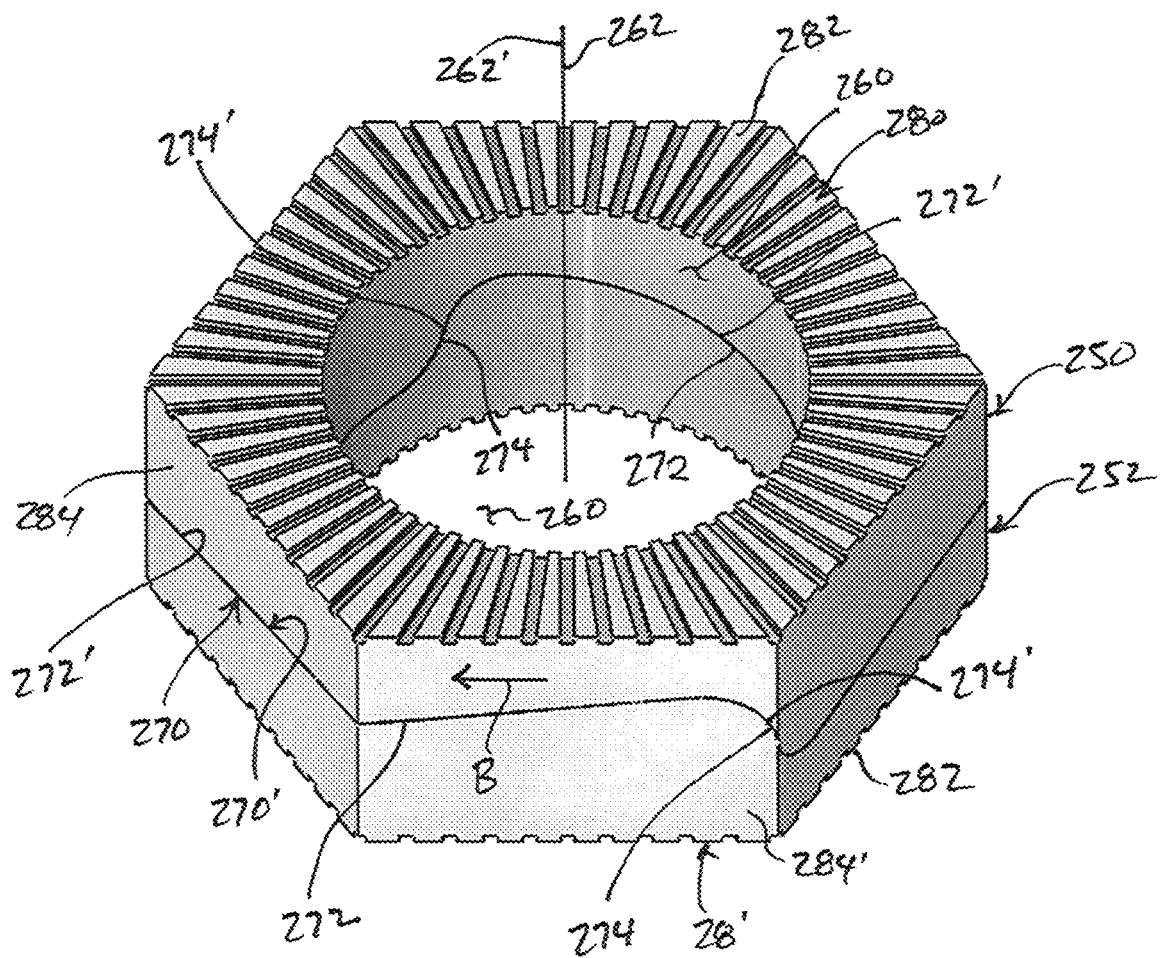
FIG. 23 is a perspective view showing the cam locking washers of FIGS. 19-22 assembled.
Figure 24:
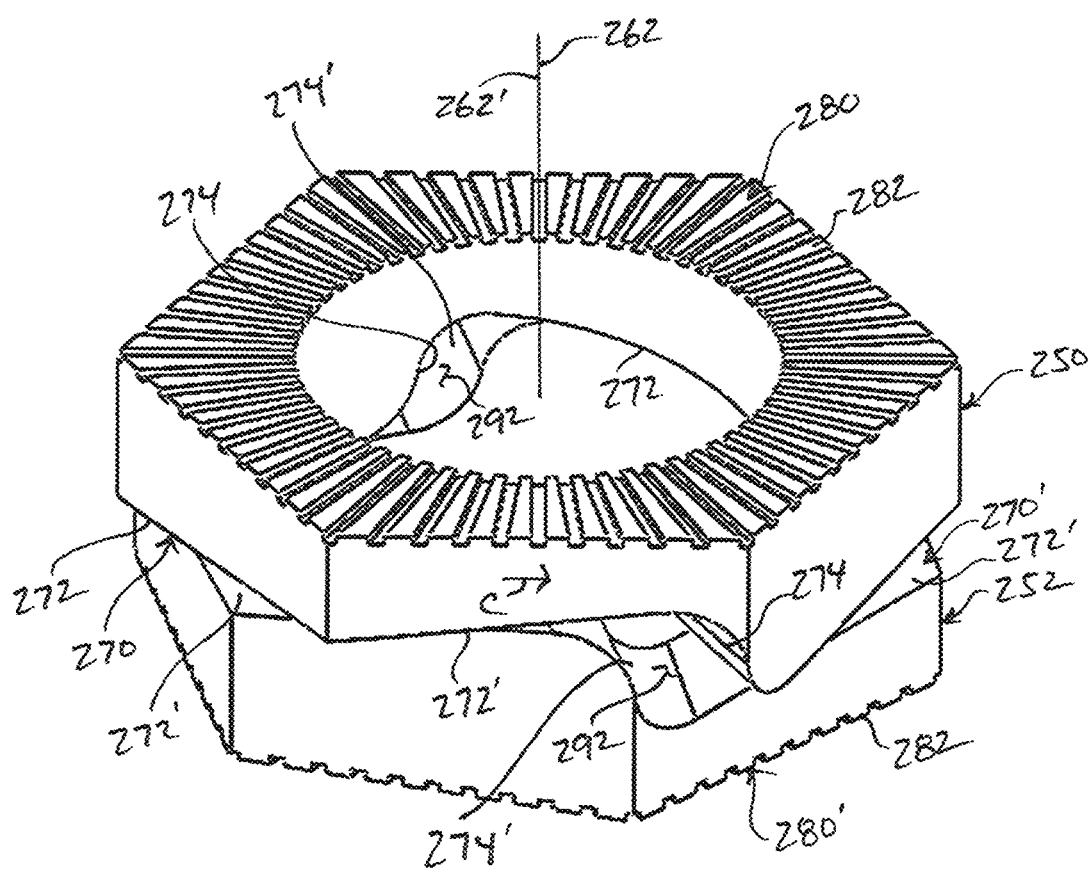
FIG. 24 is a perspective view corresponding to FIG. 23, showing the cam locking washers displaced rotationally relative to each other.
Figure 25:
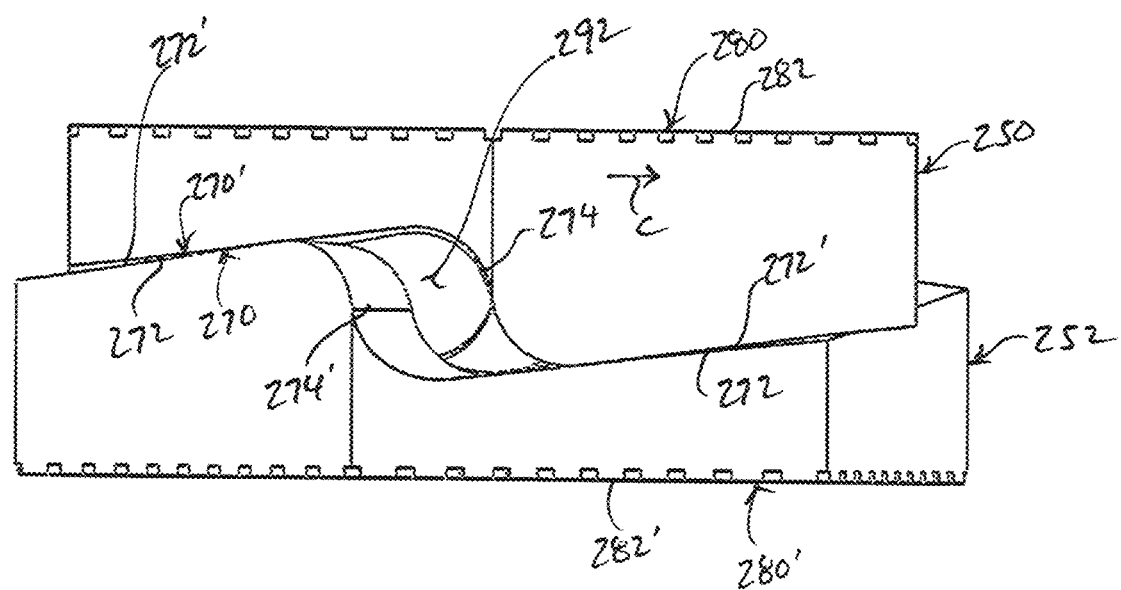
FIG. 25 is a side elevation view of the embodiment of FIG. 24.

The cam interfaces of the washers 250 and 252 are inter-engageable, shown in FIG. 23. A user inter-engages the washers 250 and 252 by facially engaging their faces 270 and 270', inter-engaging them so the ramps 272 and 272' inter-engage and the shoulders 274 and 274' inter-engage. The washers 250 and 252 are arranged about coincident axes 262 and 262' when the washers 250 and 252 are assembled in FIG. 23, the coincident or coaxial axes 262 and 262' constituting a single axis about which the washers 250 and 252 are arranged. The inter-engaged shoulders 274 and 274' resist being overridden by rotating the washer 250 in the tightening direction of arrow B because they are too steep. The inter-engaged ramps 272 and 272' form a holding force which counteracts rotationally loosening. Rotation of the washer 250 in the direction of arrow C in FIGS. 24 and 25 with respect to the washer 252 separates the shoulders 274 and 274', forming gaps 290 therebetween, and causing the ramps 272 and 272' to slide against each other toward mutually wedged positions, increasing the distance between the faces 280 and 280'.

Figure 26:
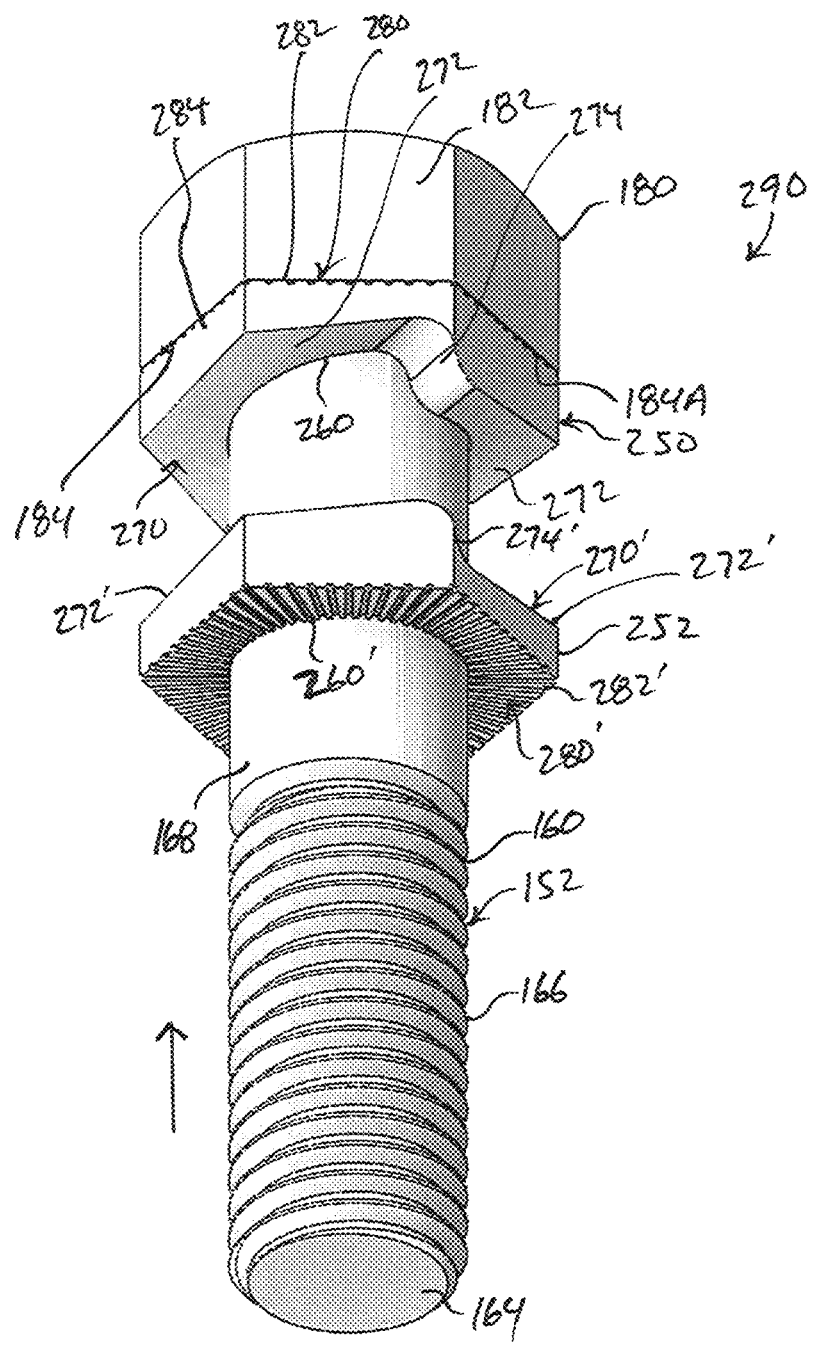
FIG. 26 is a perspective view of a fastener constructed and arranged according to the invention, the fastener shown partially assembled and including a bolt and the cam locking washers first illustrated in FIG. 19.

In FIG. 26, a user assembles the bolt 152 and the washers 250 and 252 to form the fastener 290 in FIG. 27 by inserting the bolt's 152 distal end 164 into the washer's 250 hole 260 from the face 280 and advancing the washer 250 over the shank 160 in the direction of arrow A to bring the washer's 250 face 280 in direct contact against the head's 180 annular bearing face 184A. So installed, the washer 250 is received about the bolt's 52 shank 60. He inserts the bolt's 152 distal end 164 into and through the washer's 252 hole 260' from face 270' and advances the washer 252 over the shank 160 in the direction of arrow A in FIG. 26 toward the washer's 250 face 270, inter-engaging the faces 270 and 270' in FIG. 27. The ramps 272 and 272' inter-engage and the shoulders 274 and 274' inter-engage, inter-engaging the washers 250 and 252, when the faces 270 and 270' inter-engage. The inwardly rounded profile of each of the shoulder 274 and 274' proximate to the base 274A and the outwardly rounded profile of each of the shoulders 274 and 274' proximate to the crest 274B allows the shoulders 274 and 274' to efficiently and easily inter-engage each other. So installed, the washer 250 is received about the bolt's 152 shank 160 and inter-engaged with the nut 252. The nuts washers 250 and 252 so received about the shank 160 are arranged about the axis 158 of rotation, in which the axes 158, 262 and 262' are coincident or otherwise coaxial in the assembled fastener 290.

He threads the bolt's 152 external thread 166 on an internal thread of a tapped nut, through-hole, or blind hole. Rotation of bolt 152 in the direction of arrow B in FIG. 27 tightens the washer's 250 face 280 against the head's 180 annular bearing face 184A and pushes the washer's 250 shoulders 274 against the washer's 252 shoulders 274', tightening the washer's 252 face 280' against a surface of a joint member applied over the bolt's 52 shank 160, tightly clamping the washer 250 between the head 180 and the washer 252, and tightly clamping the inter-engaged washers 250 and 252 between the head's 180 annular bearing face 184A against the washer's 250 face 280 and the washer's 252 face 280' against the surface of joint member applied over the bolt's 152 shank 160.

The faces 280 and 280', gripping faces, resist slippage between them and the respective surfaces they engage in the fastener 290. The inter-engaged shoulders 274 and 274' resist being overridden by rotating the bolt 152 in the tightening direction B because they are too steep relative to the bolt's 152 axis 158 and do not allow it. This allows aggressive bolt 152 tightening and clamping of the washers 250 and 252 between the head 180 and the surface of the joint member applied over the bolt's 152 shank 160.

Figure 28:
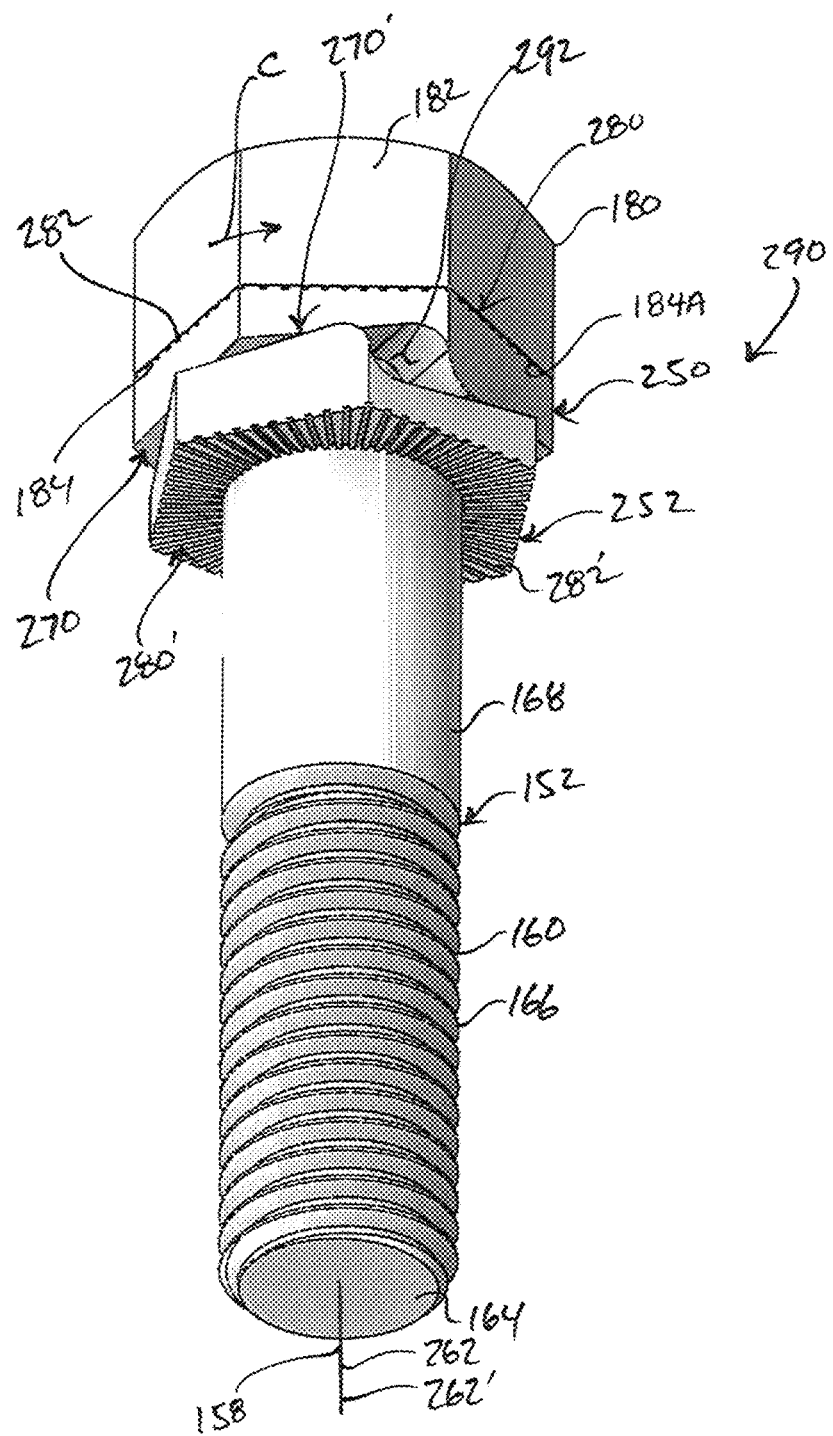
FIG. 28 is a perspective view corresponding to FIG. 27, showing the cam locking washers displaced rotationally relative to each other.

The rise 274C of each of the shoulders 274 and 274' being is than the thread pitch 170 (FIG. 17). The slope angle 272A of each of the ramps 272 and 272' is equal to or greater than the external thread's 166 thread lead angle 172 (FIG. 17). These conditions counteract rotary loosening of the bolt 152. Specifically, the inter-engaged ramps 272 and 272' form a holding force. This holding force counteracts rotary loosening of the bolt 152, inasmuch as the washers 250 and 252 are locked to adjacent surfaces, the face 280 of the washer 252 against the head's 180 annular bearing face 184A and the nut's 252 face 280' against its corresponding surface. The holding force counteracts rotary loosening of the bolt 152 by the inter-engaged ramps 272 and 272', by the slope angle 272A of each of the ramps 272 and 272' exceeding the thread lead angle 172 (FIG. 17) of the bolt's 152 external thread 166 and the rise of the ramps 272 and 272', determined by the axial thickness or rise 274C of each of the respective shoulders 274 and 274' the respective ramps 272 and 272' incline to, exceeding the thread pitch 170 (FIG. 17) of the bolt's 152 external thread 166. Should the fastener 290 experience a loosening force component, the inter-engaged ramps 272 and 272' resist rotational loosening of the bolt 152 and the washer 250 in the direction of arrow C and counteract or otherwise redirect it in the tightening direction of arrow B inasmuch as the washers 250 and 252 are locked to adjacent surfaces. Any rotary motion of bolt 152 in the loosening direction of arrow C rotates the washer 250 in the same direction relative to the washer 252, rotationally displacing the washer 250 relative to the washer 252 in FIG. 28. This causes ramps 272 and 272' to slide against each other toward mutually wedged positions in FIG. 28, countering the rotary loosening of the bolt 152, and the shoulders 274 and 274' to separate. Since the washers 250 and 252 are not threaded onto the shank 160, they can rotate independently from one another. In response to the inter-engaged ramps 272 and 272' sliding across each other, the distance between the faces 280 and 280' increases, increasing the preload along the bolt's 152 axis 158 resulting from the rise and the slope angle of each of the ramps 272 and 272' being greater than the thread pitch and the thread lead angle 172, respectively, of the bolt's 152 external thread 166. The increased distance between the faces 280 and 280' accommodates bolt 152 elongation along the bolt's 152 axis 158. The incline or unwind slope angle 272A of each of the ramps 272 and 272' equal to or greater than the external thread 166 thread lead angle 172, the long unwind stroke of each of the ramps 272 and 272', 160-170 degrees in this example, and the rise or axial thickness 274C of each of the shoulders 274 and 274' each of the ramps 274 and 274' incline to greater than the thread pitch 170 of the bolt's 152 external thread 166 provide suitable unwind resistance along the stroke paths of the inter-engaged ramps 272 and 272', load capacity, and accommodate bolt 152 elongation along the bolt's 152 axis 158, maintaining the locked fastener 290. The gaps 292 that form between the adjacent shoulders 274 and 274' resulting from bolt 152 loosening provide visual confirmation of loosening, allowing a skilled workman to see the loosening and take any needed corrective action. The skilled workman may also measure the gaps 292, such as with a caliper or other measuring device. In place of the head 180 there can be a nut threaded over an external thread of the shank 160 having the same or lesser thread pitch and the same or lesser thread lead angle as the shank's 160 external thread 166.

IV.

Figure 29:
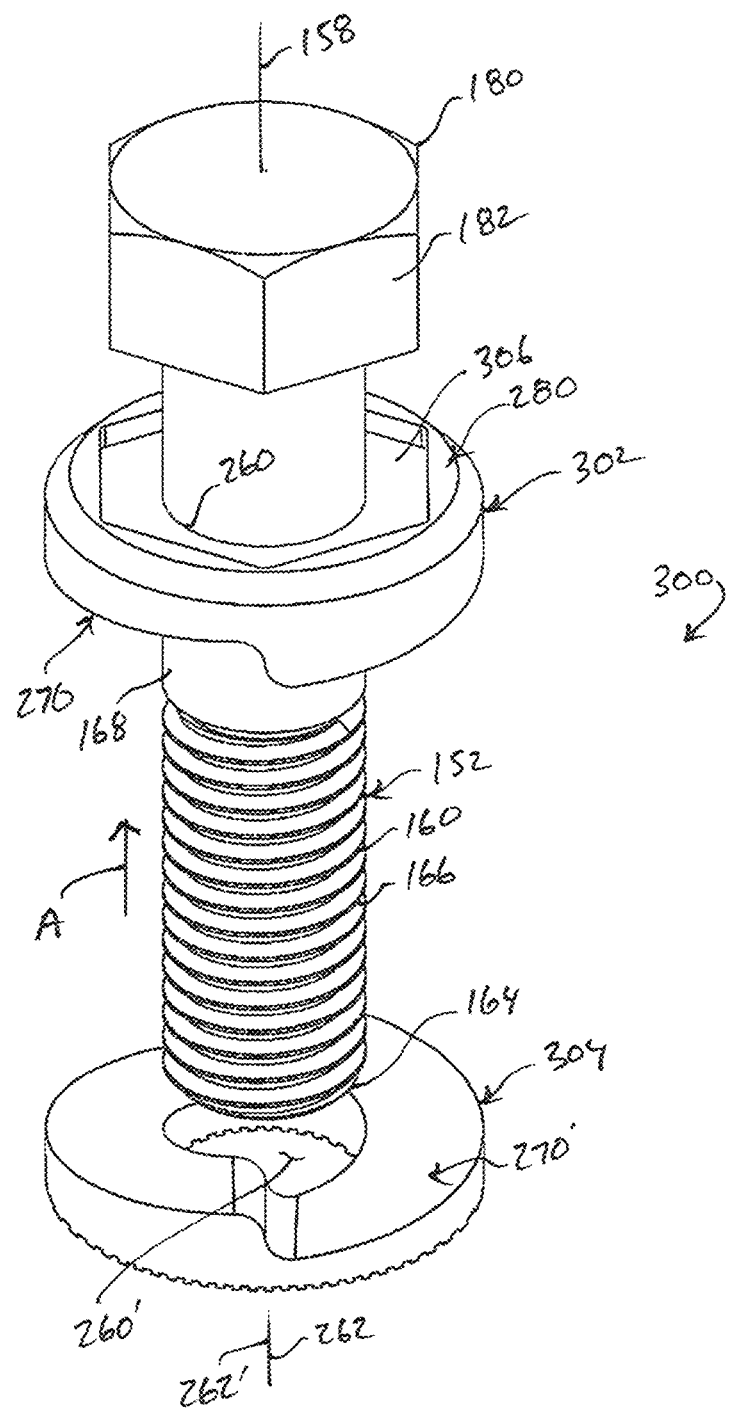
FIGS. 29 and 30 are perspective views of a fastener constructed and arranged according to the invention, the fastener shown partially assembled and including a bolt and cam locking washers.
Figure 30:
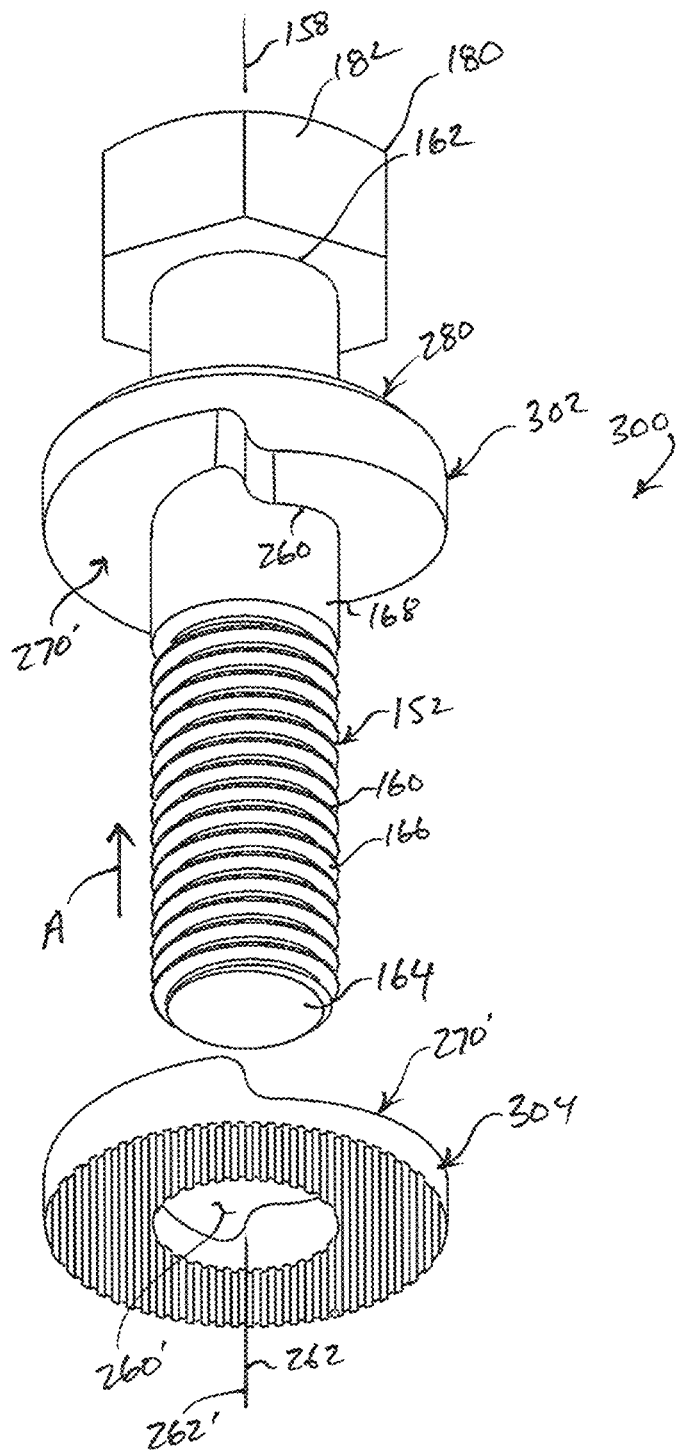
Figure 31:
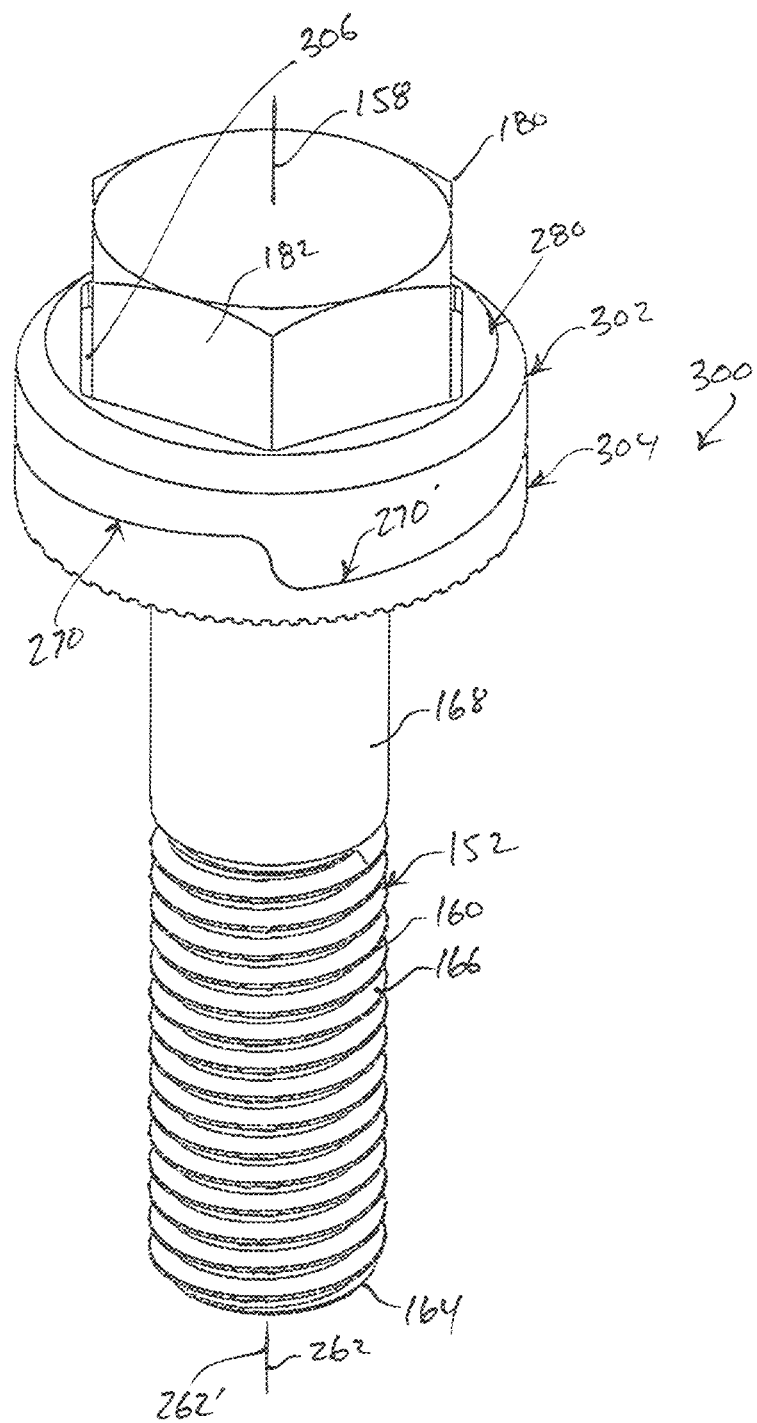
FIG. 31 is a perspective view showing the embodiment of FIG. 29 assembled.

FIGS. 29-31 illustrate an alternate embodiment of a fastener 300, including the previously-described bolt 152 and two cam locking components, namely, washers 302 and 304. Apart from the differences noted below, the washers 302 and 304 are identical to washers 252 and 254 and share the same reference characters referenced below as needed. Instead of having wrench flats, like washers 252 and 254, the washers 302 and 304 are disk-shaped and have no wrench flats. Instead of washer's 252 projections 282, in FIG. 30 the washer's 302 face 280 includes an annular socket 306, extending radially outward from the washer's 302 hole 260. The annular socket 306 is configured to fit over hold a head of a bolt, in this example the head 180 of the bolt 152. The shapes of the annular socket 306 and that of the head 180 correspond, so the reception of the bolt's 152 head 180 in the annular socket 306 disables relative rotation between the washer 302 and the head 180 and, therefore, the bolt 152.

FIGS. 29 and 30 show the fastener 300 partially assembled, and FIG. 31 shows it assembled. Briefly, a user assembles the bolt 300 with the washers 302 and 304 to form the fastener 300 in FIG. 31 by inserting the bolt's 152 distal end 164 into the washer's 302 hole 260 from the face 280. He advances the washer 302 over the shank 160 in the direction of arrow A in FIGS. 29 and 30, aligns the socket 306 with the head 180, and brings the washer's 302 face 280 in direct contact against the head's 180 annular bearing face 184A, situating the bolt's 152 head 180 in the washer's 302 socket 306 in FIG. 31. So installed, the washer 302 is received about the bolt's 152 shank 160 and the reception of the bolt's 152 head 180 in the annular socket 306 disables relative rotation between the washer 302 and the head 180 and, therefore, the bolt 152. He inserts the bolt's 152 distal end 164 into and through the washer's 304 hole 260' from face 270' and advances the washer 304 over the shank 160 in the direction of arrow A in FIGS. 29 and 30 toward the washer's 302 face 270, inter-engaging the faces 270 and 270' in FIG. 31 thereby inter-engaging the washers 302 and 304. So installed, the washer 304 is received about the bolt's 152 shank 160 and inter-engaged with the washer 302. The axes 158, 262, and 262' are coincident or otherwise coaxial in the assembled fastener 300. The inter-engaged faces 270 and 270' work as previously described, while the reception of the bolt's 152 head 180 in the annular socket 306 disables relative rotation between the washer 302 and the head 180 and, therefore, the bolt 152. In place of the head 180 there can be a nut threaded over an external thread of the shank 160 having the same or lesser thread pitch and the same or lesser thread lead angle as the shank's 160 external thread 166.

V.

The cam interface of each of the washers 250 and 252 can be configured with other fastener components, such as a bolt, a nut, etc. For example, FIGS. 32-35 illustrate yet another embodiment of a fastener 310. The fastener includes a bolt 312 and the previously-described washer 252. The bolt 312 is a threaded fastener element. It has a longitudinally straight cylindrical shank 320 extending from a first or proximal end 322, configured with a head 330, to a second or distal end 324. The shank 320 has an external thread 326 and an unthreaded body 328. The external thread 326 extends between the distal end 324 and the unthreaded body 328. The unthreaded body 328 extends between the external thread 326 and the proximal end 322. The head 330 is configured to be driven by a hand or power tool. The head 330 has wrench flats 332 for bolt-turn purposes, and an underside 334. The shank 320 extends outward to its distal end 324 from its proximal end 322 affixed centrally to the head's 330 underside 334. This forms an annular bearing face 334A of the head's 330 underside 334 that extends outward radially from the shank 330 to the wrench flats 332. The bolt 310 is arranged about an axis 336, which extends centrally through the shank 320 from the distal end 324 to the proximal end 322 and centrally through the head 330. The axis 336 is the bolt's 310 rotational axis. The external thread 326 is identical to the external thread 166 of the bolt 152 in FIG. 17, having the same thread pitch 170 and lead angle 172 as the bolt's 152 external thread 166. The external thread 326 between the proximal end 322 and the distal end 324 threads on a matching internal thread of a tapped nut, through-hole, or blind hole.

The face 334A of the bolt's 312 head 330 extending outward radially from the shank's 320 proximal end 322 to the wrench flats 332 is a cam face. It is the bolt's 310 cam interface. It is a surface configuration or profile identical in every respect to the face 270 of the washer 250 described above. Accordingly, the bolt's 310 face 334A is denoted generally by reference numeral 270, designating the face 270 as the same as the washer's 250 face 270. Since the face 270 of the bolt's 312 head 330 is the cam interface, the bolt's 312 head 33 is a cam locking head, the bolt 312 thereby being a cam locking bolt.

Figure 32:
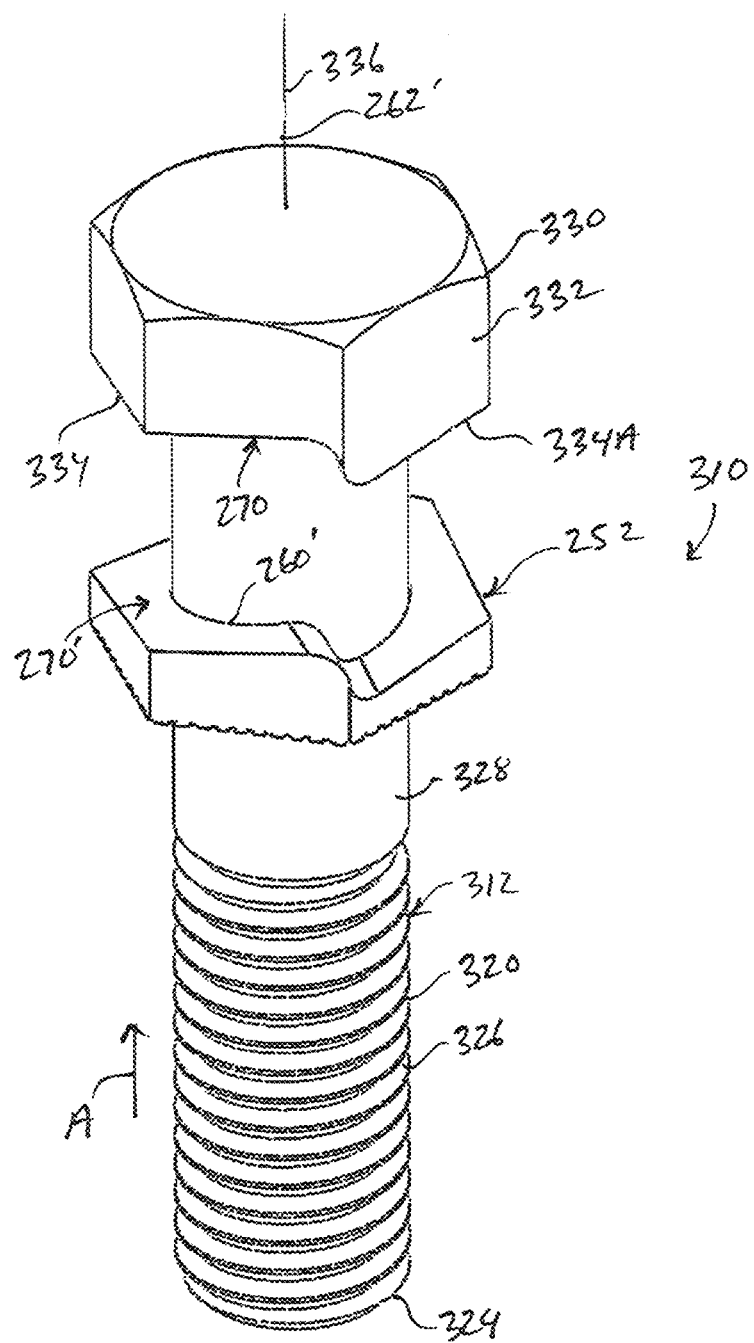
FIGS. 32 and 33 are perspective views of a fastener constructed and arranged according to the invention, the fastener shown partially assembled and including a bolt, including a shank extending from a cam locking head, and a cam locking washer.
Figure 33:
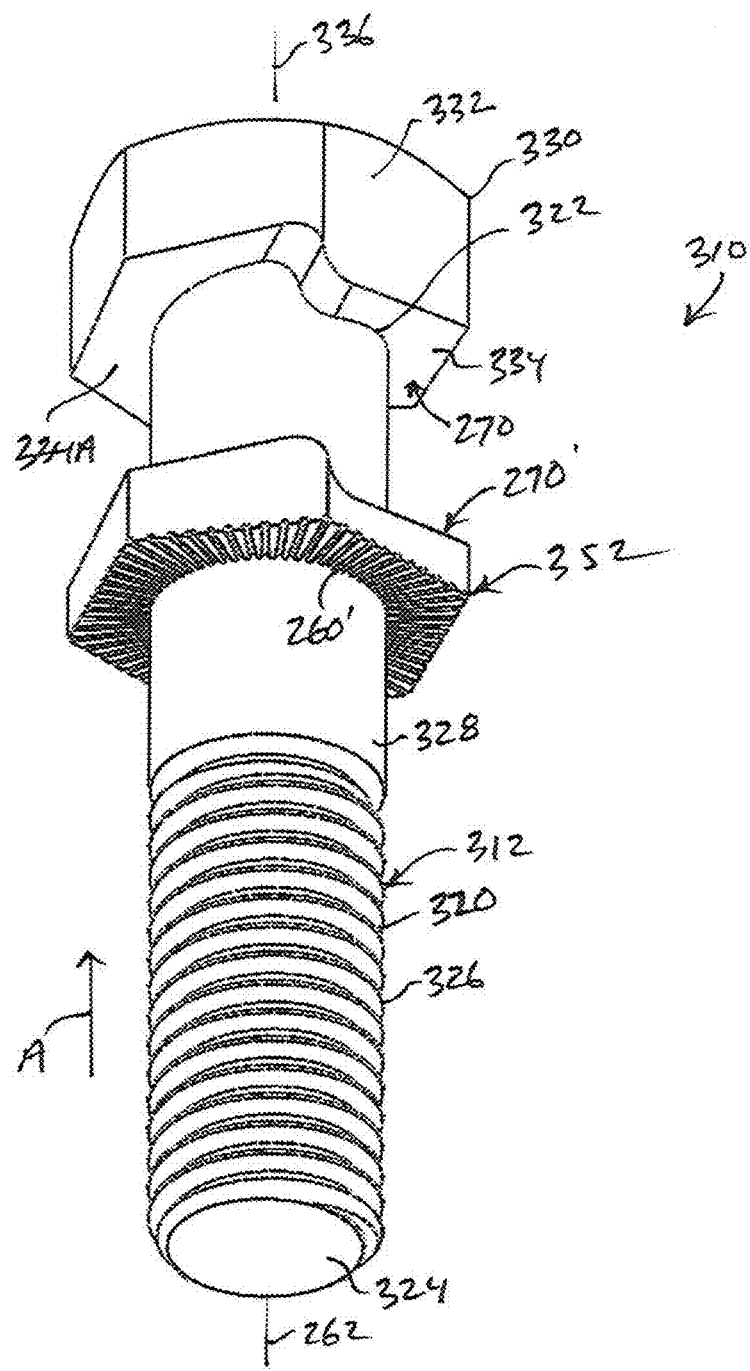
Figure 34:
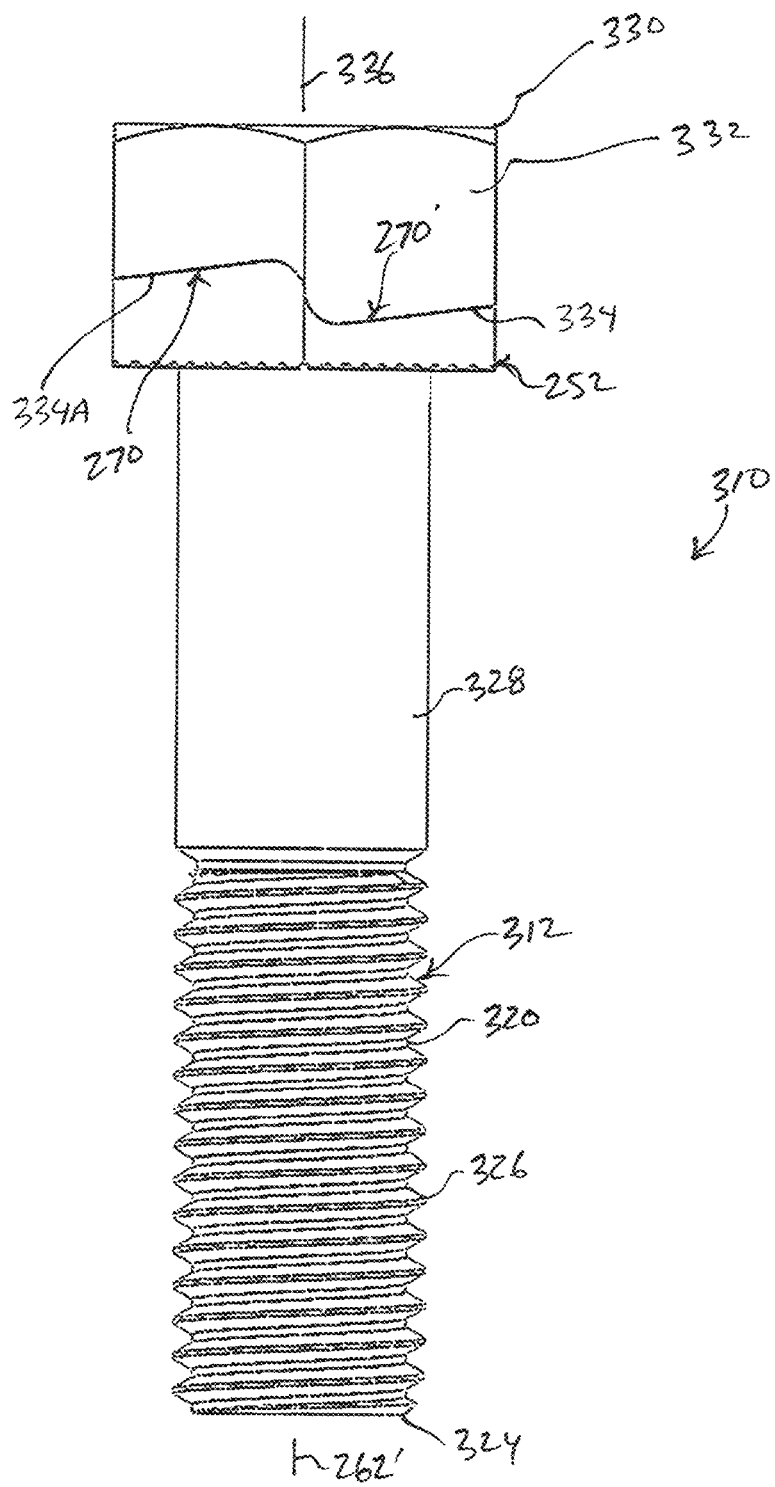
FIG. 34 is a side elevation view showing the embodiment of FIGS. 32 and 33 assembled.
Figure 35:
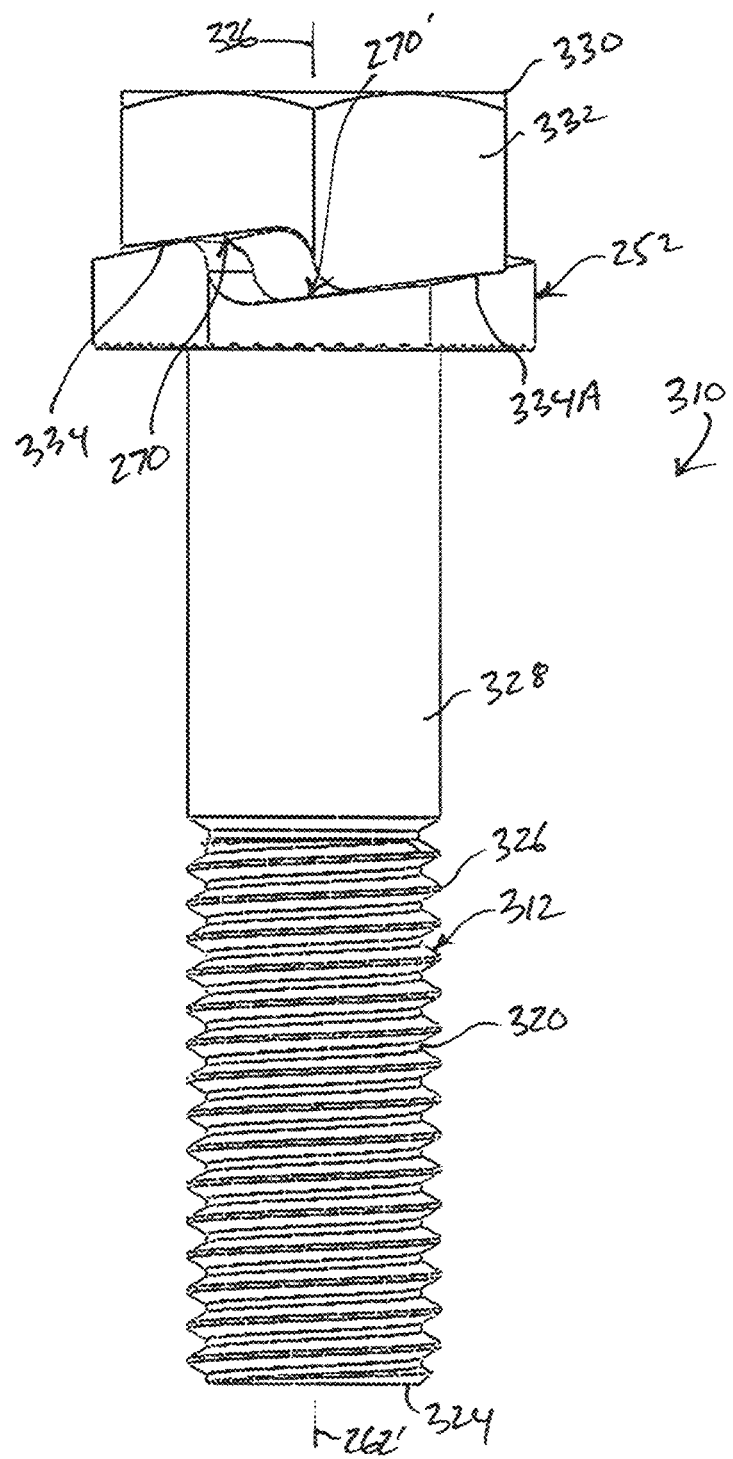
FIG. 35 is a side elevation corresponding to FIG. 34, showing the bolt and the cam locking washer displaced rotationally relative to each other.

FIGS. 32 and 33 show the fastener 310 partially assembled, and FIG. 34 shows it assembled. Briefly, a user assembles the bolt 310 with the washer 252 to form the fastener 300 in FIG. 31 by inserting the bolt's 312 distal end 324 into the washer's 252 hole 260' from the face 270 and advances the washer 252 over the shank 320 in the direction of arrow A in FIGS. 29 and 30 to bring the washer's 252 face 270' in direct contact against the head's 330 face 270, inter-engaging the faces 270 and 270' in FIG. 34 thereby inter-engaging the head 330 and the washer 252. The axes 336 and 262' are coincident or otherwise coaxial in the assembled fastener 310. The inter-engaged faces 270 and 270' work between the head 330 and the washer 252 as previously described. FIG. 35 shows the bolt 312 and the washer 252 as they would appear displaced rotationally relative to each other.

VI.

FIGS. 36-39 illustrate cam locking components configured to secure a threaded fastener element, such as a bolt or the like. The locking components include a nut 340 and the previously-described washer 252, configured to be assembled and incorporated with a threaded fastener element to form a fastener.

Figure 36:
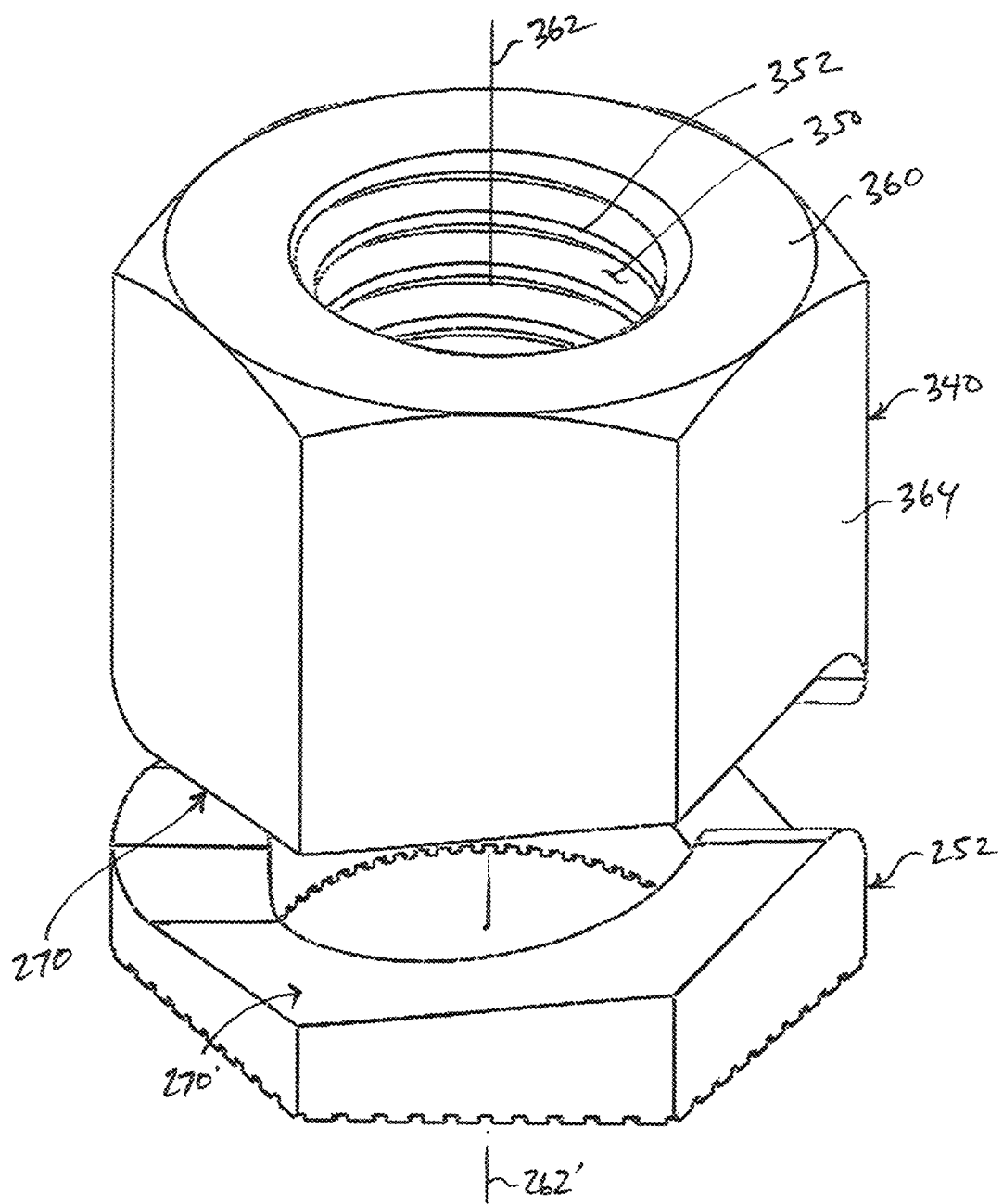
FIGS. 36 and 37 are perspectives view of a cam locking nut and a cam locking washer constructed and arranged according to the invention, the cam locking nut and the cam locking washer shown separated from each other.
Figure 37:
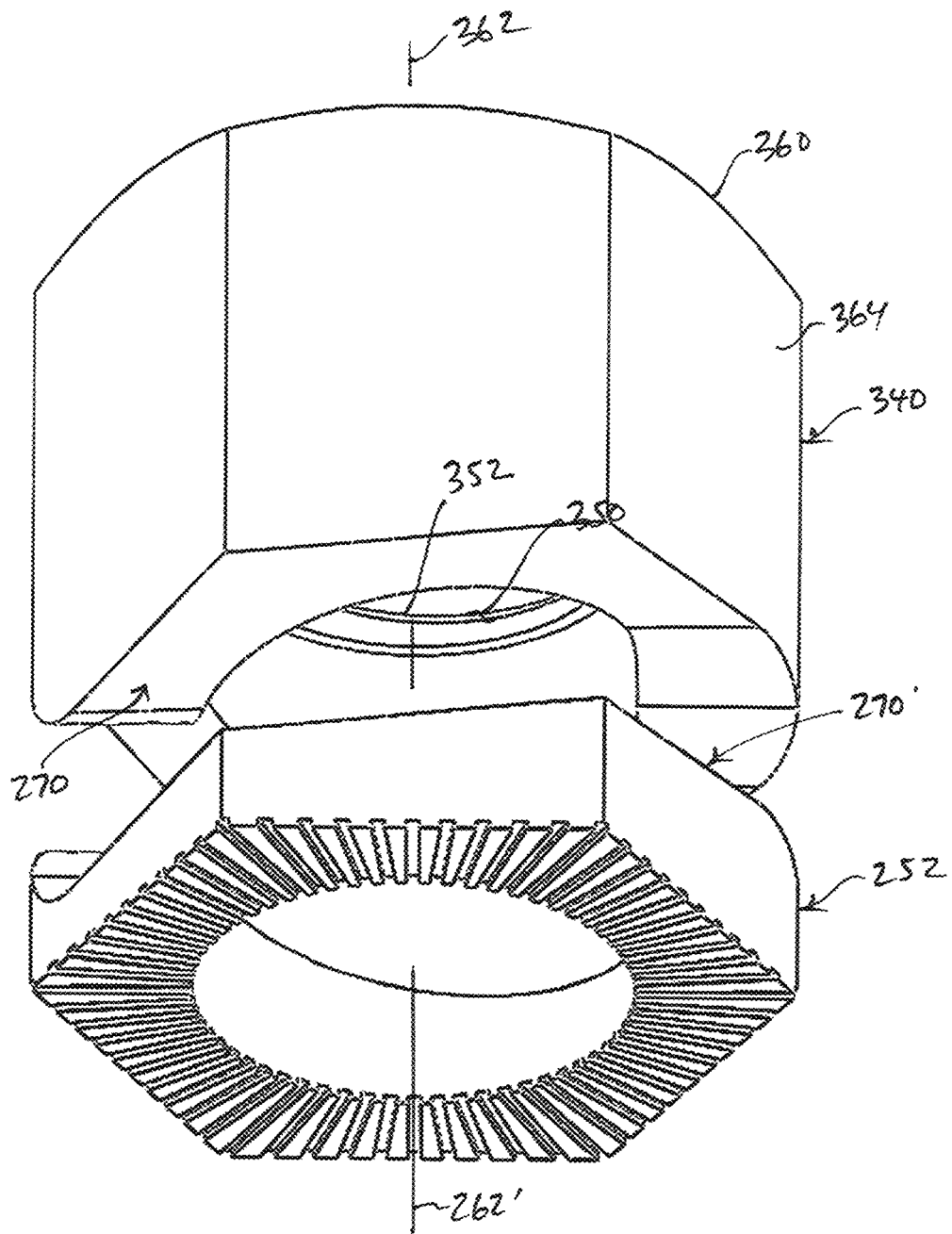
Figure 38:
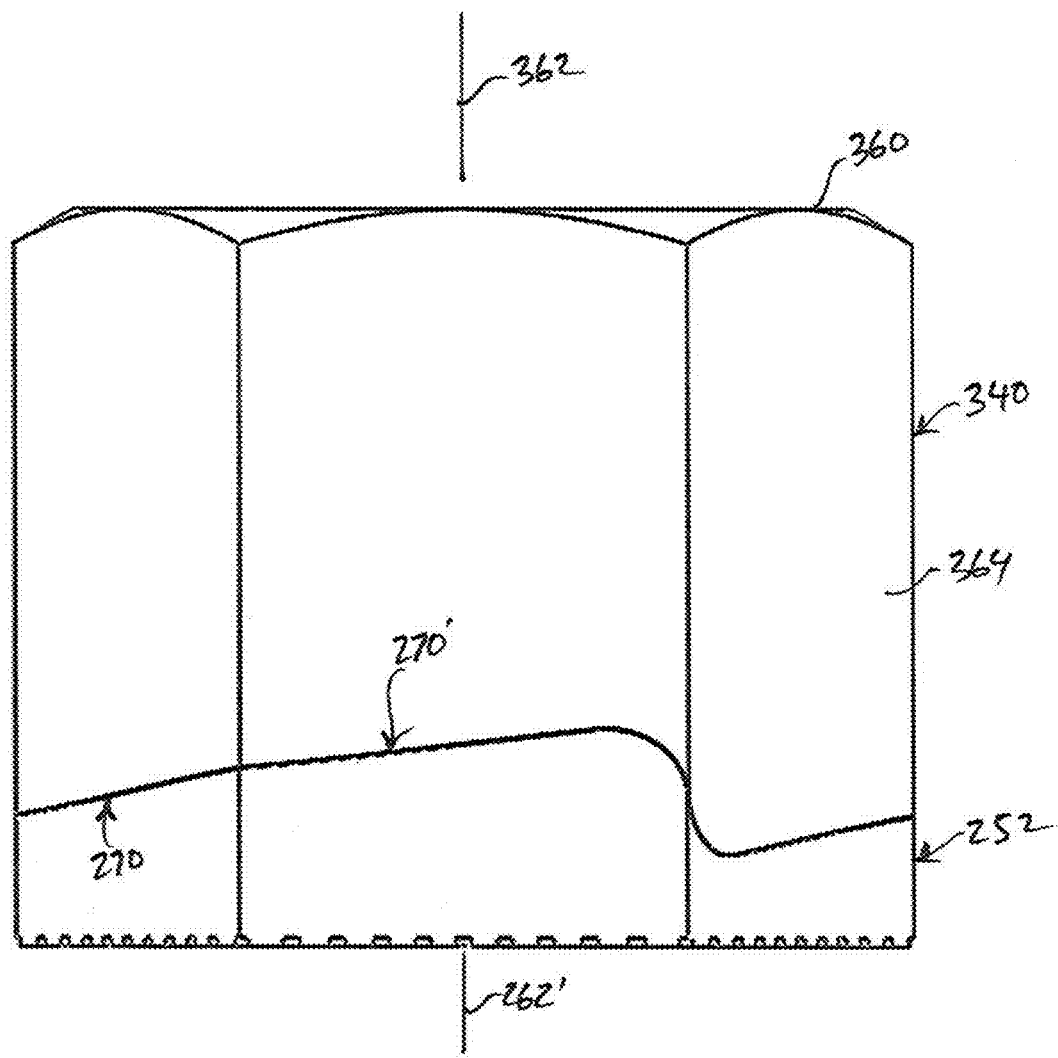
FIG. 38 is a side elevation view showing the embodiment of FIGS. 36 and 37 assembled.
Figure 39:
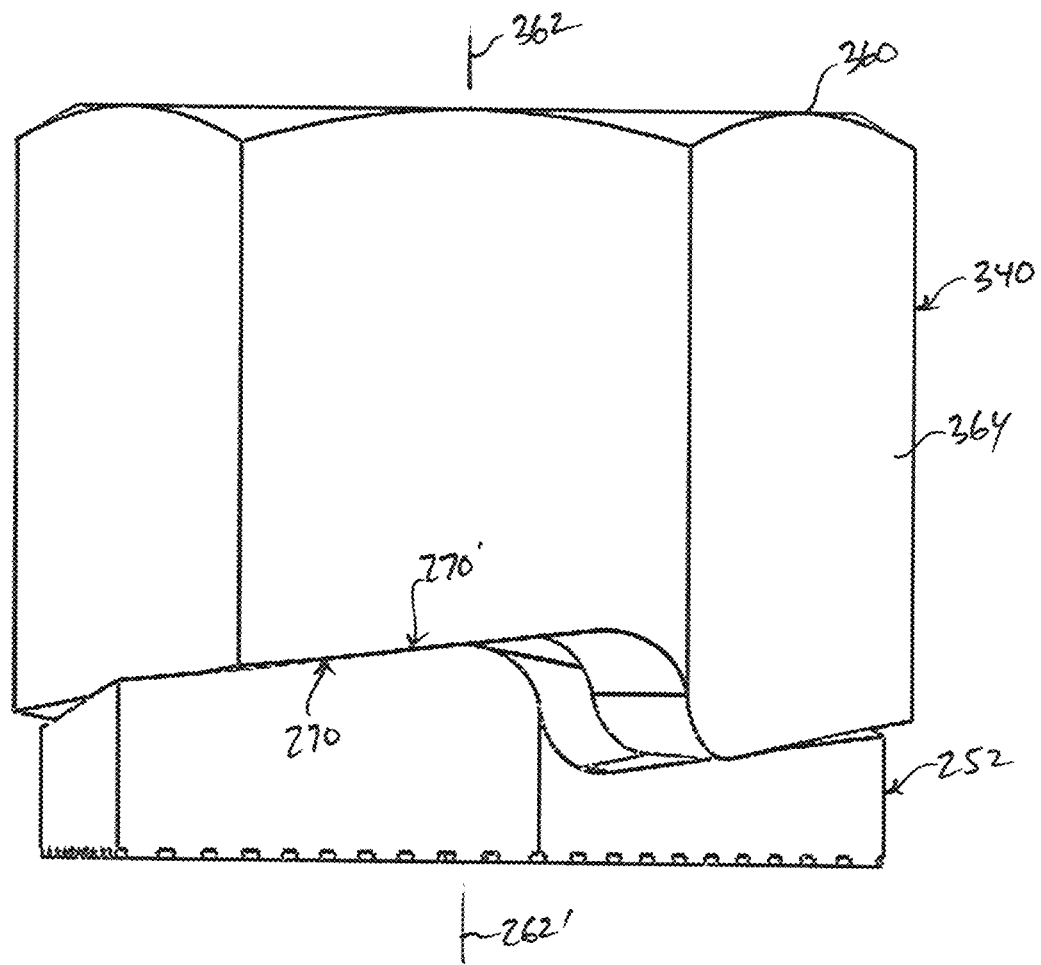
FIG. 39 is a side elevation view corresponding to FIG. 38, showing the cam locking nut and the cam locking washer displaced rotationally relative to each other.

In FIGS. 36 and 37, the nut 340 is a cam locking nut. It is an annular body or block having a hole 350 and opposed annular faces 270 and 360. The nut's 340 face 270, its cam interface, is identical in every respect the washer's 252 face 270'. The nut 340 has an axial thickness between its faces 270 and 360. The hole 350 extends through the nut 340 from the face 270 at one end of the nut 340 to the face 360 at the other end of the nut 340. The hole 350 is internally threaded by an internal thread 352 adapted to thread on a bolt's matching external thread. The nut 340 is arranged about axis 362, extending centrally through the threaded hole 350 from face 270 to face 360. The axis 362 is the nut's 340 rotational axis. The faces 270 and 270' of the nut 340 and the washer 252, respectively, inter-engage and work together in the same way as they do with the washer's 250 and 252. FIG. 38 shows the nut's 340 face 270 inter-engaged with the washer's 252 face 270'. FIG. 39 shows the nut 340 and the washer 252 displaced rotationally relative to each other. The nut 340 has standard wrench flats 364, six in this example, for bolt-turn purposes, and an underside 84. The nut 340 can a lesser or greater number of wrench flats 364 than shown.

Figure 40:
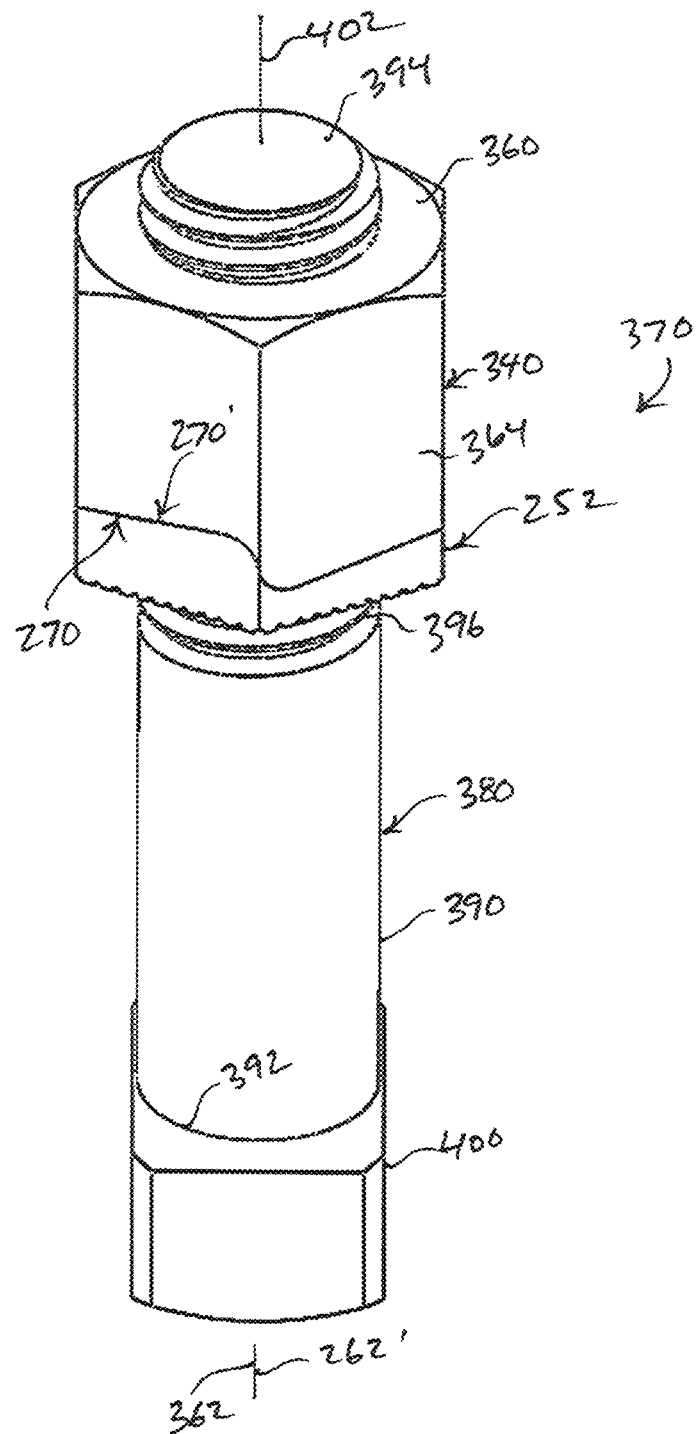
FIGS. 40 and 41 are perspective views of a fastener constructed and arranged according to the invention, the fastener shown assembled and including a bolt and the cam locking nut and the cam locking washer each first illustrated in FIG. 36.
Figure 41:
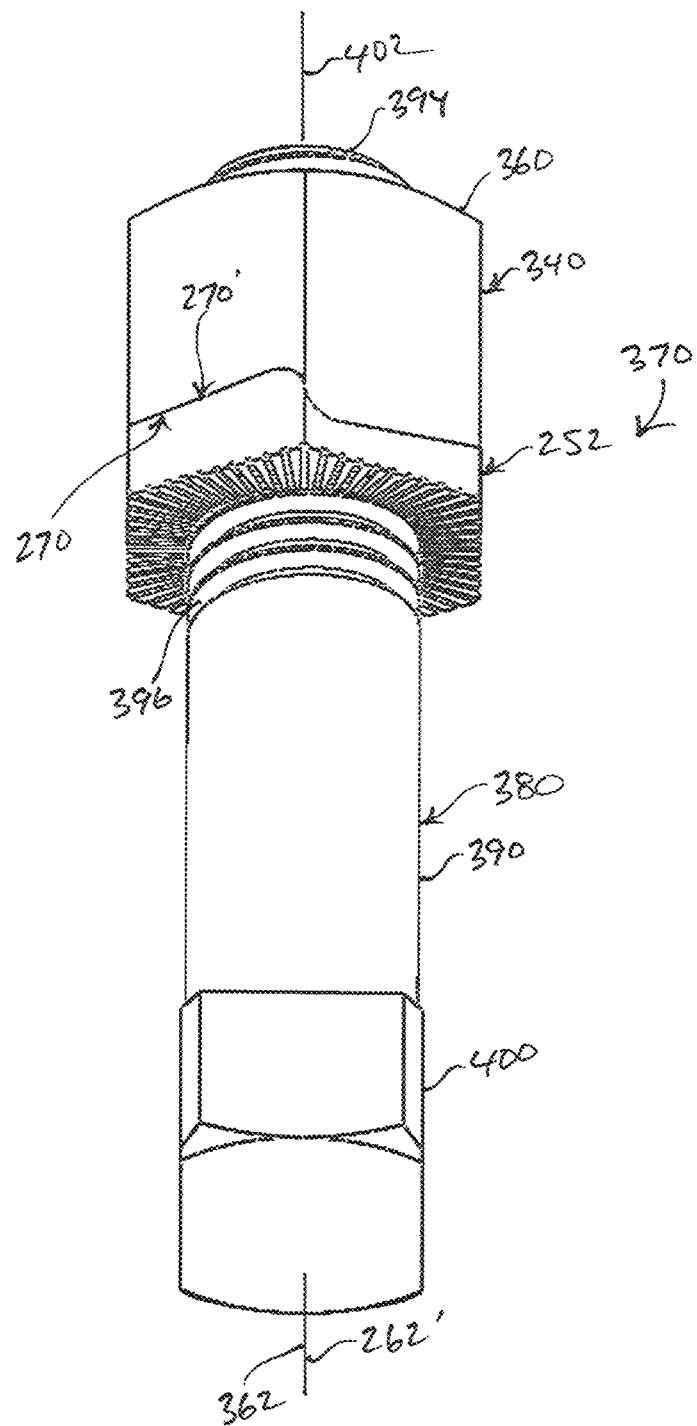

FIGS. 40 and 41 illustrate a faster 370, an assembly of the nut 340, the washer 252, and a bolt 380. The bolt 380, a threaded fastener element, has a longitudinally straight cylindrical shank 390 extending from a first or proximal end 392, configured with a head 400, to a second or distal end 394. The shank 390 has an external thread 396 and an unthreaded body 398. The external thread 396 extends between the distal end 394 and the unthreaded body 398. The unthreaded body 398 extends between the external thread 396 and the proximal end 392. The external thread 396 is identical to the external thread 166 of the bolt 152 in FIG. 17. It is a single start threadform having the same thread pitch 170 and lead angle 172 the bolt's 152 external thread 166 in FIG. 17. The external thread 396 between the proximal end 392 and the distal end 394 threads on a matching internal thread of a tapped nut, through-hole, or blind hole. The bolt 380 is arranged about an axis 402, which extends centrally through the shank 390 from the distal end 394 to the proximal end 292 and centrally through the head 400.

Figure 42:
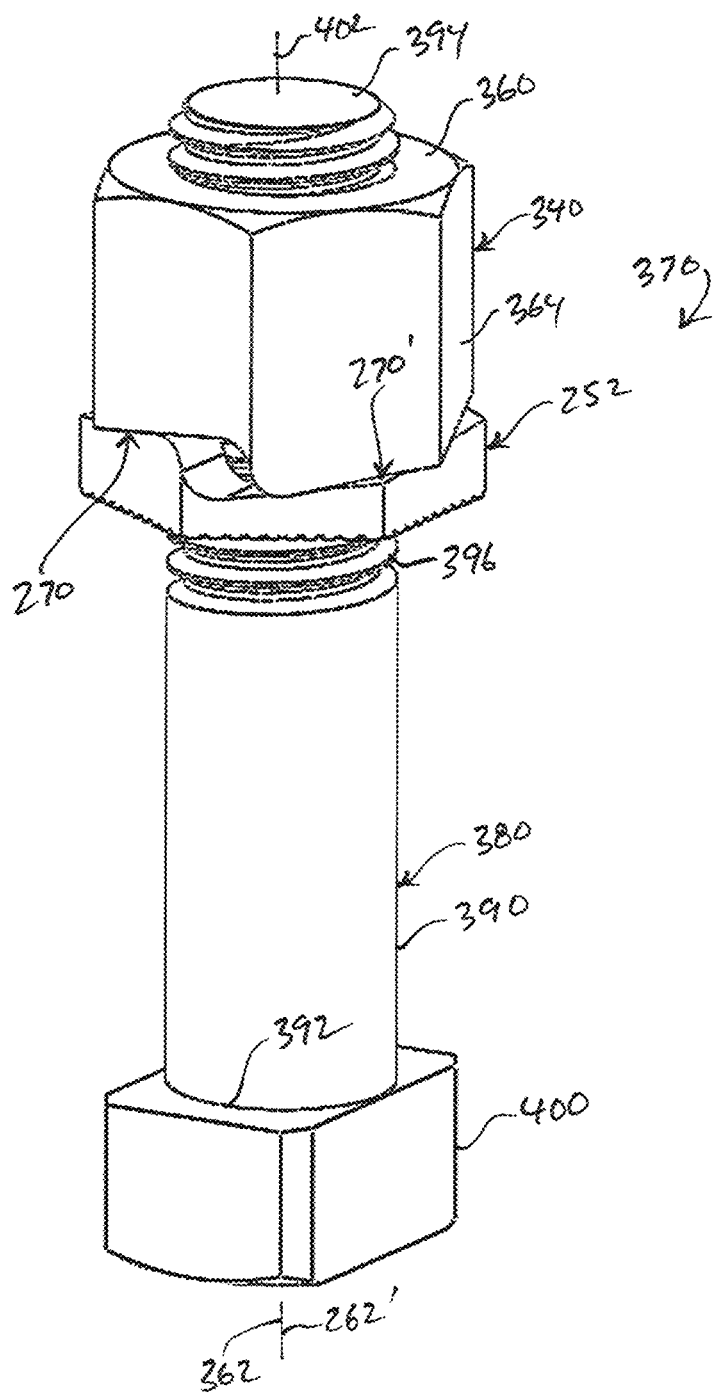
FIG. 42 is a perspective view corresponding to FIGS. 40 and 41, showing the cam locking nut and the cam locking washer displaced rotationally relative to each other.

In FIGS. 40 and 41, the nut 340 and the washer 252 are received about the bolt's 380 shank 390 over the external thread 396. The nut 340 is threaded over the shank's 390 external thread 396. The washer 252 over the shank's 390 external thread 396 is between the nut 340 and the head 400. The washer's 252 face 120' faces the head 400 and the faces 270 and 270' are inter-engaged, thereby inter-engaging the nut 340 and the washer 252. The axes 262', 362, and 402 are coincident or otherwise coaxial in the assembled fastener 370. The inter-engaged faces 270 and 270' work between the nut 340 and the washer 252 as previously described. FIG. 42 shows the nut 340 and the washer 252 as they would appear displaced rotationally relative to each other.

VII.

Figure 43:
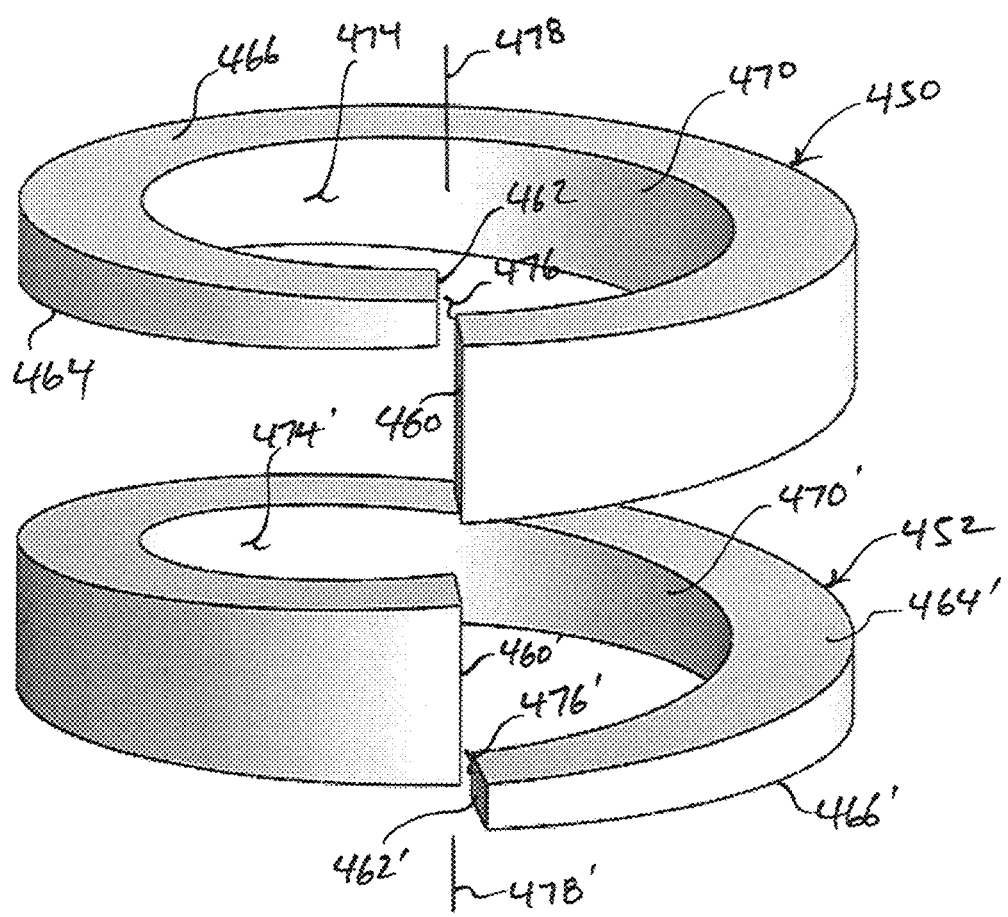
FIGS. 43 and 44 are perspective views of cam locking washers constructed and arranged according to the invention, the cam locking washers shown separated from each other.
Figure 44:
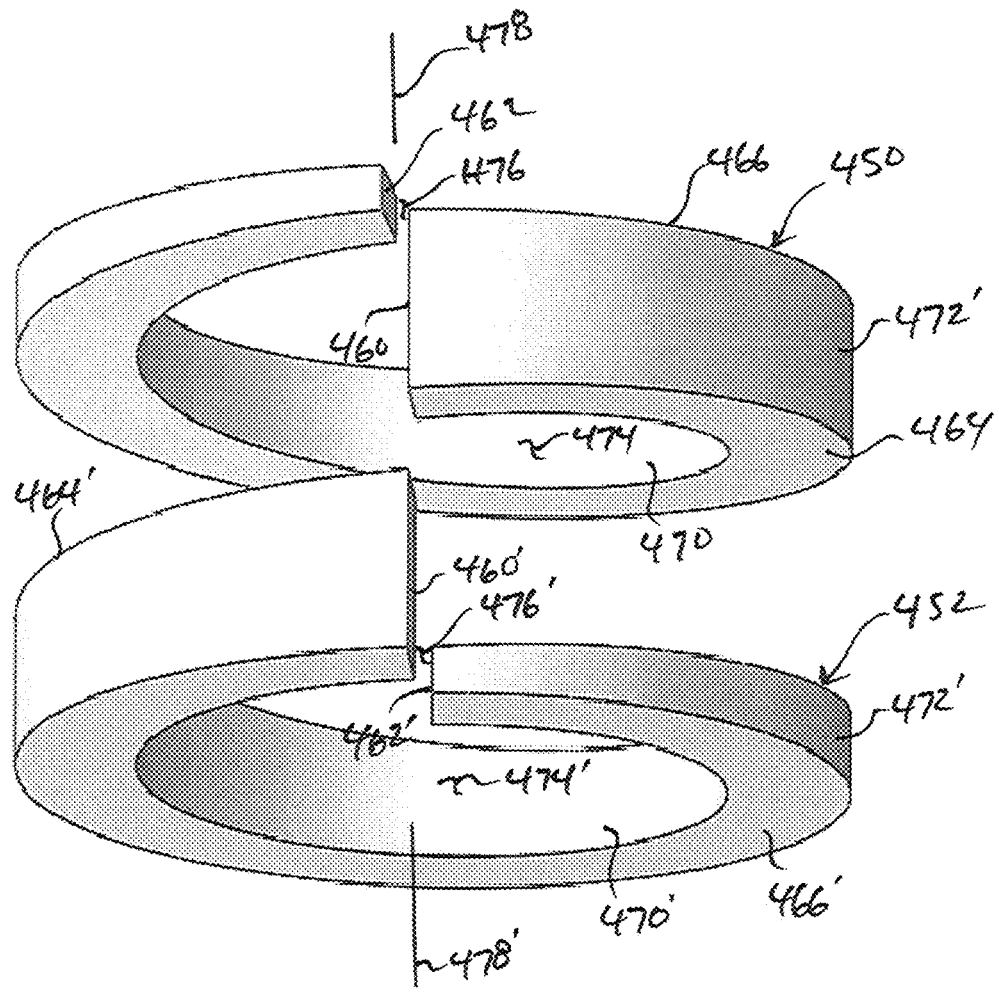
Figure 45:
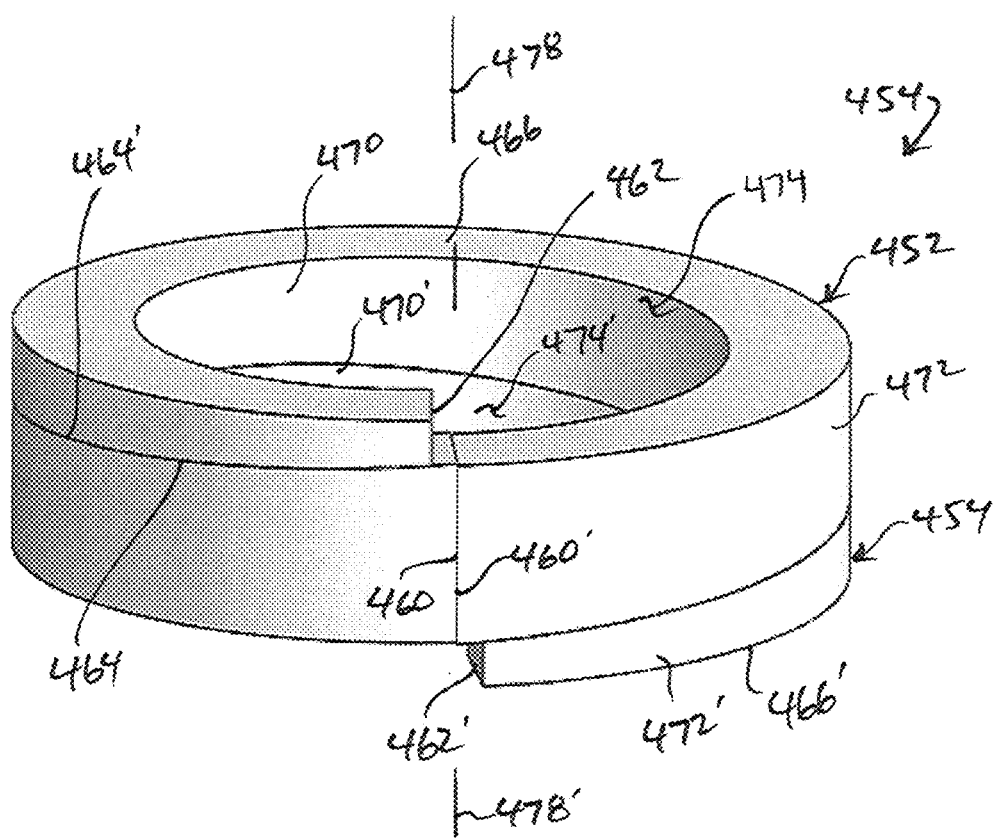
FIGS. 45 and 46 are perspective views showing the embodiment of FIGS. 43 and 44 assembled.
Figure 46:
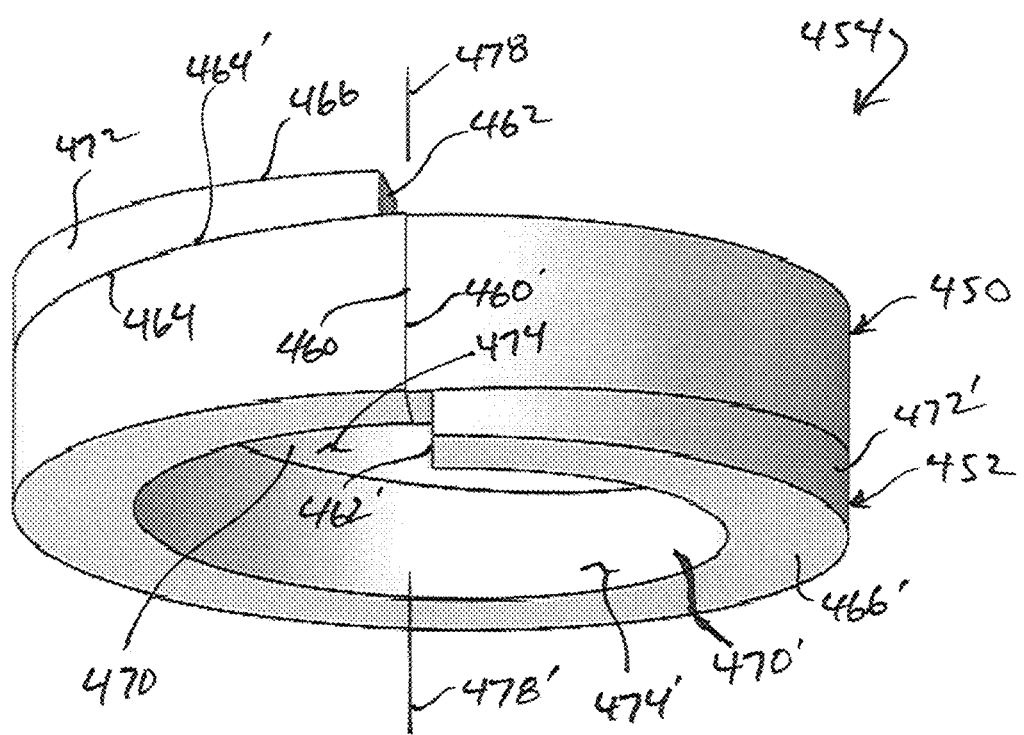

FIGS. 43-46 illustrate cam locking washers 450 and 452. The washers 450 and 452 are identical in every respect, each being constructed and arranged according to the invention. FIGS. 43 and 44 show the washers 450 and 452 separated from each other. FIGS. 45 and 46 show a washer assembly 454, the assembly of the washers 450 and 452. The washers 450 and 452 are configured to assembled with a threaded fastener element, such as a bolt or the like, to form a fastener. Since the washers 450 and 452 are identical, the ensuing discussion of washer 450 applies in every respect to washer 452 and they share the same reference characters, those of the washer 452 including a prime ("''") symbol for clarity.

Figure 47:
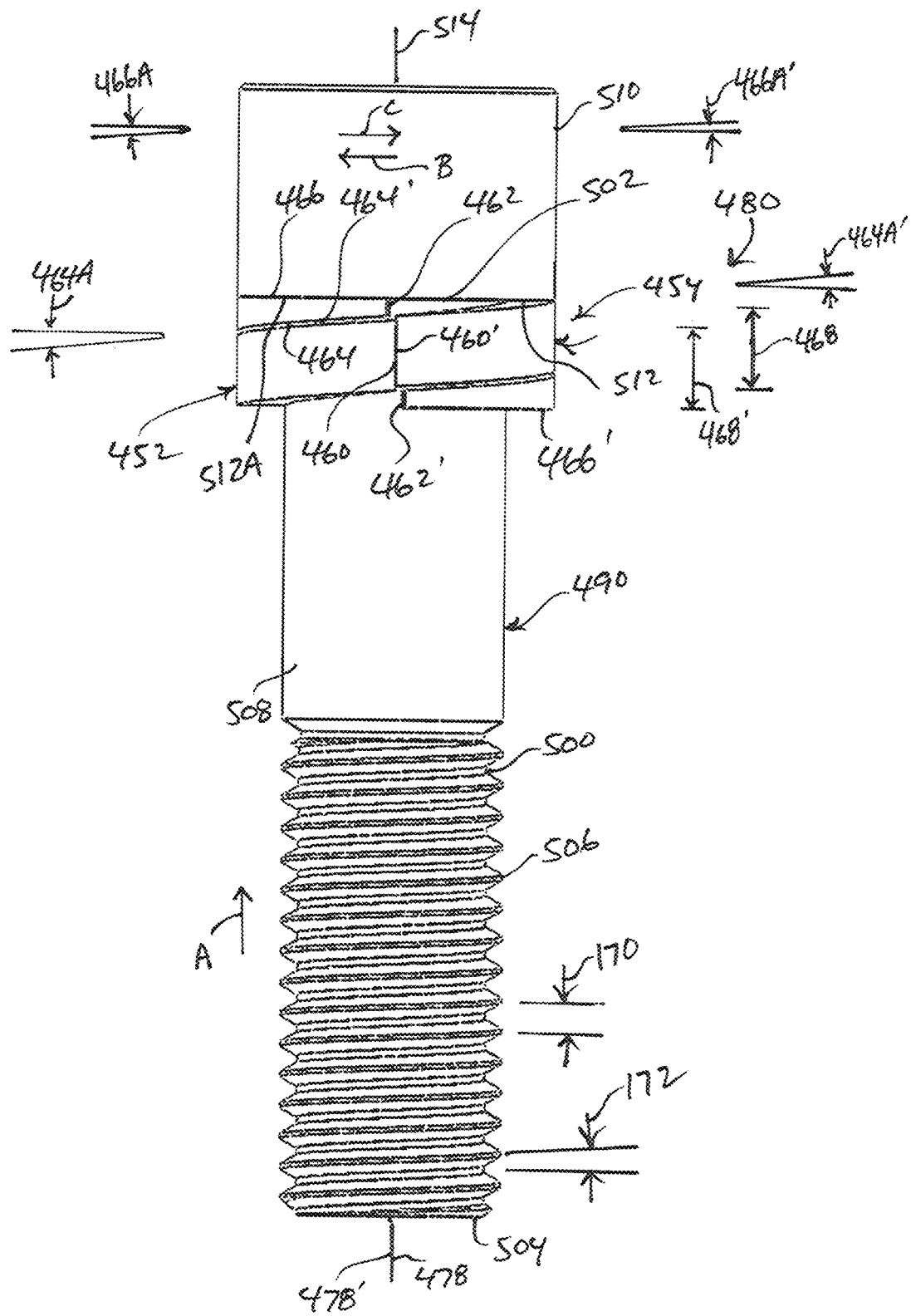
FIG. 47 is a side elevation view of a fastener constructed and arranged according to the invention, the fastener shown assembled and including a bolt and the cam locking washers first illustrated in FIG. 43.

The washer 450 is a tapering helical split ring. It includes a head 460, a tail 462, opposed radial surfaces or ramps 464 and 466, an inner axial surface 470, and an outer axial surface 472. The radial surface 464 is a cam radial surface. The radial surface 466 is a base radial surface. The inner axial surface 470 defines a hole 474. The hole 474 extends from the cam radial surface 464 to the base radial surface 466. An end gap 476 separates the head 460, the washer's 450 first end, from the tail 462, the washer's 450 second end. The head end 460 is larger than the tail end 462. The washer 450 is arranged about axis 478, extending centrally through the hole 474 from the cam radial surface 464 to the base radial surface 466. The washer 450 tapers gradually and spirals helically outward from the head 460 to the tail 462. The cam radial surface 464 spirals helically outward along a first helical slope or slope angle from the head 460 to the tail 462. The base radial surface 466 spirals helically outward along a second helical slope or slope angle from the head 460 to the tail 462. Each of the helical slopes or slope angles is the angle it makes relative to an imaginary radial plane extending normal to the washer's 450 central axis 478. In FIG. 47, numeral 464A represents the first slope angle of the cam radial surface 464 and numeral 466A represents the second slope angle of the base radial surface 466. The first slope angle 464A is greater than the second slope angle 466A. In an exemplary embodiment, the first slope angle 464A is 8-12 degrees and the second slope angle 466A is 1-3 degrees. In FIG. 47, the washer 450 has an axial rise or thickness 468 that extends from cam radial surface 464 terminating at the head 460 to the cam radial surface 464 terminating at the tail 462. The rise 468 is greater than the thread pitch 170, preferably at least double the thread pitch 170. Numeral 464A' represents the first slope angle of the washer's 452 cam radial surface 464', numeral 466A' represents the second slope angle of the washer's 452 base radial surface 466', and numeral 468' represents the washer's 452 axial rise extending from cam radial surface 464' terminating at the head 460' to the cam radial surface 464' terminating at the tail 462'. Accordingly and according to the invention, the washer 450 is an incomplete annular wedge, tapering and spiraling helically outward from its head 460 to its tail 462.

In FIGS. 43 and 44, a user assembles the washers 450 and 452 by orienting the washer 450 so it extends upright from its cam radial surface 464 to its base radial surface 466. He inverts the washer 452 under the washer 450 so it extends upright from its base radial surface 466' to its cam radial surface 464'. He registers the washer's 450 cam radial surface 464 with the washer's 452 cam radial surface 464', axially aligning the axes 478 and 478' of the respective washers 450 and 452, and brings the washers 450 and 452 together, facially engaging the radial surfaces 464 and 464' while aligning the heads 460 and 460' axially or otherwise end to end. In this configuration of the assembly of the washers 450 and 452 forming the washer assembly 454 in FIGS. 45 and 46, the washer 450 spirals helically upward from the head 460 opposing the head 460' to the tail 462, and the first and base radial surfaces 464 and 466 spiral helically upward along their respective slope angles 464A and 466A from the head 460 to the tail 462. The washer 452, in turn, spirals helically downward from the head 460' opposing the head 460 to the tail 462', and the first and base radial surfaces 464' and 466' spiral helically downward along their respective slope angles 464A' and 466A' from the head 460' to the tail 462'. The washer's 450 cam radial surface 464 between the head 460 and the tail 462 is over and facially engages the washer's 452 underlying cam radial surface 464' between the head 460' and the tail 462'.

FIG. 47 illustrates a faster 480, an assembly of the washers 450 and 452 and a bolt 490. The bolt 490, a threaded fastener element, has a longitudinally straight cylindrical shank 500 extending from a first or proximal end 502, configured with a head 510, to a second or distal end 504. The shank 500 extends outward to its distal end 504 from its proximal end 502 affixed centrally to the head's 510 underside 512, forming an annular bearing face 512A of the head's 510 underside 512 that extends outward radially from the shank 500. The shank 500 has an external thread 506 and an unthreaded body 508. The external thread 506 extends between the distal end 504 and the unthreaded body 508. The unthreaded body 508 extends between the external thread 506 and the proximal end 502. The external thread 506 is identical to the external thread 166 of the bolt 152 in FIG. 17. It is a single start threadform having the same pitch 170 and lead angle 172, shown in FIGS. 17 and 47, as the bolt's 152 external thread 166. The external thread 506 between the proximal end 502 and the distal end 504 threads on a matching internal thread of a tapped nut, through-hole, or blind hole. The bolt 490 is arranged about an axis 514, which extends centrally through the shank 500 from the distal end 504 to the proximal end 502 and centrally through the head 510.

A user assembles installs the washers 450 and 452 on the bolt 490 to form the fastener 480 by inserting the bolt's 490 distal end 504 into and through the axially aligned holes 474 and 474' of the washer assembly 454 from the washer's 450 base radial surface 466. He advances washer assembly 454 over the shank 500 toward the head's 510 underside 512 in the direction of arrow A in FIG. 47, bringing the washer's 450 base radial surface 466 into direct contact against the head's 510 annular bearing face 512A. Having done this, the washers 450 and 452 of the washer assembly 454 described above are received about the bolt's 490 shank 500, their cam radial surfaces 464 and 464' facially engage, and the washer 450 is between the washer 452 and the head's 510 annular bearing face 512A. The washers 450 and 452 so received about the shank 500 are arranged about the axis 514 of rotation, in which the axes 478, 478', and 514 are coincident or otherwise coaxial in the assembled fastener 480. The washer 452 extends upright from its base radial surface 466' to its cam radial surface 464'. The first ends 460 and 460' are aligned end to end. The washer's 450 cam radial surface 464 between the head 460 and the tail 462 is over and facially engages the washer's 452 underlying cam radial surface 464' between the head 460' and the tail 462'. The washer 450 extends upright from its cam radial surface 464 to its base radial surface 466 directly against the head's 510 annular bearing face 512A. In this configuration, the washer's 450 head 460 opposes the washer's 452 head 460. The washer 450 spirals helically upward from the head 460 the tail 462, and the first and base radial surfaces 464 and 466 spiral helically upward along their respective slope angles 464A and 466A from the head 460 to the tail 462. The washer 452, in turn, spirals helically downward from the head 460' to the tail 462', and the first and base radial surfaces 464' and 466' spiral helically downward along their respective slope angles 464A' and 466A' from the head 460' to the tail 462'. The expedient of the washers 450 and 452 being helical split rings allows each of them to inherently expand and contract, allowing each of them to be received about threaded fastener element shanks of varying outer diameters. The rises 468 and 468' of the respective cam radial surfaces 464 and 464' each greater than the thread pitch 170 of the bolt's 490 external thread 506 and the slope angles 464A and 464A' of the respective cam radial surfaces 464 and 464' each equal to or greater than the external thread's 506 thread lead angle 172 allow the washer assembly 454 to aggressively counteract rotary loosening of the bolt 490 and redirect the rotatory loosening in a tightening direction.

The bolt's 490 external thread 506 is configured to thread on an internal thread of a tapped nut, through-hole, or blind hole, clamping the assembled washers 450 and 452 between the head's 510 annular bearing face 512A and a joint member applied over the bolt's 490 shank 500. The interengaged cam radial surfaces 464 and 464' form a holding force by slope angles 464A and 464A' of the respective cam radial surfaces 464 and 464' each being equal to or greater than the lead angle 172 of the bolt's 490 external thread 506 and by the rises 468 and 468' of the respective cam radial surfaces 464 and 464' each being greater than the thread pitch 170 of the bolt's 490 external thread 506. This holding force counteracts rotary loosening of the bolt 490 inasmuch as the washers 450 and 452 remain in contact with the adjacent surfaces, the washer's 450 base radial surface 466 against the head's 510 annular bearing face 512A and washer's 452 base radial surface 466' against its surface, and redirect rotary loosening of the bolt 490 in a tightening direction. If desired, the base radial surfaces 466 and 466' can be configured with projections, teeth or serrations, to facilitate surface gripping.

Figure 48:
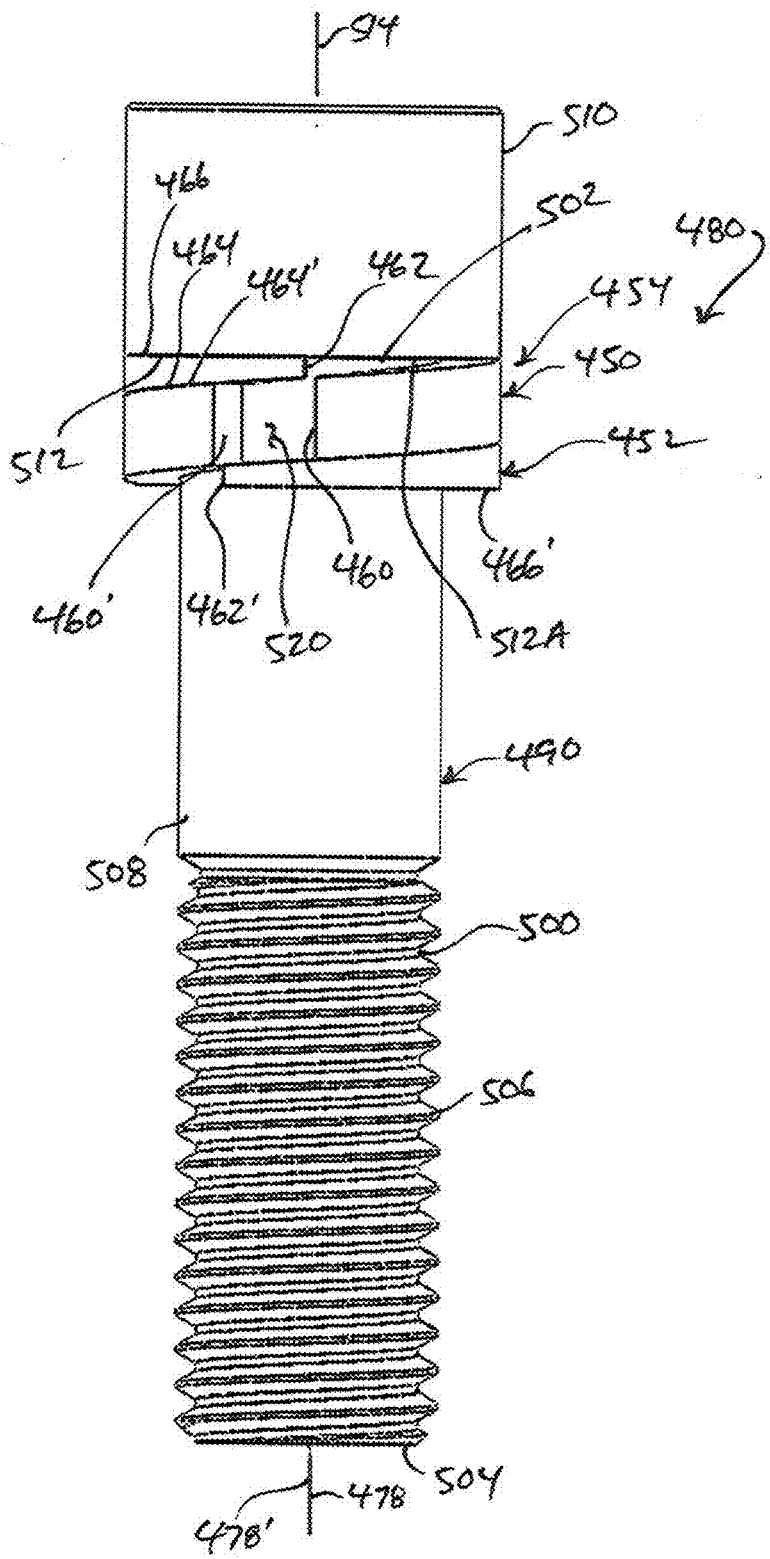
FIG. 48 is a view corresponding to FIG. 38, showing the cam locking washers displaced rotationally relative to each other.

Should the fastener 480 experience vibration or shock, the inter-engaged cam radial surfaces 464 and 464' resist rotational loosening of the bolt 490 in the direction of arrow C in FIG. 47 inasmuch as the washers 450 and 452 are in contact with their adjacent surfaces, and counteract or otherwise redirect the rotational loosening of the bolt 490 in the tightening direction of arrow B in FIG. 47. Any rotary motion of the bolt 490 in the loosening direction of arrow C rotates the washer 450 relative to the washer 452 in the same direction in FIG. 48. The rotational displacement of the washer 450 relative to the washer 452 in the loosening direction of arrow C in FIG. 47 causes the cam radial surfaces 464 and 464' to slide against each other toward mutually wedged positions in FIG. 48, countering the rotary loosening of the bolt 490. Since the washers 450 and 452 are not threaded onto the shank 500, they can rotate relative to each other and the shank 500. Rotational displacement of the washer 450 in the loosing direction of arrow C in FIG. 47 relative to the washer 452 separates the opposed heads 460 and 460', forming a gap 520 therebetween in FIG. 48. In response to the inter-engaged cam radial surfaces 464 and 464' sliding across each other, the distance between the base radial surfaces 466 and 466' increases, increasing the preload along the bolt's 490 axis 514 resulting from the slope angles 464A and 464A' of the respective cam radial surfaces 464 and 464' being greater than the thread pitch 170 and the thread lead angle 172, respectively, of the bolt's 490 external thread 506. The increased distance between the base radial surfaces 466 and 466' accommodates bolt 490 elongation along the bolt's 490 axis 514. The steep incline or unwind slopes 464A and 464' of the cam radial surfaces 464 and 464' equal to or greater than the external thread 506 thread lead angle 172, their long unwind strokes, the cam radial surface 464 from end 460 to end 462 and the cam radial surface 464' from end 460' to end 462', and the rises 468 and 468' of the respective washers 450 and 452 greater than the thread pitch 170 of the bolt's 490 external thread 506 provide exemplary unwind resistance along the stroke paths of the inter-engaged cam radial surfaces 464 and 464', load capacity and accommodate bolt 490 elongation along the bolt's 490 axis 514, maintaining the locked fastener 490. The gap 520 that forms between the adjacent heads 460 and 460' resulting from bolt 490 loosening provides visual confirmation of loosening, allowing a skilled workman to see the loosening and take any needed corrective action. The skilled workman may also measure the gap 520, such as with a caliper or other measuring device. In place of the head 510 there can be a nut threaded over an external thread of the shank 500 having the same or lesser thread pitch and the same or lesser thread lead angle as the shank's 500 external thread 506.

VIII.

The present invention is described above with reference to illustrative embodiments. Those skilled in the art will recognize that changes and modifications may be made in the described embodiments without departing from the nature and scope of the present invention. Various changes and modifications to the embodiments herein chosen for purposes of illustration will readily occur to those skilled in the art. To the extent that such modifications and variations do not depart from the invention, they are intended to be included within the scope thereof.

Having fully described the invention in such clear and concise terms as to enable those skilled in the art to understand and practice the same.

The invention claimed is:

1. A washer, comprising:
    a split ring arranged about an axis, the split ring including a head, a tail, an end gap separating the head from the tail, a cam radial surface, and a base radial surface, the split ring tapering and extending helically outward from the head to the tail;
    the cam radial surface spiraling helically outward along a first helical slope to a plane normal to the axis from the head to the tail;
    the base radial surface spiraling helically outward along a second helical slope to the plane from the head to the tail; and
    the first helical slope greater than the second helical slope.

2. A washer assembly, comprising:
    a first washer and a second washer arranged about an axis, the first washer and the second washer each comprising:
        a split ring including a head, a tail, an end gap separating the head from the tail, a cam radial surface, and a base radial surface, the split ring tapering and extending helically outward from the head to the tail;
        the cam radial surface spiraling helically outward along a first helical slope to a plane normal to the axis from the head to the tail;
        the base radial surface spiraling helically outward along a second helical slope to the plane from the head to the tail; and
        the first helical slope greater than the second helical slope;
    the first end of the first washer aligned with the first end of the second washer; and
    the cam radial surface between the head and the tail of the first washer facially engaging the cam radial surface between the head and the tail of the second washer.

3. A fastener, comprising:
    a shank arranged about an axis of rotation, the shank including an external thread having thread lead angle to a plane normal to the axis of rotation;
    a first washer and a second washer received about the shank and arranged about the axis of rotation, the first washer and the second washer each comprising:
        a split ring including a head, a tail, an end gap separating the head from the tail, a cam radial surface, and a base radial surface, the split ring tapering and extending helically outward from the head to the tail;
        the cam radial surface spiraling helically outward along a first helical slope to the plane from the head to the tail;
        the base radial surface spiraling helically outward along a second helical slope to the plane from the head to the tail; and
        the first helical slope greater than the second helical slope and equal to or greater than the thread lead angle;
    the first end of the first washer aligned with the first end of the second washer; and
    the cam radial surface between the head and the tail of the first washer facially engaging the base radial surface between the head and the tail of the second washer.

* * * * *